US011261285B2

(12) United States Patent
Hatakeyama et al.

(10) Patent No.: US 11,261,285 B2
(45) Date of Patent: Mar. 1, 2022

(54) STRETCHABLE FILM AND METHOD FOR FORMING STRETCHABLE FILM

(71) Applicant: SHIN-ETSU CHEMICAL CO., LTD., Tokyo (JP)

(72) Inventors: Jun Hatakeyama, Joetsu (JP); Motoaki Iwabuchi, Joetsu (JP); Koji Hasegawa, Joetsu (JP); Shiori Nonaka, Joetsu (JP); Joe Ikeda, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 244 days.

(21) Appl. No.: 16/568,388

(22) Filed: Sep. 12, 2019

(65) Prior Publication Data

US 2020/0102417 A1    Apr. 2, 2020

(30) Foreign Application Priority Data

Sep. 27, 2018 (JP) .............................. JP2018-181896

(51) Int. Cl.
| | | |
|---|---|---|
| *C08G 18/38* | (2006.01) | |
| *C08G 18/24* | (2006.01) | |
| *C08G 18/40* | (2006.01) | |
| *C08G 18/44* | (2006.01) | |
| *C08G 18/48* | (2006.01) | |

(Continued)

(52) U.S. Cl.
CPC ....... *C08G 18/3893* (2013.01); *C08G 18/242* (2013.01); *C08G 18/3812* (2013.01); *C08G 18/4018* (2013.01); *C08G 18/44* (2013.01); *C08G 18/4825* (2013.01); *C08G 18/6666* (2013.01); *C08G 18/755* (2013.01); *C08J 5/18* (2013.01); *C08J 2375/04* (2013.01)

(58) Field of Classification Search
None
See application file for complete search history.

(56) References Cited

U.S. PATENT DOCUMENTS 6,313,335 B1 * 11/2001 Roberts .............. C08G 18/0823
428/391
2015/0368453 A1   12/2015 Wada et al.
(Continued)

FOREIGN PATENT DOCUMENTS

| EP | 3 354 670 A1 | 8/2018 |
|---|---|---|
| JP | 2004-033468 A | 2/2004 |

(Continued)

OTHER PUBLICATIONS

Dec. 1, 2020 Office Action issued in Korean Patent Application No. 10-2019-0119886.

(Continued)

*Primary Examiner* — Jeffrey D Washville
(74) *Attorney, Agent, or Firm* — Oliff PLC

(57) ABSTRACT

A stretchable film includes, in a stacked form: a polyurethane film containing a repeating unit having a fluorine atom; and a polyurethane film containing a repeating unit having a silicon atom. At least one surface of the stretchable film is made of the polyurethane film containing a repeating unit having a fluorine atom. Thus, provided are: a stretchable film having excellent stretchability and strength, with the film surface having excellent water repellency; and a method for forming the stretchable film.

7 Claims, 3 Drawing Sheets

(51) Int. Cl.
*C08G 18/66* (2006.01)
*C08G 18/75* (2006.01)
*C08J 5/18* (2006.01)

(56) References Cited

U.S. PATENT DOCUMENTS

2018/0094164 A1 4/2018 Ito et al.
2018/0134860 A1 5/2018 Hatakeyama et al.
2018/0215876 A1 8/2018 Hatakeyama et al.

FOREIGN PATENT DOCUMENTS

| JP | 2012-152725 A | 8/2012 |
| JP | 2018-053193 A | 4/2018 |
| JP | 2018-123304 A | 8/2018 |
| WO | 2014/104074 A1 | 7/2014 |

OTHER PUBLICATIONS

Feb. 26, 2020 Extended European Search Report issued in European Patent Application No. 19200162.6.

* cited by examiner

[FIG. 1]
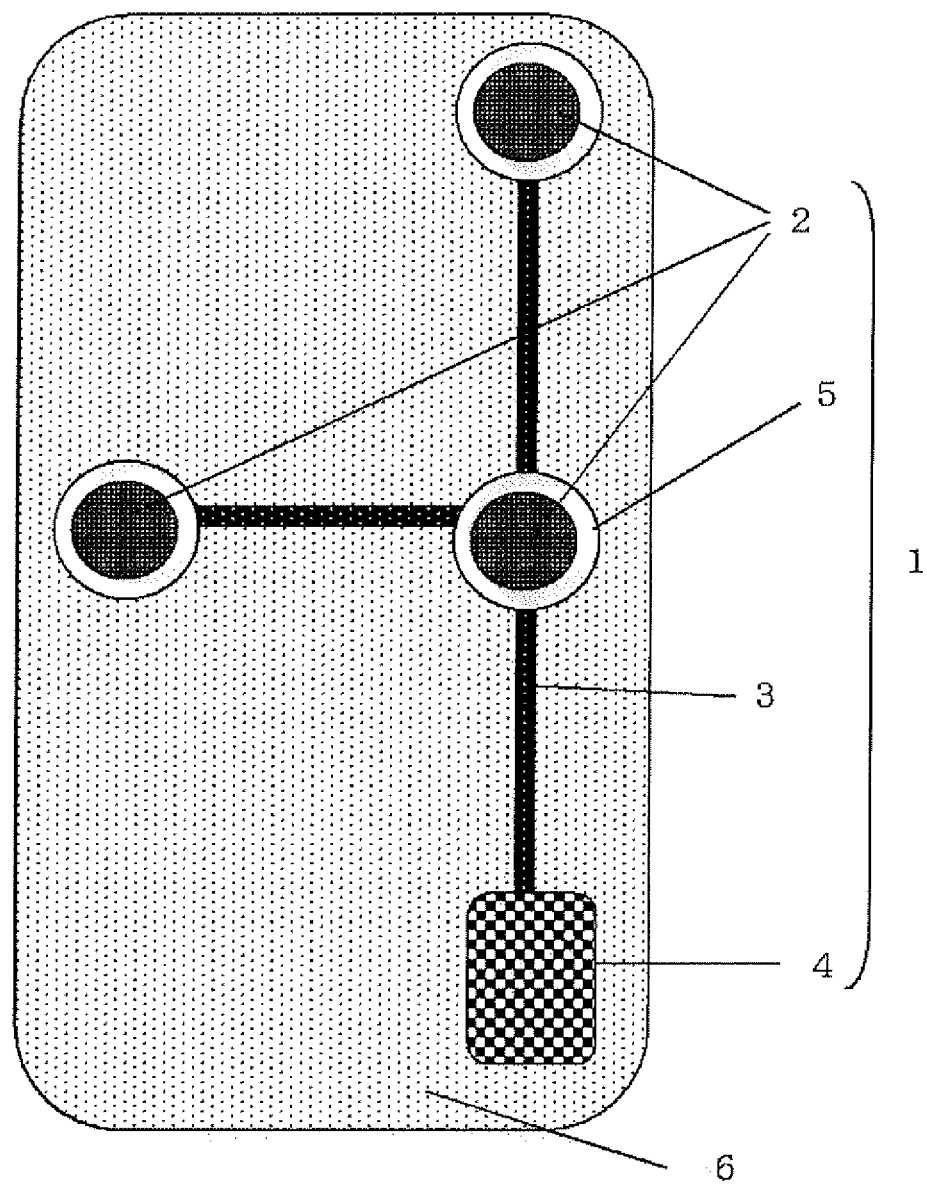

[FIG. 2]
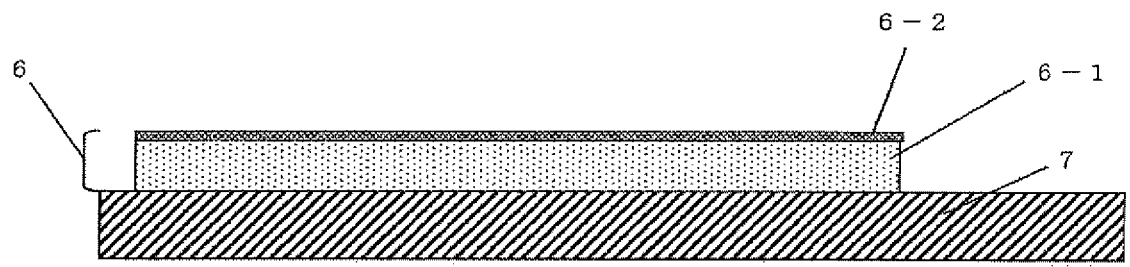
[FIG. 3]
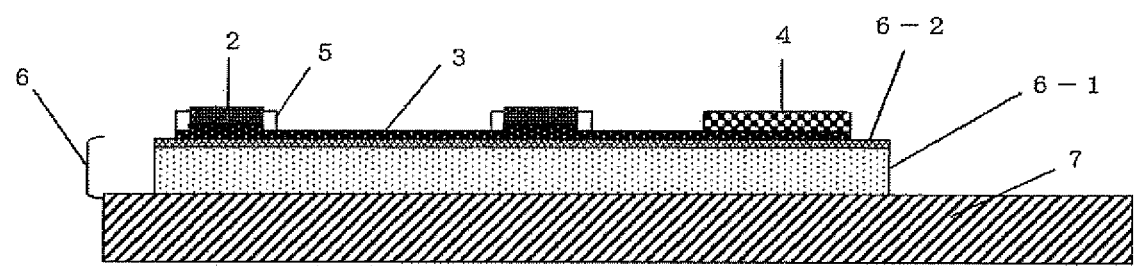
[FIG. 4]
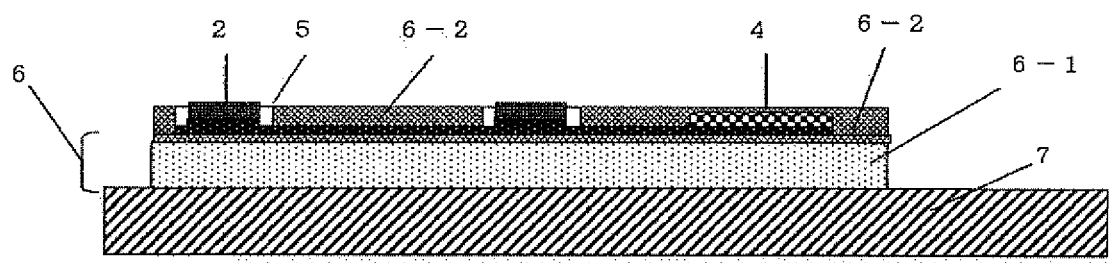
[FIG. 5]
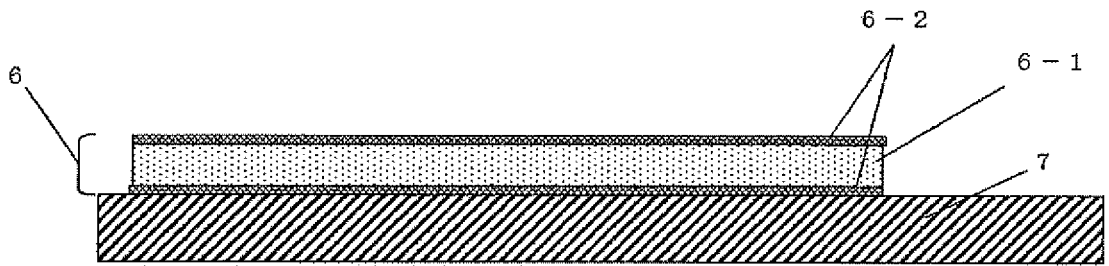

[FIG. 6]
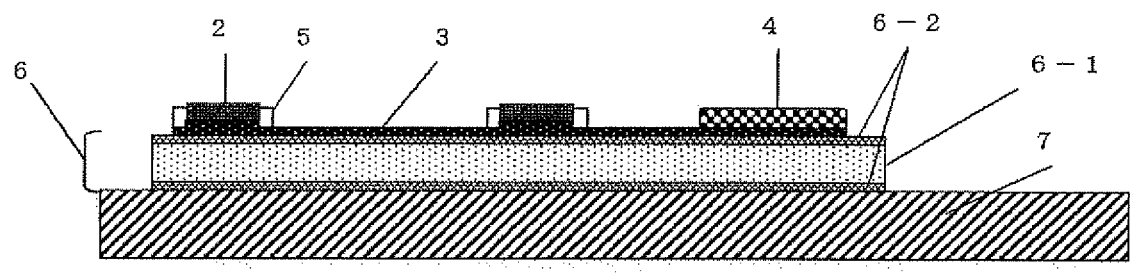
[FIG. 7]
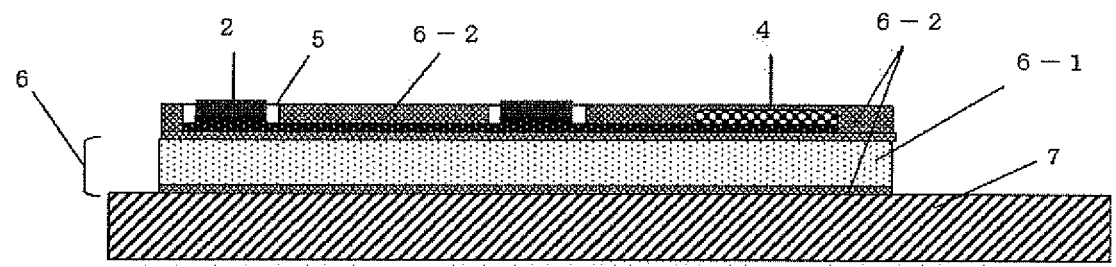

STRETCHABLE FILM AND METHOD FOR FORMING STRETCHABLE FILM

TECHNICAL FIELD

The present invention relates to a stretchable film having all of stretchability, strength, and water repellency, and a method for forming the stretchable film.

BACKGROUND ART

A recent growing popularity of Internet of Things (IoT) has accelerated the development of such major wearable devices as watches and glasses that allow for Internet access. Even in the fields of medicine and sports, wearable devices for constantly monitoring the user's physical state are increasingly demanded, and such technological development is expected to be further encouraged.

One typical wearable device is attached to the human body of users or stretchable cloth closely attached to the body to constantly monitor the state of physical conditions. The wearable device normally includes a bio-electrode for detecting an electric signal transmitted from a body, wires for sending the electric signal to a sensor, a semiconductor chip serving as a sensor, and a battery, as well as an adhesive pad to be attached to the skin. Patent Document 1 describes detailed structures of a bio-electrode, a wiring part surrounding the bio-electrode, and an adhesive pad. The wearable device disclosed in Patent Document 1 includes a bio-electrode, a silicone-based adhesive film disposed around the bio-electrode, a sensor device, and a meandering-shaped stretchable silver wiring part coated with a stretchable urethane film between the bio-electrode and the sensor device, which are connected by the wiring part.

The urethane film has high stretchability and strength, and excellent mechanical properties as a film coated on a stretchable wiring part. Unfortunately, the hydrolysis inherent in the urethane film lowers its stretchability and strength. Meanwhile, the silicone film has no such hydrolytic nature, but the strength inherently remains low.

Hence, the use of silicone urethane polymers, whose main chain has both a urethane bond and a siloxane bond, has been examined. Advantageously, cured products of the silicone urethane polymer are characterized by higher strength than single silicone and less hydrolytic nature than single polyurethane. Such cured products unfortunately fail to achieve the strength equivalent to single polyurethane and the water repellency equivalent to single silicone, and the strength and water repellency are in-betweens of those inherent in silicone and polyurethane.

It has been reported that polyurethane having siloxane in a side chain improves the water repellency without lowering the strength which would otherwise occur due to the siloxane introduction (Patent Document 2). The presence of the siloxane in the side chain enhances the hydrogen bonds of the urethane bonds facing in opposite directions, as if the urethane bonds are pushed aside by the siloxane, thereby counterbalancing the lowered strength due to the siloxane introduction.

Highly stretchable urethane films tend to have a sticky surface to the touch. The sticky surface causes difficulty in separating films that are put together, and failure in printing since the film is stuck to a printing plate when screen printing is performed on this film. On the other hand, silicone films have high release characteristics and are prevented from sticking with each other thereby. However, due to the lower strength of silicone, thin silicone films easily break in stretching. When screen printing is performed on a silicone film, failure in printing due to sticking with a printing plate can be avoided, but the lower adhesion to ink causes peeling off of the cured ink. This comes from high release characteristics of a silicone surface. On the other hand, urethane films have higher adhesion to ink and are prevented from peeling off of the cured ink.

Films using polyurethane with a silicone pendant have well balanced stretchability, strength, and water repellency, but have drawbacks of mutual sticking of the films or sticking to a printing plate in screen printing due to the sticky film surface.

Hence, a polyurethane compound having a fluorinated alkylene group in a main chain has been proposed. A urethane acrylate-containing material for nano-imprinting lithography has been proposed which takes advantage of the release characteristics of a fluorinated alkylene group (Patent Document 3). For use as a resist in nano-imprinting lithography, when a printing plate is released, the resist film needs to be smoothly peeled off from the printing plate without sticking to the printing plate. Since the surface of a polyurethane film having a fluorinated alkylene group in a main chain is not sticky, a printing plate is released favorably. Moreover, because of the high water repellency, a fluorinated alkylene group is used also for usage requiring water repellency like silicone urethane. Nevertheless, a polyurethane film having a fluorinated alkylene group in a main chain has a low strength.

As described above, it is desirable to develop a stretchable film having higher stretchability, strength, and water repellency without causing sticking of the surface, on which printing such as screen printing can be performed without peeling off of the printed ink.

CITATION LIST

Patent Literature

Patent Document 1: Japanese Patent Laid-Open Publication No. 2004-033468
Patent Document 2: Japanese Patent Laid-Open Publication No. 2018-123304
Patent Document 3: WO2014/104074

SUMMARY OF INVENTION

Technical Problem

Due to these backgrounds, it has been demanded to develop: a self-standing stretchable film having excellent stretchability and strength equivalent to those of polyurethane as well as excellent water repellency equivalent to that of silicone without causing mutual sticking of such stretchable films; and a method for forming the stretchable film.

In view of the circumstances, the present invention aims to provide: a stretchable film that has excellent stretchability and strength, with the film surface having excellent water repellency; and a method for forming the stretchable film.

Solution to Problem

To achieve the object, the present invention provides a stretchable film comprising, in a stacked form:
a polyurethane film containing a repeating unit having a fluorine atom; and
a polyurethane film containing a repeating unit having a silicon atom, wherein at least one surface of the stretchable film is made of the polyurethane film containing a repeating unit having a fluorine atom.

Such a stretchable film has excellent stretchability and strength, with the film surface having excellent water repellency.

The repeating unit having a silicon atom preferably has a silicon atom in a side chain.

Such a repeating unit having a silicon atom makes the stretchable film have higher strength and higher stretchability.

Preferably, the polyurethane film containing a repeating unit having a fluorine atom is a cured product of a composition containing a resin having a structure shown by the following general formula (1), and the polyurethane film containing a repeating unit having a silicon atom is a cured product of a composition containing a resin having a structure shown by the following general formula (2):

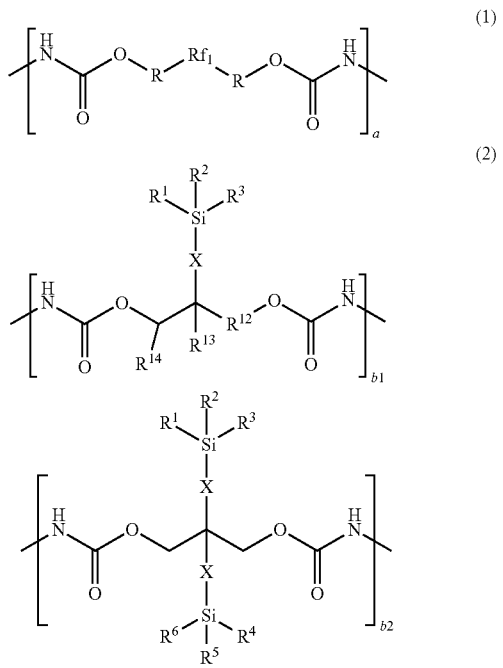

wherein $Rf_1$ represents a linear or branched alkylene group having 1 to 200 carbon atoms and at least one or more fluorine atoms, and optionally having an ether group; R's may be identical to or different from each other and each represent a single bond or a methylene group; $R^1$, $R^2$, $R^3$, $R^4$, $R^5$, and $R^6$ each represent a linear, branched, or cyclic alkyl group having 1 to 6 carbon atoms, a phenyl group, a 3,3,3-trifluoropropyl group, or a $-(OSiR^7R^8)_n-$ $OSiR^9R^{10}R^{11}$ group; $R^7$, $R^8$, $R^9$, $R^{10}$, and $R^{11}$ each represent a linear, branched, or cyclic alkyl group having 1 to 6 carbon atoms, a phenyl group, or a 3,3,3-trifluoropropyl group; "n" ranges from 0 to 100; $R^{12}$ represents a single bond, a methylene group, or an ethylene group; $R^{13}$ represents a hydrogen atom or a linear alkyl group having 1 to 4 carbon atoms; $R^{14}$ represents a hydrogen atom or a methyl group; X represents a linear or branched alkylene group having 3 to 8 carbon atoms and optionally containing an ether group; and "a", b1, and b2 are each the number of unit in one molecule and represent integers in ranges of $1 \leq a \leq 20$, $0 \leq b1 \leq 20$, $0 \leq b2 \leq 20$, and $1 \leq b1+b2 \leq 20$.

Such compositions make it possible to sufficiently obtain the effects of the present invention.

More preferably, the polyurethane film containing a repeating unit having a fluorine atom is a cured product of a composition containing a resin having a structure shown by the following general formula (3), and the polyurethane film containing a repeating unit having a silicon atom is a cured product of a composition containing a resin having a structure shown by the following general formula (4):

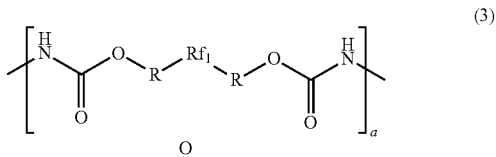

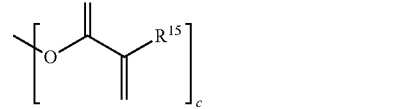

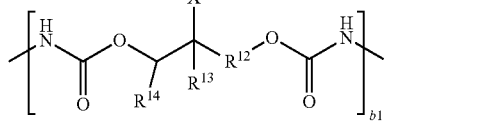

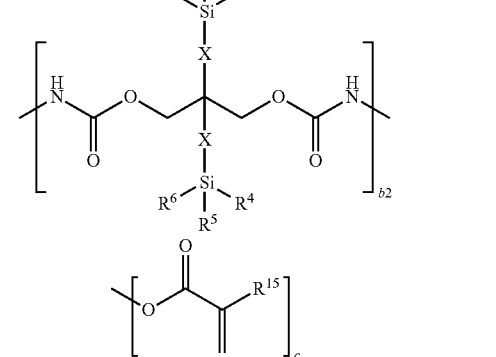

wherein $Rf_1$ represents a linear or branched alkylene group having 1 to 200 carbon atoms and at least one or more fluorine atoms, and optionally having an ether group; R's may be identical to or different from each other and each represent a single bond or a methylene group; $R^1$, $R^2$, $R^3$, $R^4$, $R^5$, and $R^6$ each represent a linear, branched, or cyclic alkyl group having 1 to 6 carbon atoms, a phenyl group, a 3,3,3-trifluoropropyl group, or a $-(OSiR^7R^8)_n-$ $OSiR^9R^{10}R^{11}$ group; $R^7$, $R^8$, $R^9$, $R^{10}$, and $R^{11}$ each represent a linear, branched, or cyclic alkyl group having 1 to 6 carbon atoms, a phenyl group, or a 3,3,3-trifluoropropyl group; "n" ranges from 0 to 100; $R^{12}$ represents a single bond, a methylene group, or an ethylene group; $R^{13}$ represents a hydrogen atom or a linear alkyl group having 1 to 4 carbon atoms; $R^{14}$ represents a hydrogen atom or a methyl group; X represents a linear or branched alkylene group having 3 to 8 carbon atoms and optionally containing an ether group; "a", b1, and b2 are each the number of unit in one molecule and represent integers in ranges of $1 \leq a \leq 20$, $0 \leq b1 \leq 120$, $0 \leq b2 \leq 20$, and $1 \leq b1+b2 \leq 20$; $R^{15}$ represents a hydrogen atom or a methyl group; and "c" is the number of unit in one molecule and represents an integer in a range of $1 \leq c \leq 4$.

With such compositions, the effects of the present invention can be more sufficiently obtained.

The stretchable film preferably has a stretching property in a range of 20 to 1000% in a tensile test stipulated according to JIS K 6251.

With such a stretching property, the inventive stretchable film can be particularly favorably used as a coating film of a stretchable wiring.

The stretchable film is preferably used as a film in contact with a stretchable conductive wiring.

The inventive stretchable film is particularly suitable for such a use.

The present invention also provides a method for forming a stretchable film, comprising:

curing a composition containing a resin having a structure shown by the following general formula (2) by heating and/or light irradiation to form a polyurethane film containing a repeating unit having a silicon atom; and curing a composition containing a resin having a structure shown by the following general formula (1) by heating and/or light irradiation to stack a polyurethane film containing a repeating unit having a fluorine atom on a surface of the polyurethane film containing a repeating unit having a silicon atom:

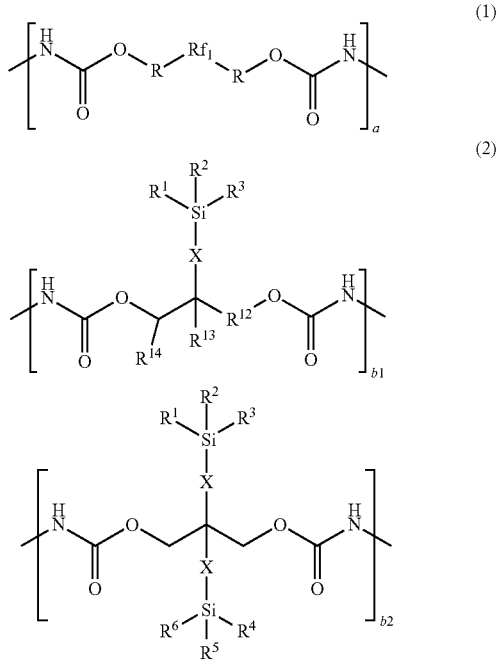

wherein $Rf_1$ represents a linear or branched alkylene group having 1 to 200 carbon atoms and at least one or more fluorine atoms, and optionally having an ether group; R's may be identical to or different from each other and each represent a single bond or a methylene group; $R^1$, $R^2$, $R^3$, $R^4$, $R^5$, and $R^6$ each represent a linear, branched, or cyclic alkyl group having 1 to 6 carbon atoms, a phenyl group, a 3,3,3-trifluoropropyl group, or a —(OSiR$^7$R$^8$)$_n$—OSiR$^9$R$^{10}$R$^{11}$ group; $R^7$, $R^8$, $R^9$, $R^{10}$, and $R^{11}$ each represent a linear, branched, or cyclic alkyl group having 1 to 6 carbon atoms, a phenyl group, or a 3,3,3-trifluoropropyl group; "n" ranges from 0 to 100; $R^{12}$ represents a single bond, a methylene group, or an ethylene group; $R^{13}$ represents a hydrogen atom or a linear alkyl group having 1 to 4 carbon atoms; $R^{14}$ represents a hydrogen atom or a methyl group; X represents a linear or branched alkylene group having 3 to 8 carbon atoms and optionally containing an ether group; and "a", b1, and b2 are each the number of unit in one molecule and represent integers in ranges of $1 \leq a \leq 20$, $0 \leq b1 \leq 20$, $0 \leq b2 \leq 20$, and $1 \leq b1+b2 \leq 20$.

The inventive method for forming a stretchable film like this makes it possible to easily form a stretchable film having excellent stretchability and strength, with the film surface having excellent water repellency.

Advantageous Effects of Invention

As described above, the structure of the inventive stretchable film can be, for example, a composite film whose surface side is covered with a fluorourethane film having low stretchability and low strength but high water repellency and free from sticking, and whose inside is a side-chain type silicone urethane film which is sticky but has high strength and high stretchability. This composite film is a stretchable film which has excellent stretchability and strength equivalent to those of polyurethane; the film surface has excellent water repellency superior to that of silicone and is free from sticking. The inventive stretchable film like this is brought into contact with a conductive wiring or used to coat one side or both sides of a conductive wiring to give a stretchable wiring film composite that is not only excellent in stretchability and strength but also free from sticking on the surface and has favorable texture and high water repellency. Accordingly, the inventive stretchable film is usable particularly favorably as a stretchable film capable of mounting not only a wiring part for connecting a bio-electrode to a sensor but also such a bio-electrode, a sensor, and a device in a wearable device, or also as a film for encapsulate these. Because of the high electronegativity of fluorine, the surface of fluorourethane tends to be negatively charged. Since human skin is positively charged, the film coated with fluorourethane on the surface is attached to the skin by itself. Since a bio-electrode needs to be attached to the skin, a bio-electrode is formed on such a stretchable film so that the film and the bio-electrode mounted thereon can be attached to the skin without an adhesive agent. Additionally, the inventive method for forming a stretchable film makes it possible to easily form a stretchable film as described above.

BRIEF DESCRIPTION OF DRAWINGS

FIG. 1 is an exemplary schematic illustration of an electrocardiograph formed on a stretchable film of the present invention, which is viewed from a bio-electrode side;

FIG. 2 is a cross-sectional view showing an example of a state where the inventive stretchable film is formed on a substrate;

FIG. 3 is a cross-sectional view showing an example of a state where an electrocardiograph is formed on the inventive stretchable film;

FIG. 4 is a cross-sectional view showing an example of a state where a wiring and a center device in FIG. 3 are covered with a fluorourethane layer;

FIG. 5 is a cross-sectional view showing an example of a state where both surfaces of a silicone-pendant type urethane layer are covered with the fluorourethane layer;

FIG. 6 is a cross-sectional view showing an example of a state where an electrocardiograph is formed on the stretchable film in FIG. 5; and FIG. 7 is a cross-sectional view showing an example of a state where a wiring and a center device in FIG. 6 are covered with the fluorourethane layer.

DESCRIPTION OF EMBODIMENTS

As has been described above, polyurethane has sufficient stretchability and strength but has such drawbacks that the water repellency is low, and that the strength and stretchability are lowered by hydrolysis. Silicone has high water repellency but low strength, while a fluorinated polymer has higher water repellency than silicone but has a drawback of poor stretchability. Silicone urethane having both silicone and urethane in the main chain and also fluorourethane having both fluorine and urethane in the main chain have high water repellency and non-sticky film surfaces but have insufficient strength. A film based on urethane having a silicone-pendant side chain has a drawback of surface stickiness although it has high strength, high stretchability, and high water repellency. Under this circumstance, it has been desired to develop: a stretchable film having excellent stretchability and strength equivalent to those of polyurethane, as well as excellent water repellency and surface hardness equivalent to or superior to those of silicone, with the film surface having sufficiently high strength; and a method for forming the stretchable film.

Accordingly, the present inventors have diligently investigated to solve the foregoing subject. As a result, the inventors have found that an excellent stretchable film is obtained by forming a layer based on fluorourethane, which has high water repellency and non-sticky surface, on a layer based on silicone side-chain type urethane, which has high stretchability, high strength, and high water repellency but sticky surface, to make a composite film that has higher stretchability, higher strength, and higher water repellency without surface stickiness so as not to stick such stretchable films with each other. This film is particularly suitable as a stretchable substrate film to form a stretchable wiring in a wearable device. These findings have led to the completion of the present invention.

Thus, the present invention is a stretchable film comprising, in a stacked form: a polyurethane film containing a repeating unit having a fluorine atom; and a polyurethane film containing a repeating unit having a silicon atom, wherein at least one surface of the stretchable film is made of the polyurethane film containing a repeating unit having a fluorine atom.

Hereinafter, the present invention will be described in detail. However, the present invention is not limited thereto.

<Polyurethane Film Containing Repeating Unit Having Fluorine Atom>

The polyurethane film containing a repeating unit having a fluorine atom (fluorourethane layer) used in the present invention is preferably a cured product of a composition (a composition of a stretchable film material) containing a resin (fluorine-containing polyurethane, fluorourethane resin) having a structure shown by the following general formula (1):

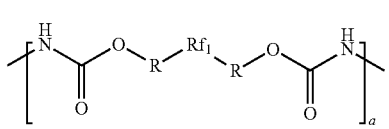

(1)

where $Rf_1$ represents a linear or branched alkylene group having 1 to 200 carbon atoms and at least one or more fluorine atoms, and optionally having an ether group; R's may be identical to or different from each other and each represent a single bond or a methylene group; and "a" represents an integer in a range of $1 \leq a \leq 20$.

Moreover, the resin having a structure shown by the general formula (1) (fluorine-containing polyurethane) more preferably has a structure containing a (meth)acrylate group at a terminal thereof as shown by the following general formula (3):

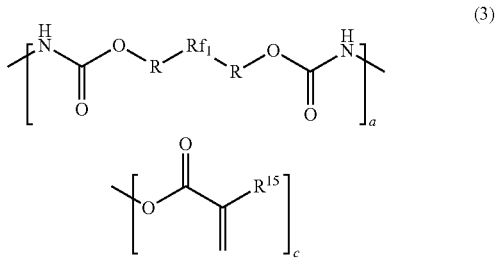

(3)

where $Rf_1$, R, and "a" are as defined above; $R^{15}$ represents a hydrogen atom or a methyl group; and "c" is the number of unit in one molecule and represents an integer in a range of $1 \leq c \leq 4$.

The resins having the structures (repeating units) shown by the general formulae (1), (3) can be obtained by reacting a diol compound shown by the following general formula (1)' with a compound having an isocyanate group (hereinafter, also referred to as an isocyanate compound).

(1)'

In the formula, $Rf_1$ and R is as defined above.

Specific examples of the diol compound shown by the general formula (1)' (a diol compound having a fluoroalkyl group or a fluoroalkylene group) include the following.

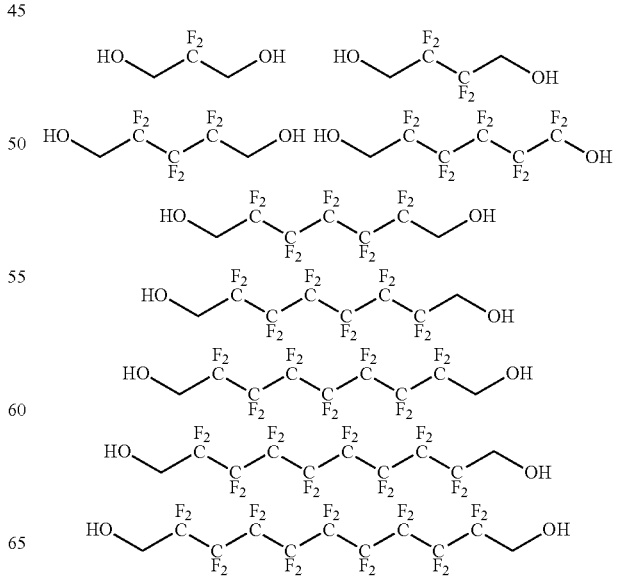

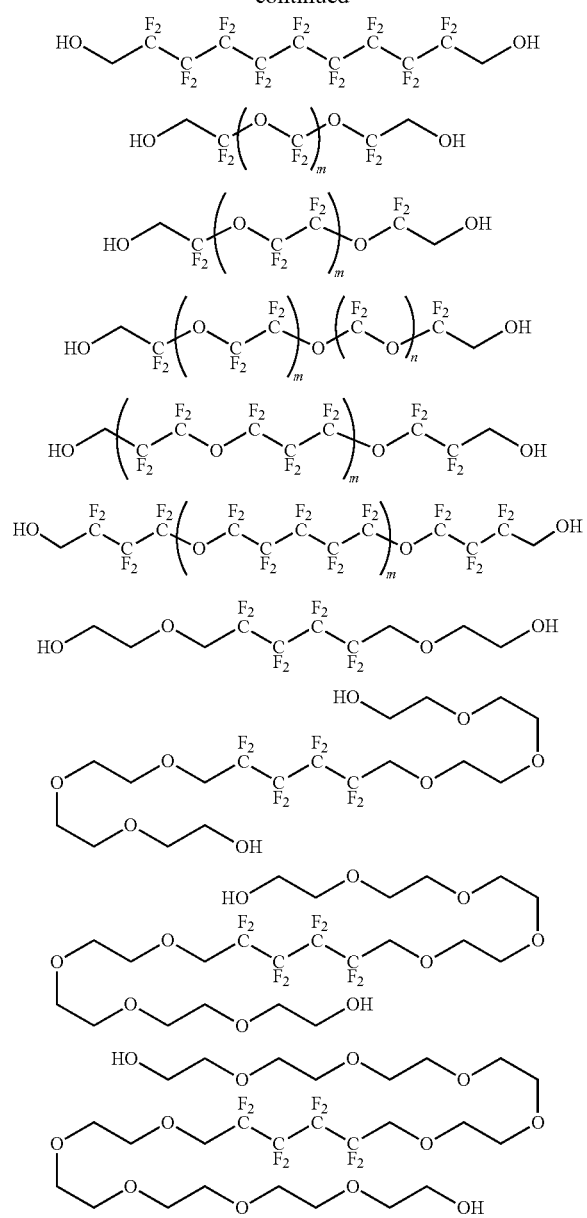
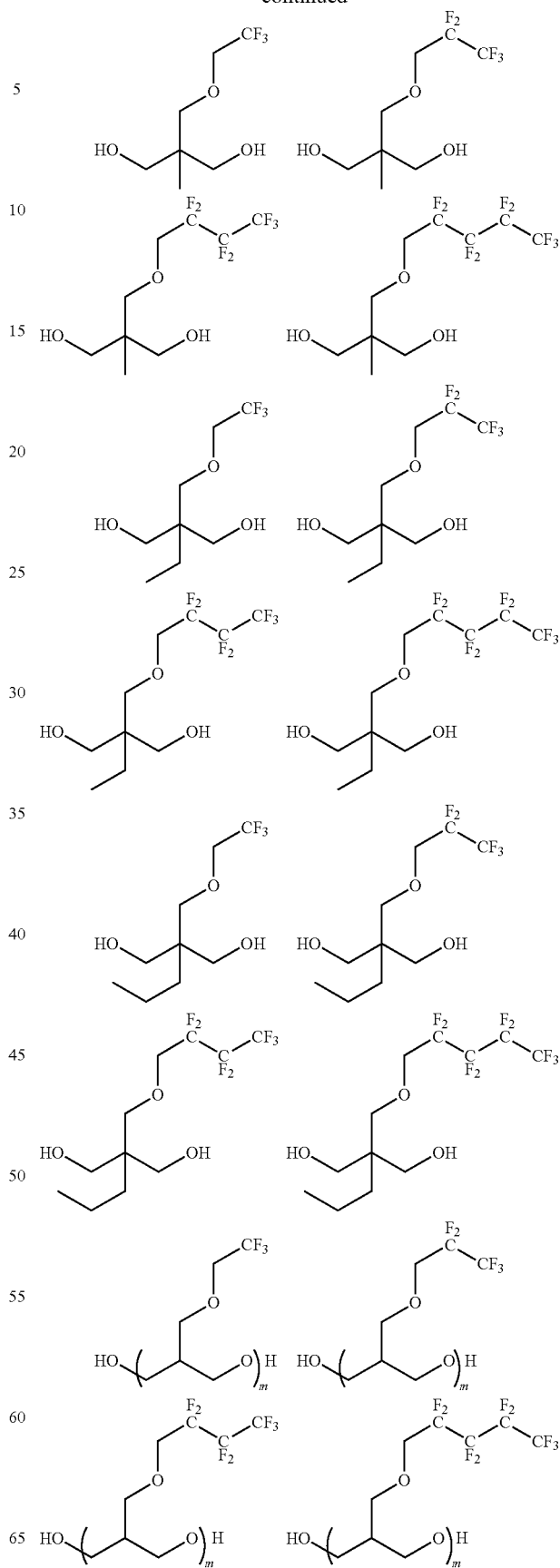
Here, "m" and "n" each range from 0 to 20.

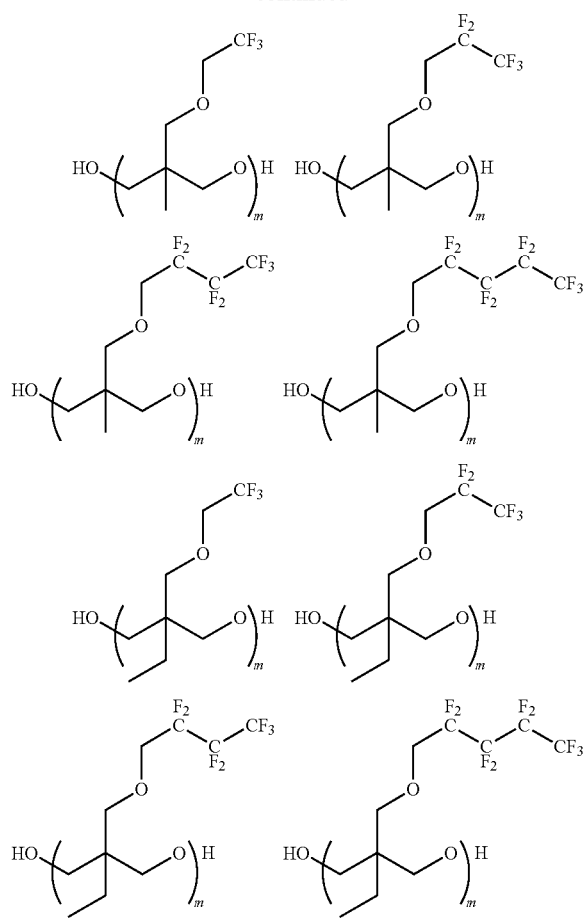
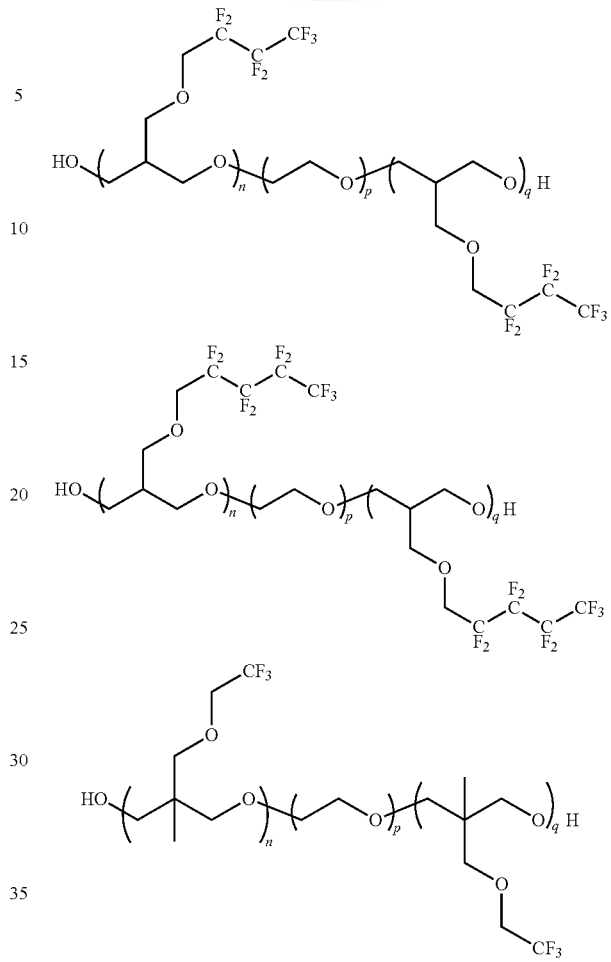
Here, "m" ranges from 0 to 20.
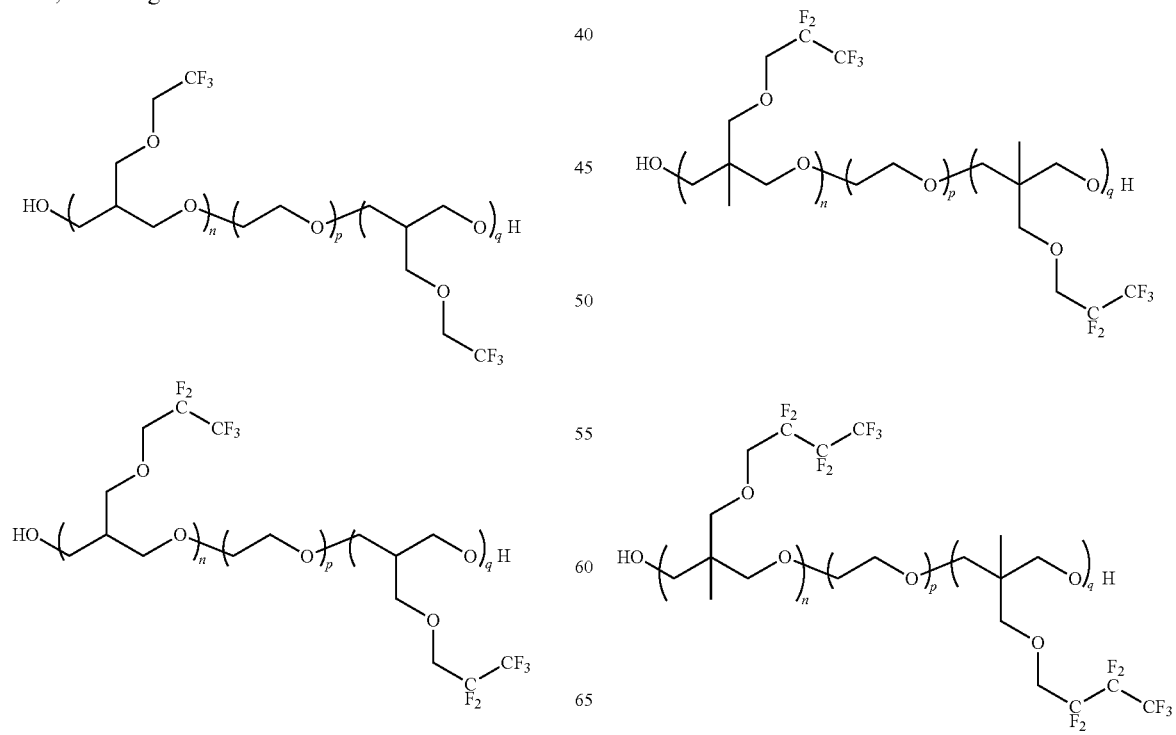

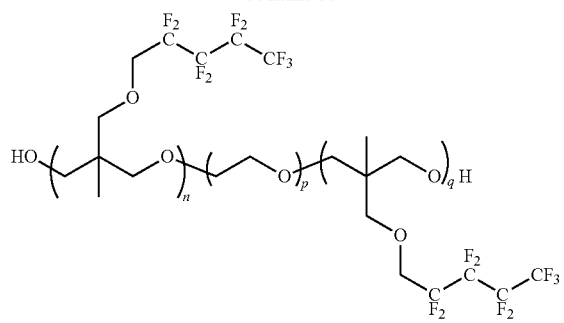
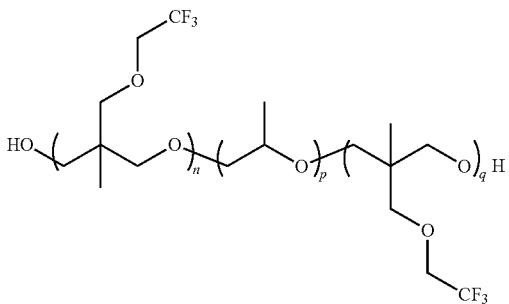
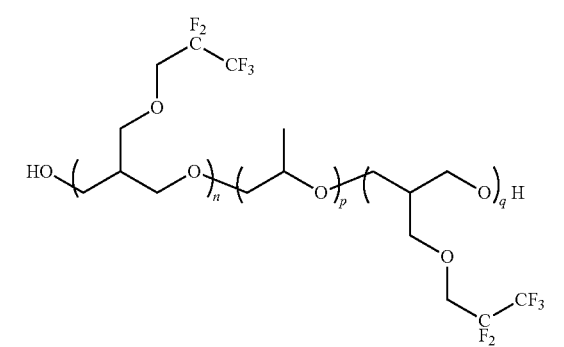
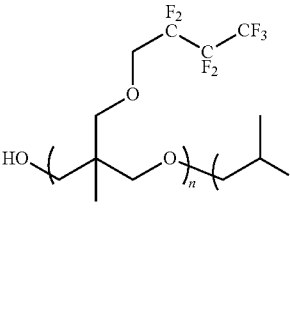
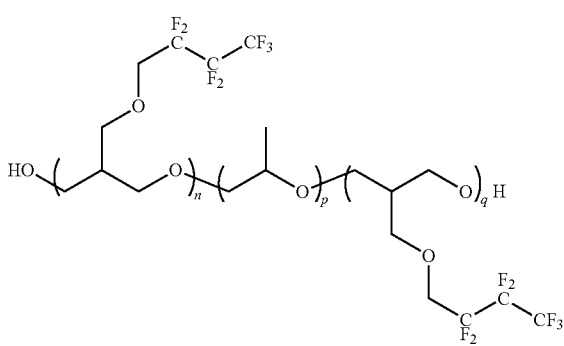
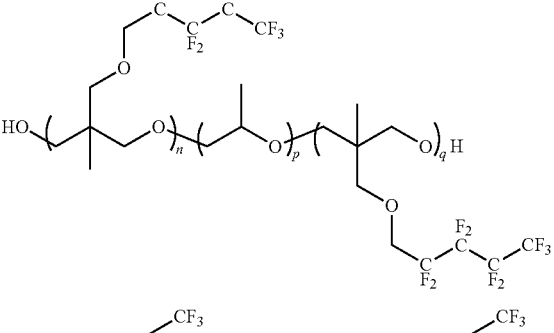
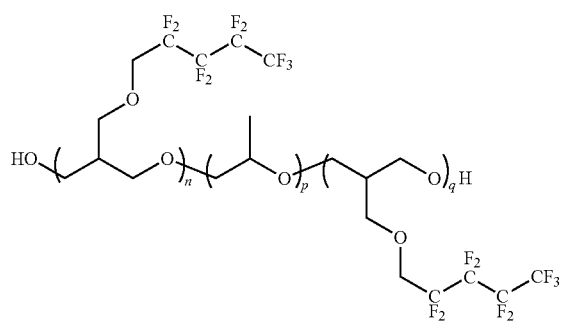
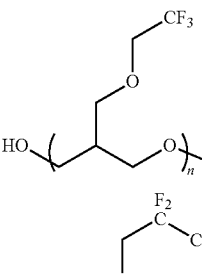
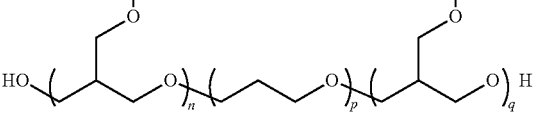

-continued
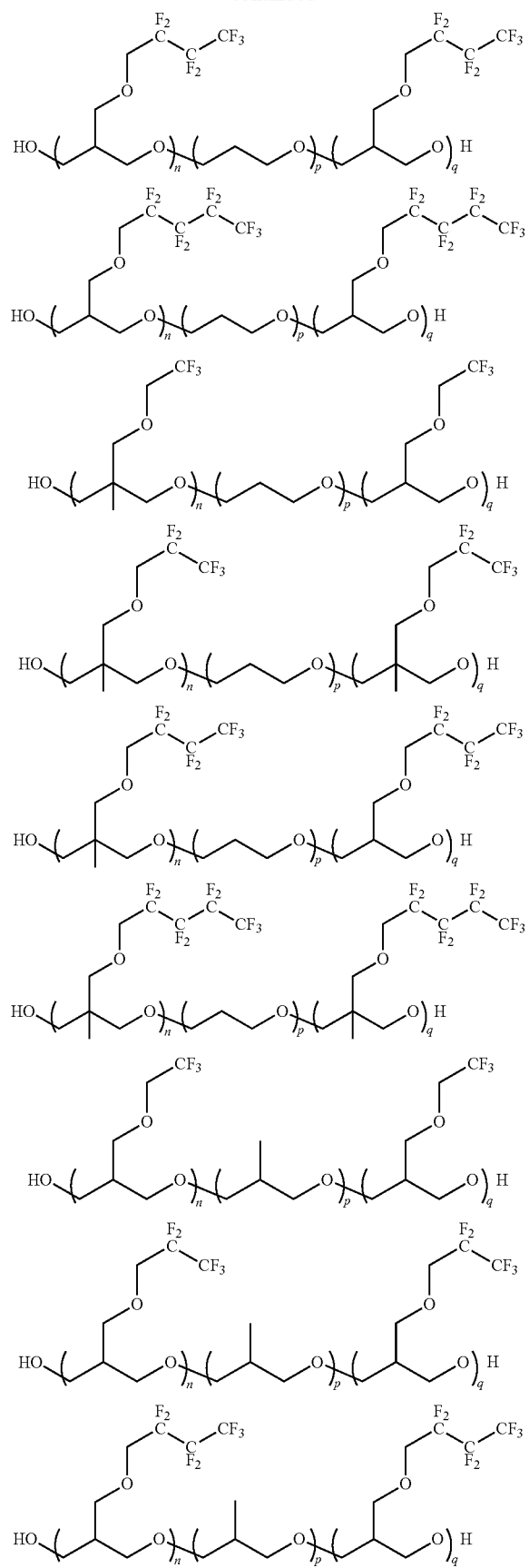
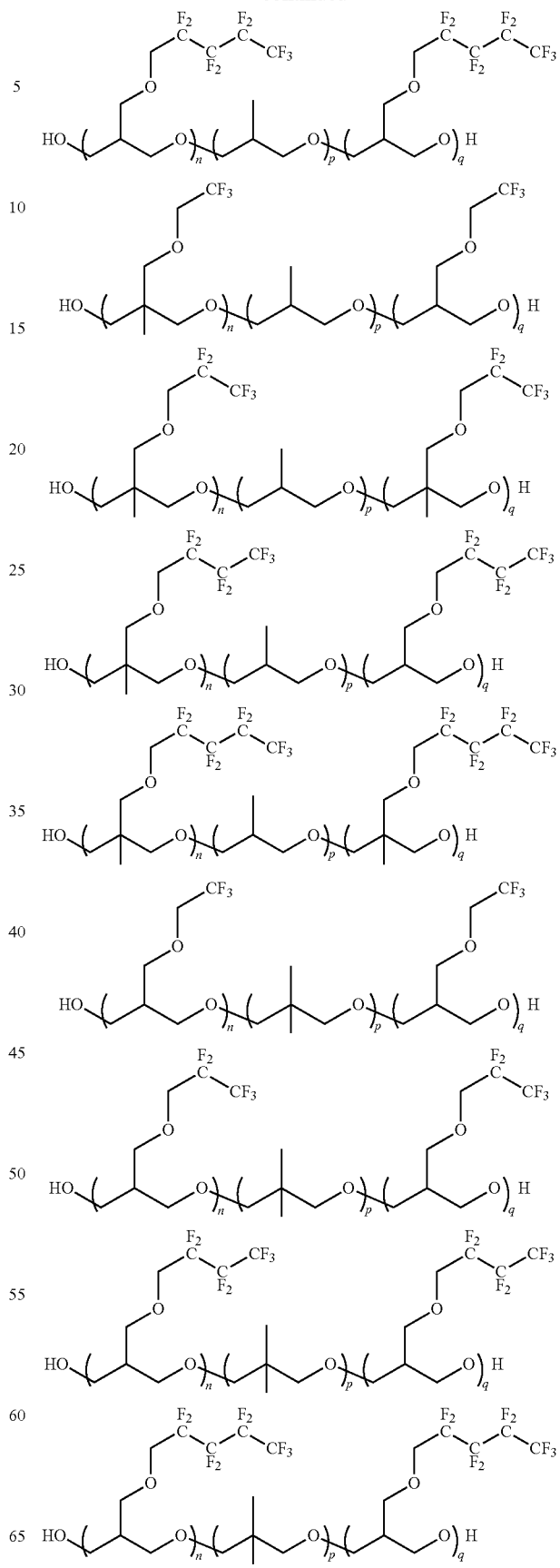

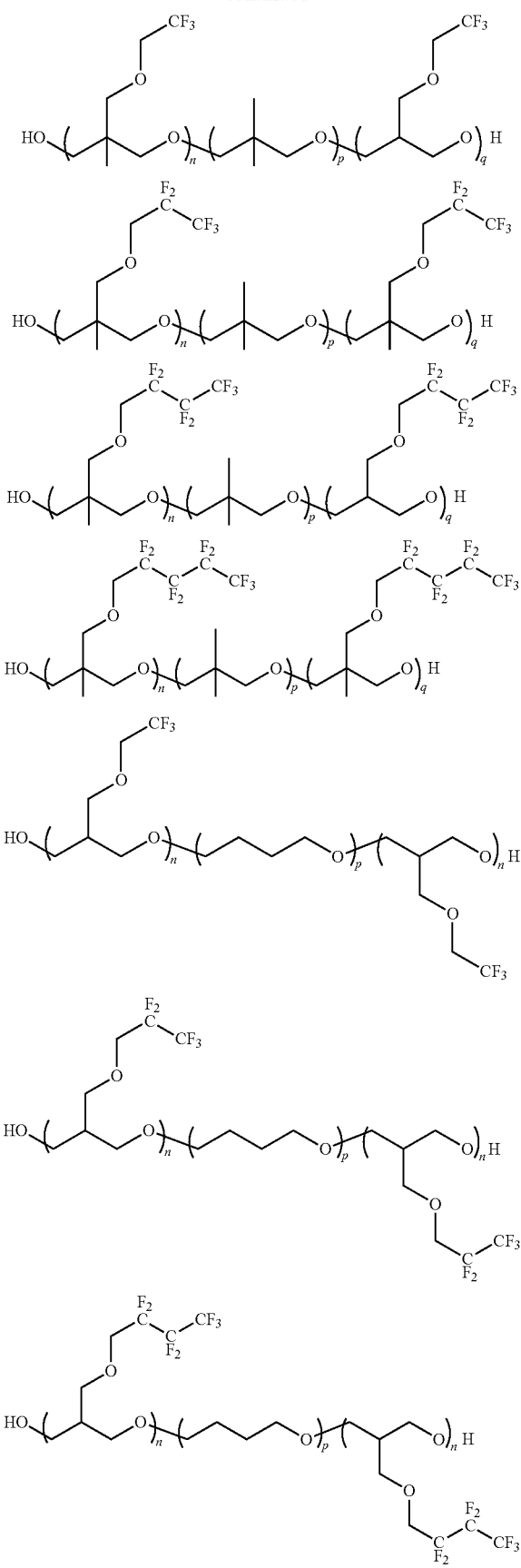
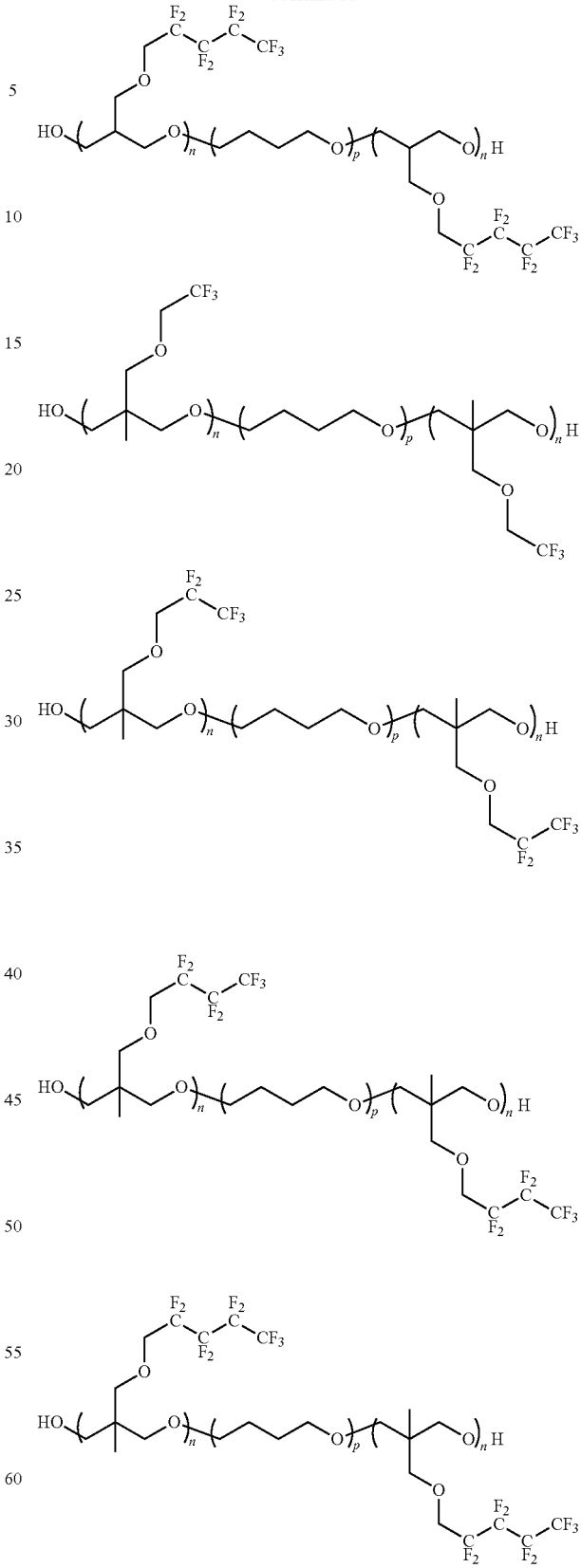
Here, "n" and "q" each range from 1 to 20 satisfying 2≤n+q≤20 and 1≤p≤40.

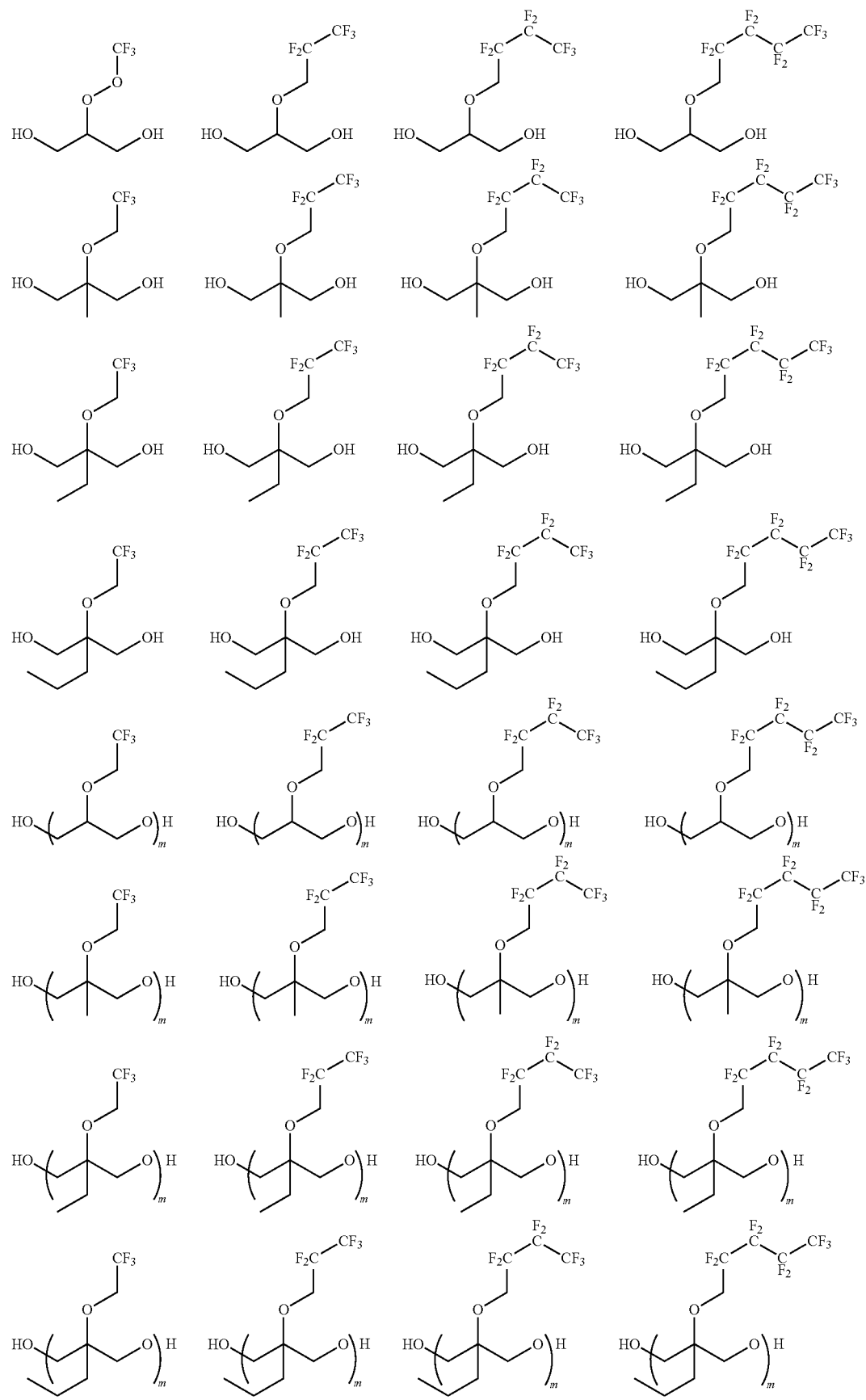

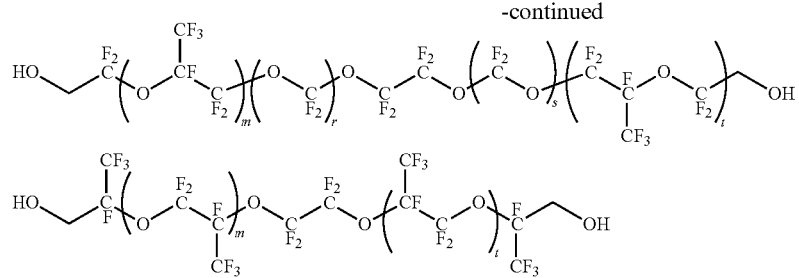
Here, "m", "r", "s", and "t" each range from 0 to 20.
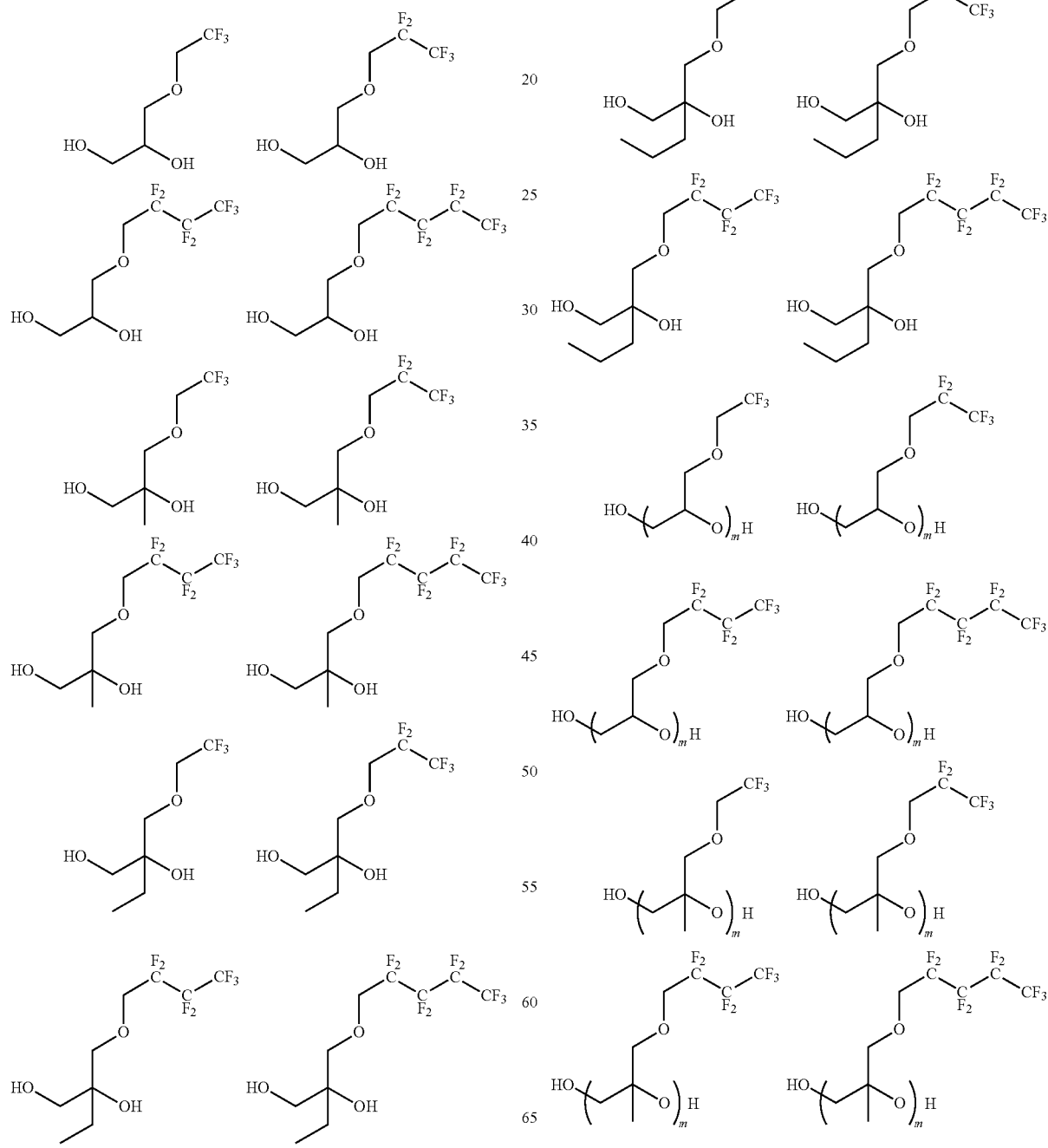

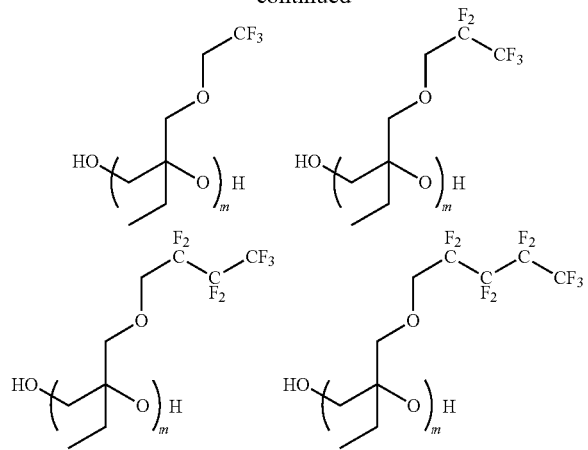

Here, "m" ranges from 0 to 20.

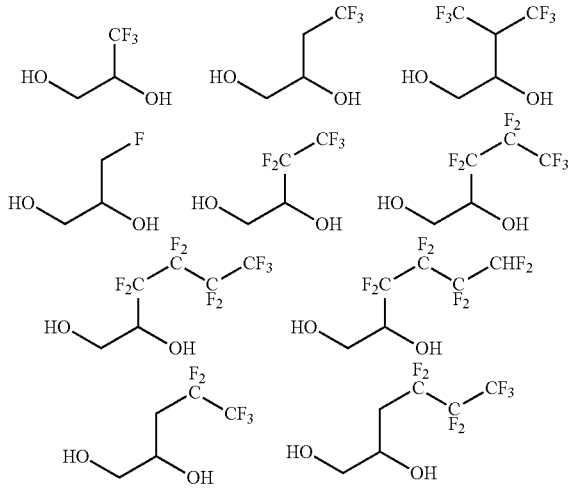

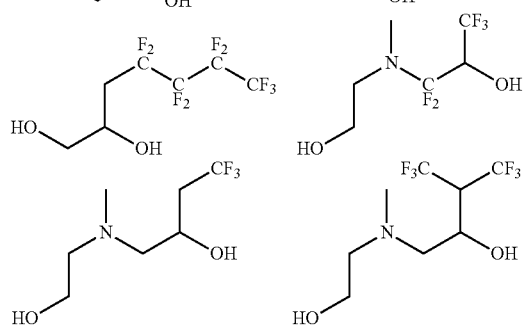

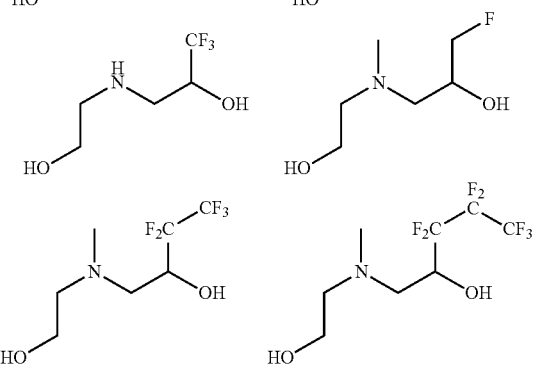

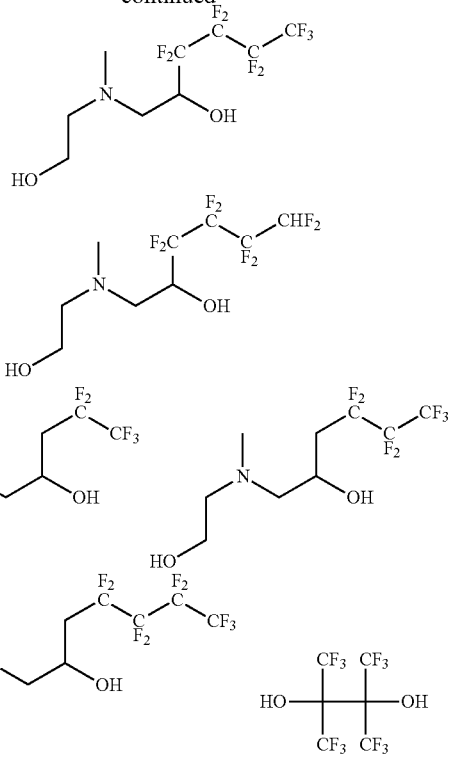

<Polyurethane Film Containing Repeating Unit Having Silicon Atom>

In the polyurethane film containing a repeating unit having a silicon atom (silicone-pendant type urethane layer) used in the present invention, the repeating unit having a silicon atom preferably has a silicon atom in a side chain. Moreover, the silicone-pendant type urethane layer is more preferably a cured product of a composition containing a resin (silicone urethane resin) having a structure shown by the following general formula (2):

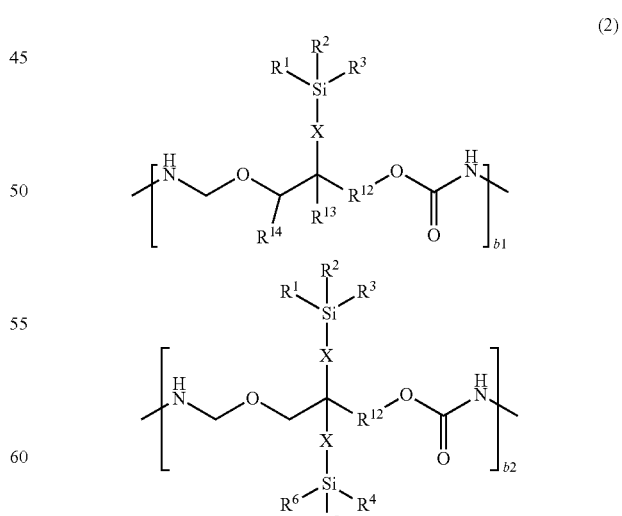

(2)

where $R^1$, $R^2$, $R^3$, $R^4$, $R^5$, and $R^6$ each represent a linear, branched, or cyclic alkyl group having 1 to 6 carbon atoms, a phenyl group, a 3,3,3-trifluoropropyl group, or a —(OSiR$^7$R$^8$)$_n$—OSiR$^9$R$^{10}$R$^{11}$ group; R$^7$, R$^8$, R$^9$, R$^{10}$, and R$^{11}$ each represent a linear, branched, or cyclic alkyl group having 1 to 6 carbon atoms, a phenyl group, or a 3,3,3-trifluoropropyl group; "n" ranges from 0 to 100; R$^{12}$ represents a single bond, a methylene group, or an ethylene group; R$^{13}$ represents a hydrogen atom or a linear alkyl group having 1 to 4 carbon atoms; R$^{14}$ represents a hydrogen atom or a methyl group; X represents a linear or branched alkylene group having 3 to 8 carbon atoms and optionally containing an ether group; and b1 and b2 are each the number of unit in one molecule and represent integers in ranges of 0≤b1≤20, 0≤b2≤20, and 1≤b1+b2≤20.

Moreover, the resin having a structure shown by the general formula (2) (silicone-pendant type urethane) further preferably has a structure containing a (meth)acrylate group at a terminal thereof as shown by the following general formula (4):

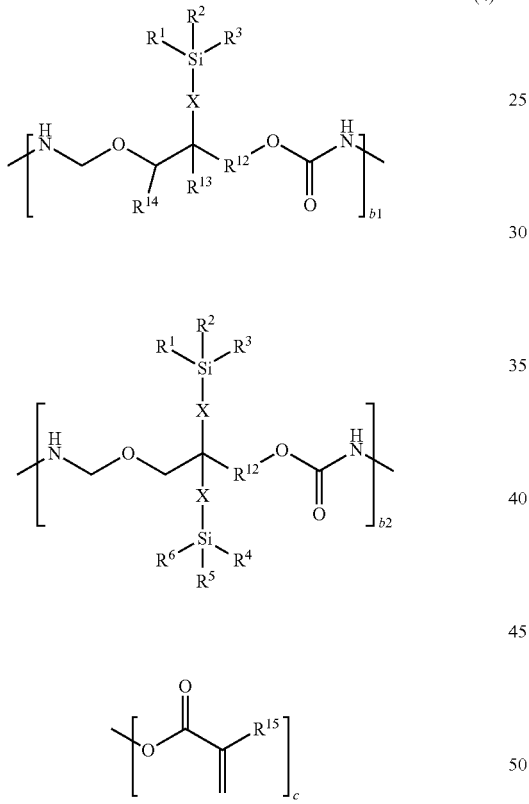

where R$^1$ to R$^6$, R$^{12}$ to R$^{14}$, b1, b2, and X are as defined above; R$^{15}$ represents a hydrogen atom or a methyl group; and "c" is the number of unit in one molecule and represents an integer in a range of 1≤c≤4.

The resins having the structures (repeating units) shown by the general formulae (2), (4) each can be obtained by reacting an isocyanate compound with a diol compound(s) shown by general formula(e) (2)-1' and/or (2)-2', which will be described below.

Examples of the diol compound for forming the repeating unit b1 in the structure shown by the general formula (2) include a compound shown by the following general formula (2)-1':

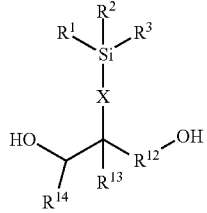

where R$^1$ to R$^3$, R$^{12}$ to R$^{14}$, and X are as defined above.

The diol compound having a short chain silicone pendant shown by the general formula (2)-1' can be obtained, for example, by reaction of glycerin monoallyl ether and a short-chain siloxane compound having a SiH group under a platinum catalyst. Specific examples of the diol compound shown by the general formula (2)-1' include the following.

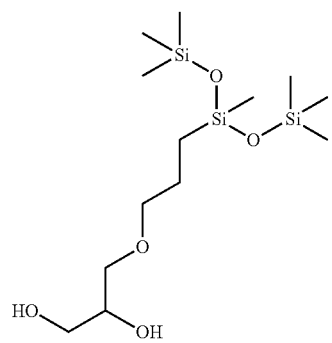

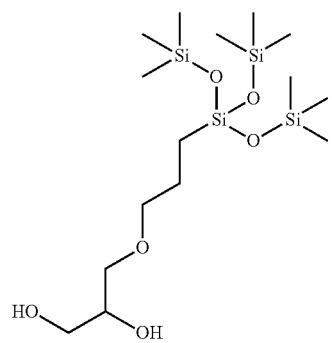

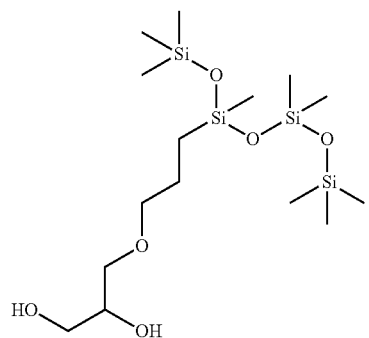

-continued
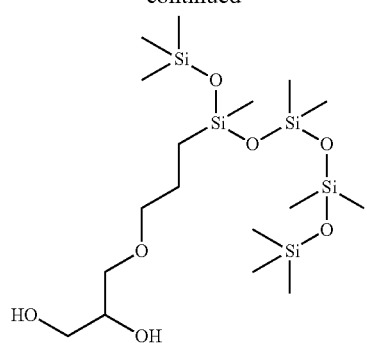
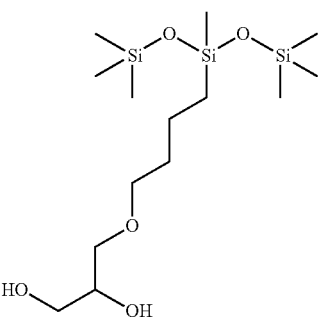
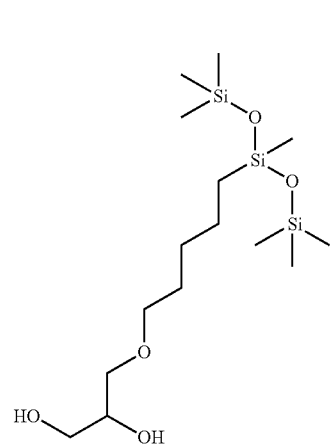
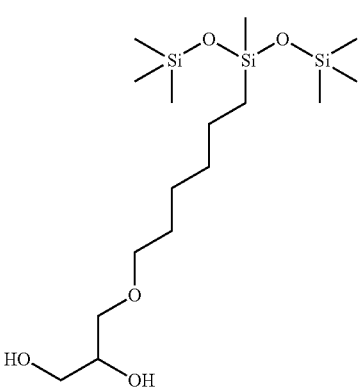
-continued
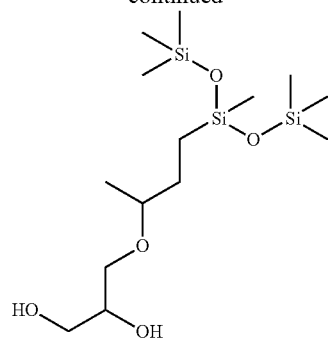
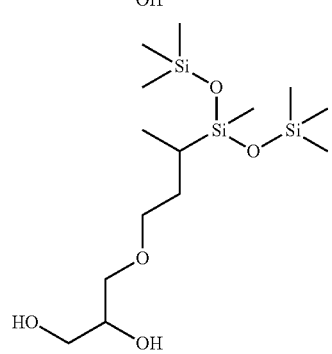
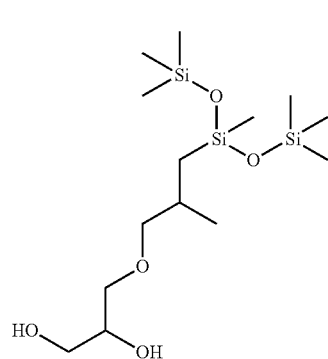
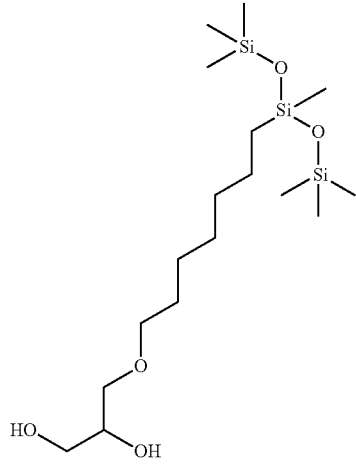

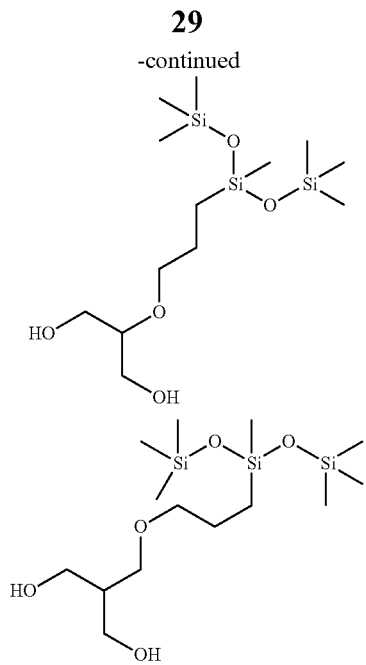

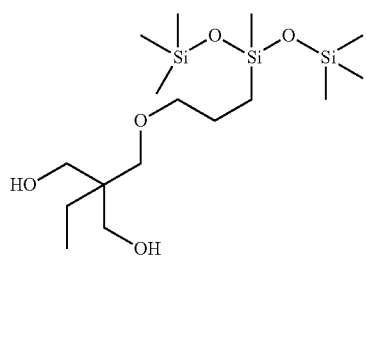

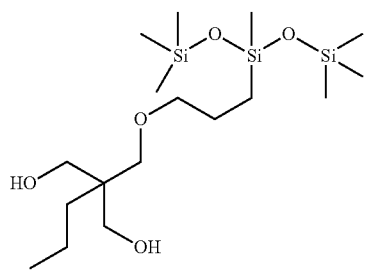

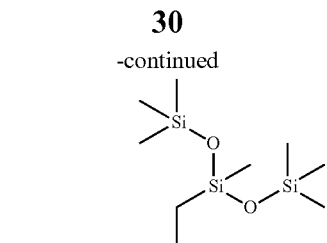

Moreover, in the present invention, examples of the diol compound for forming the repeating unit b2 in the structure shown by the general formula (2) include a compound shown by the following general formula (2)-2':

$$\text{(2)-2'}$$

where $R^1$ to $R^6$ and X are as defined above.

The diol compound having a short chain silicone pendant shown by the general formula (2)-2' can be obtained, for example, by reaction of a dihydroxy dialkenyl compound and a short-chain siloxane compound having a SiH group under a platinum catalyst. Specific examples of the diol compound shown by the general formula (2)-2' include the following.

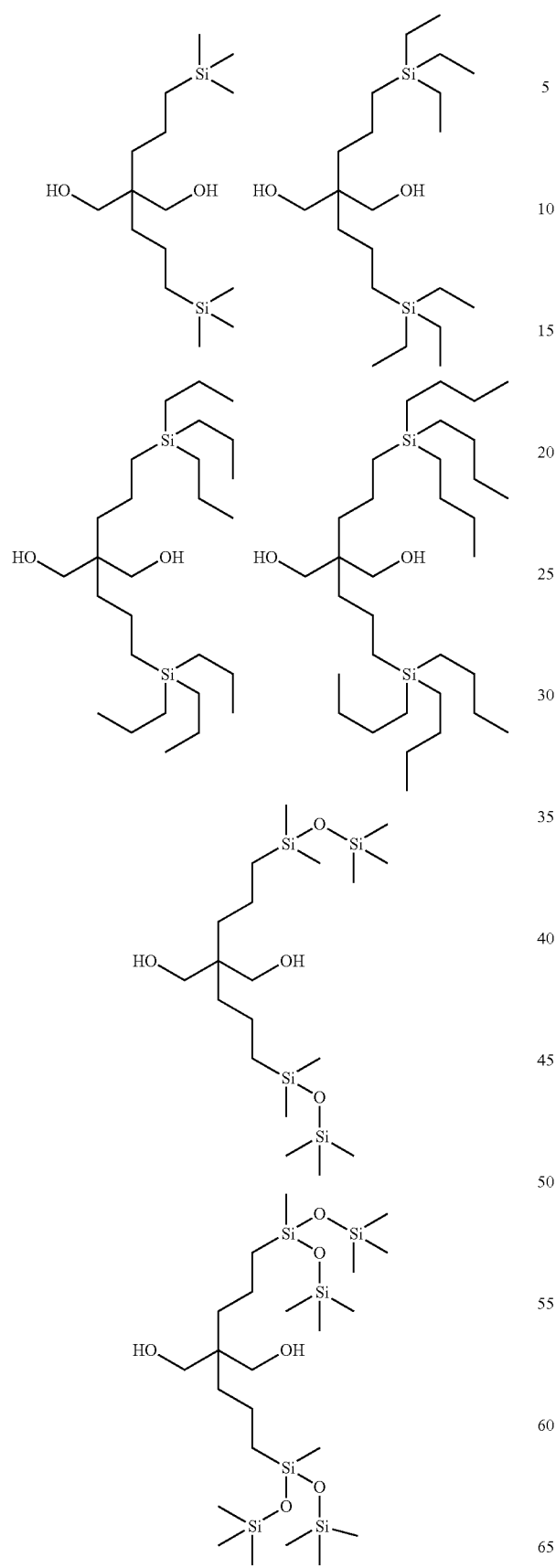
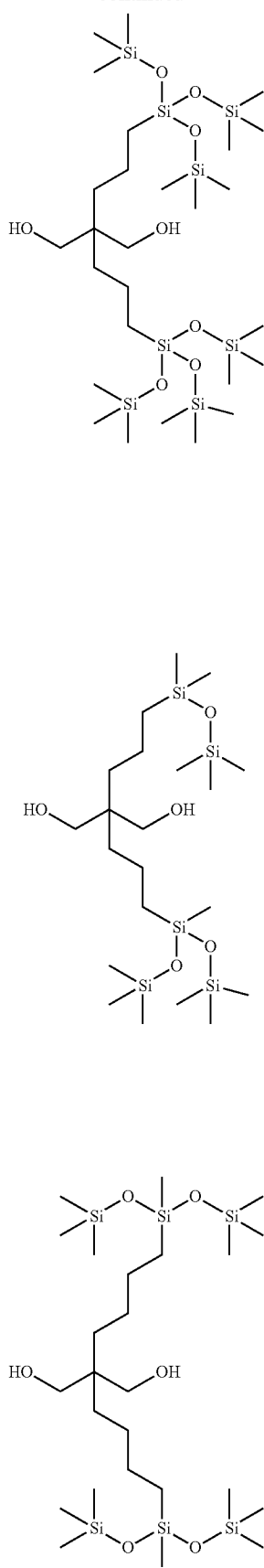

33
-continued
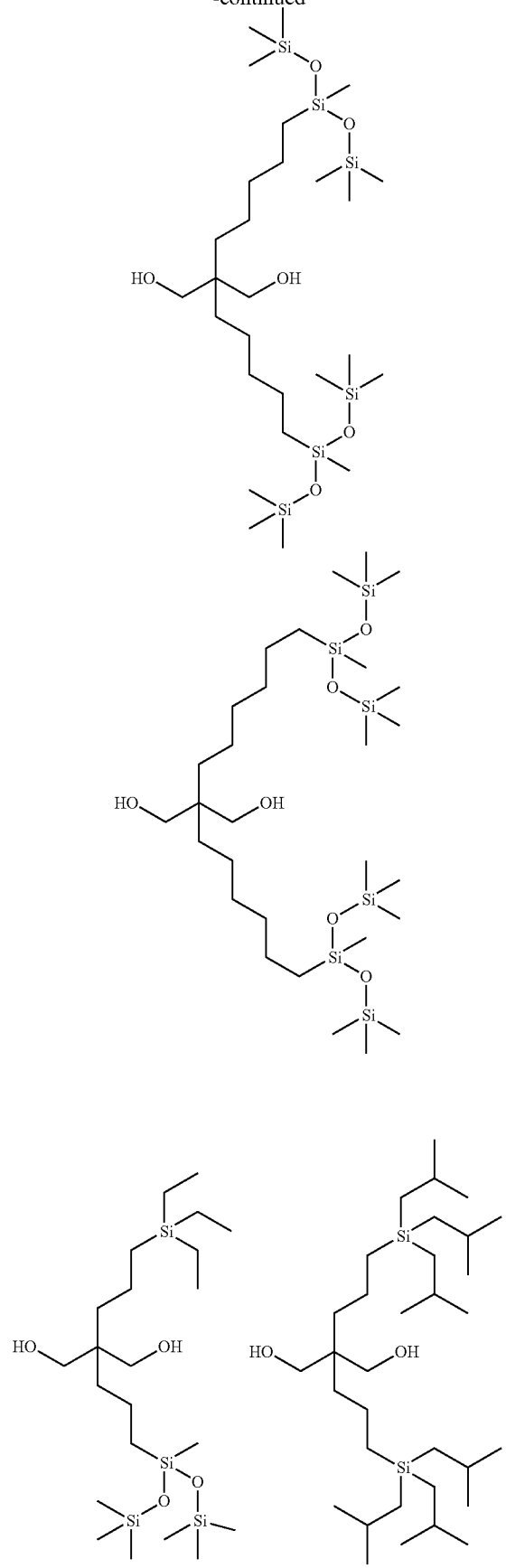
34
-continued
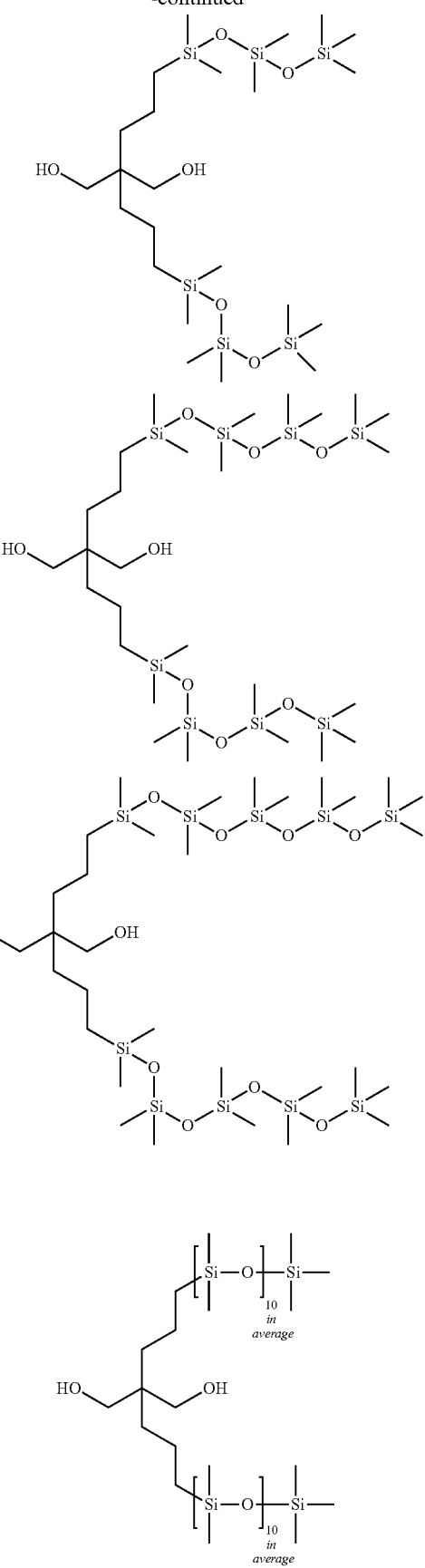

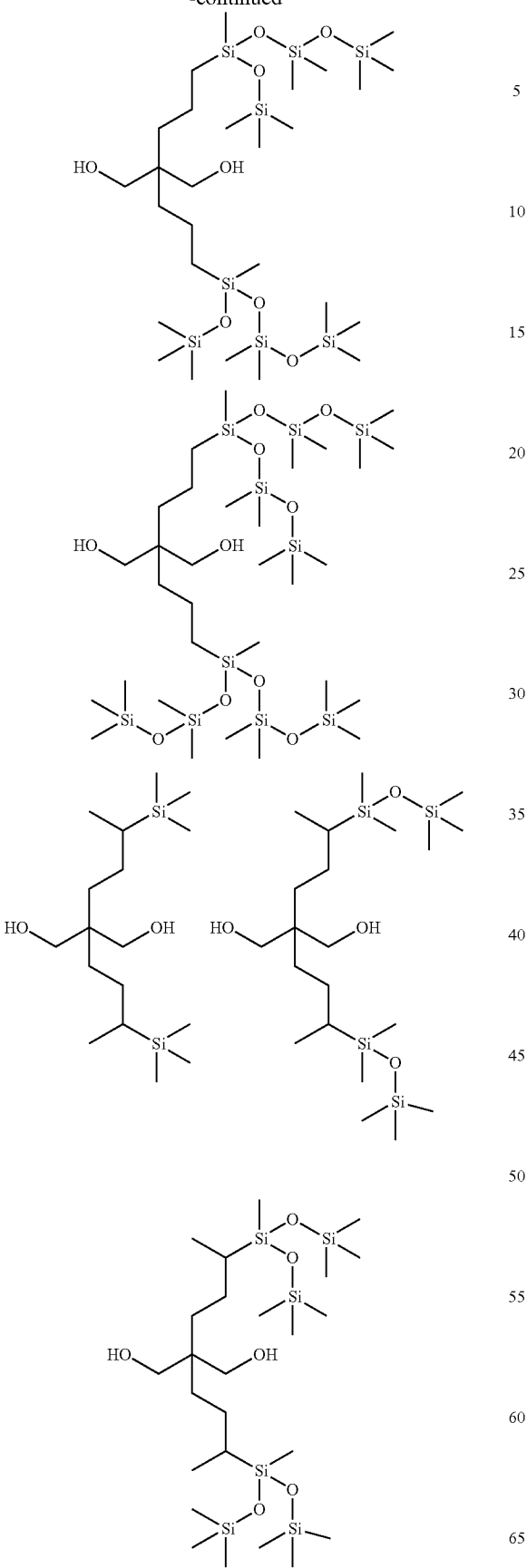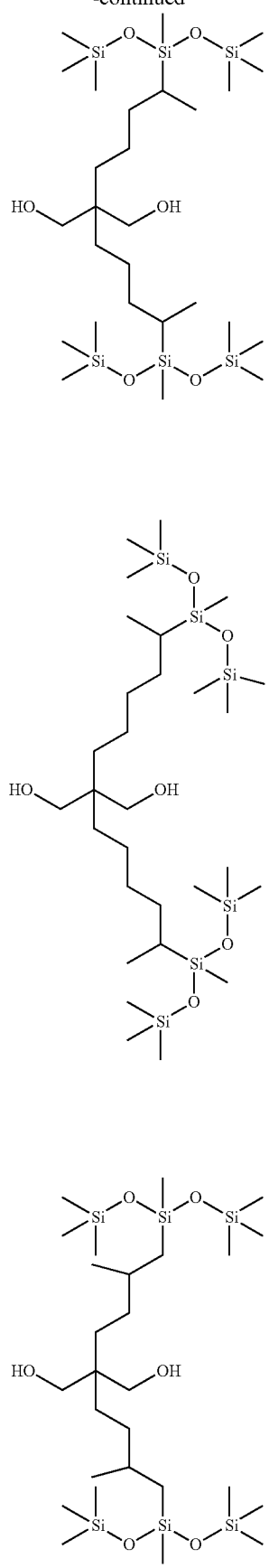

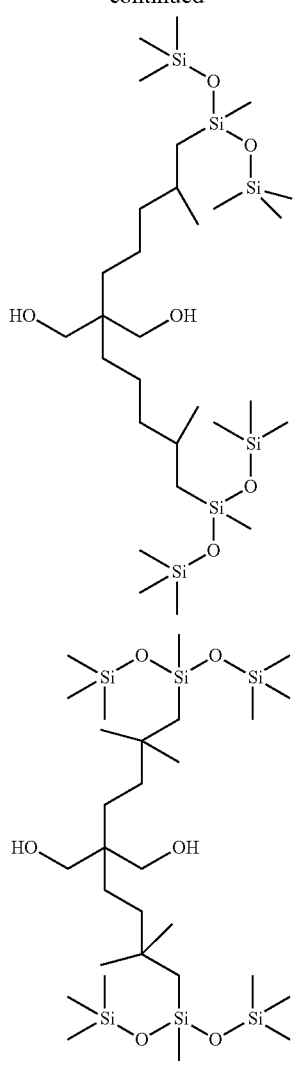
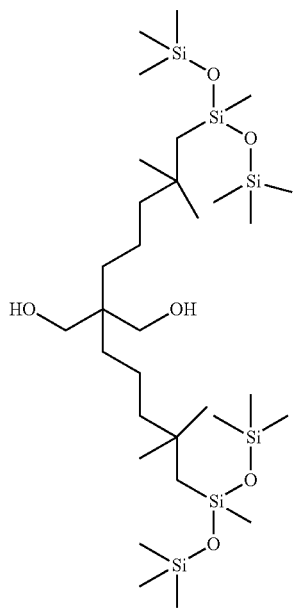
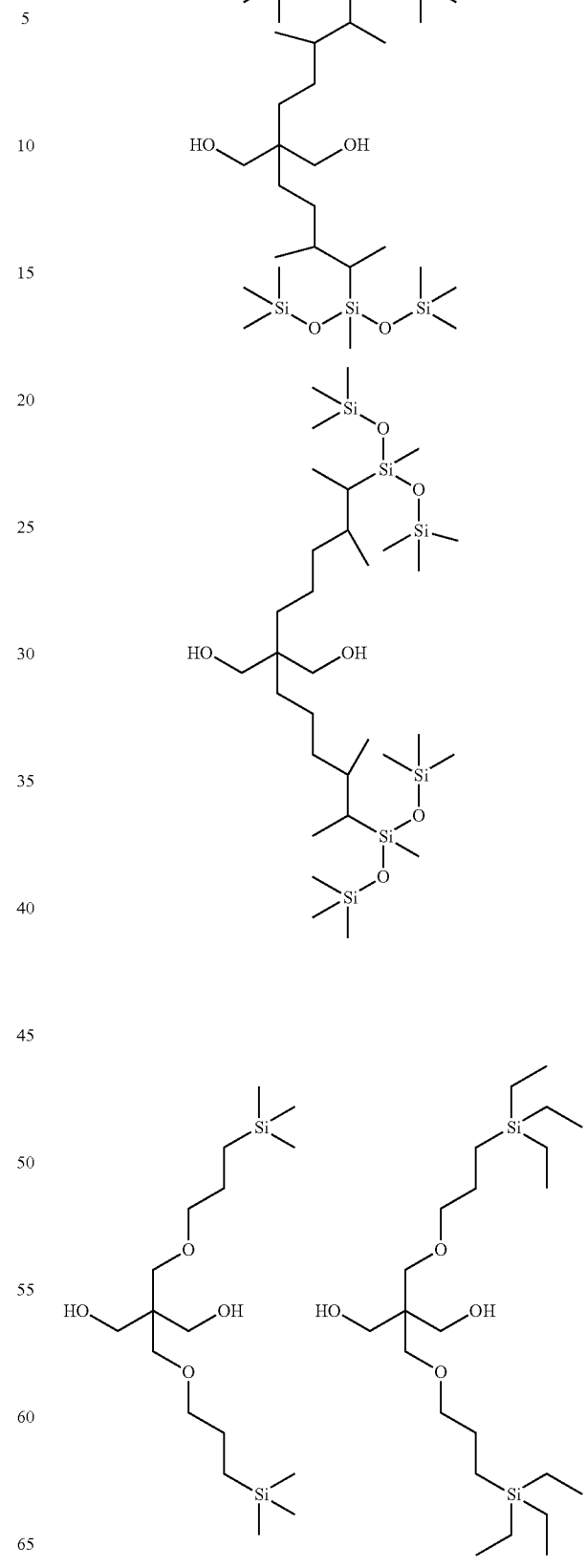

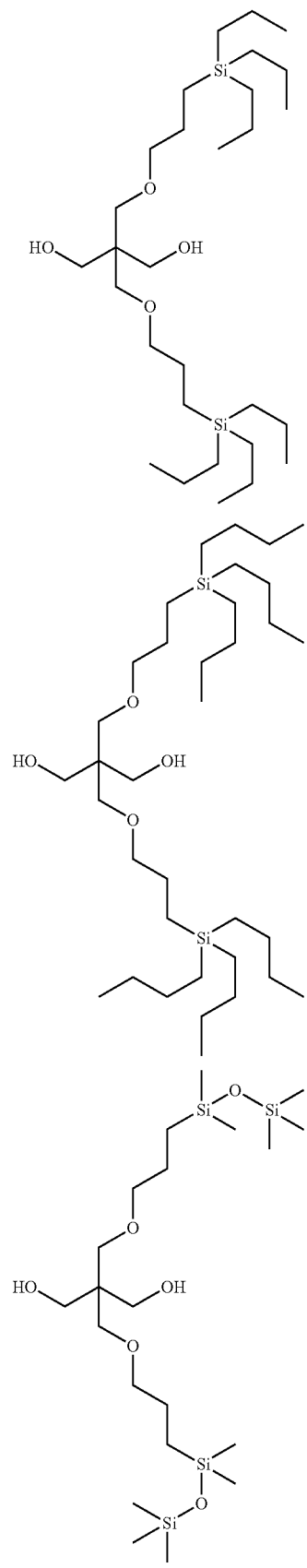

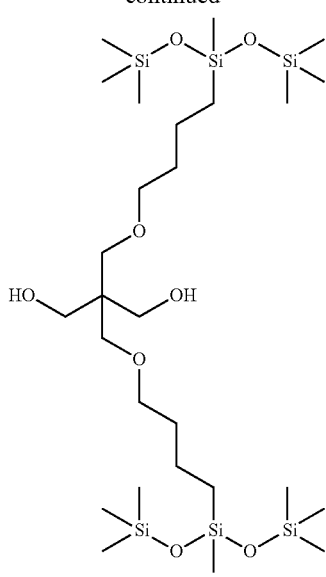
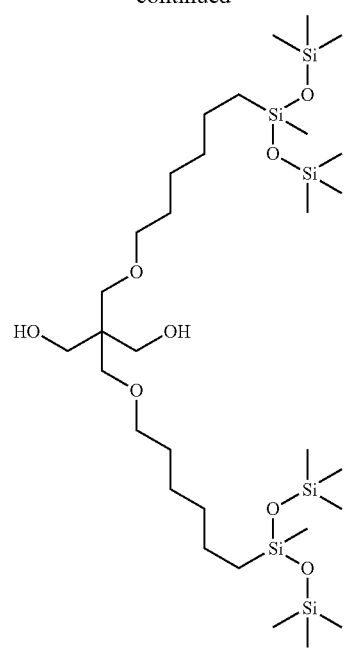
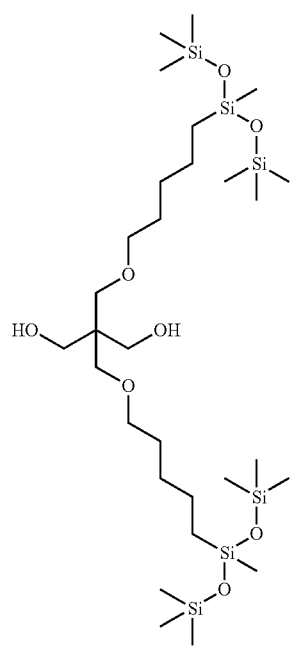
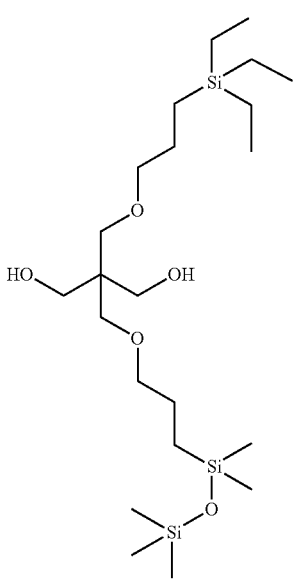

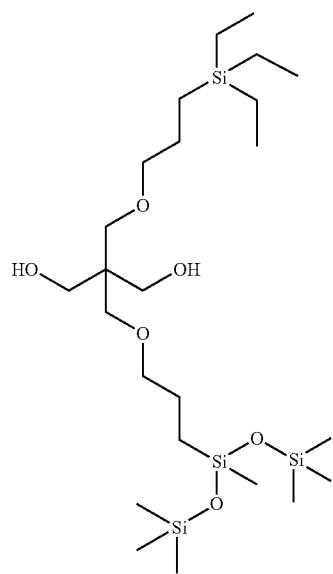
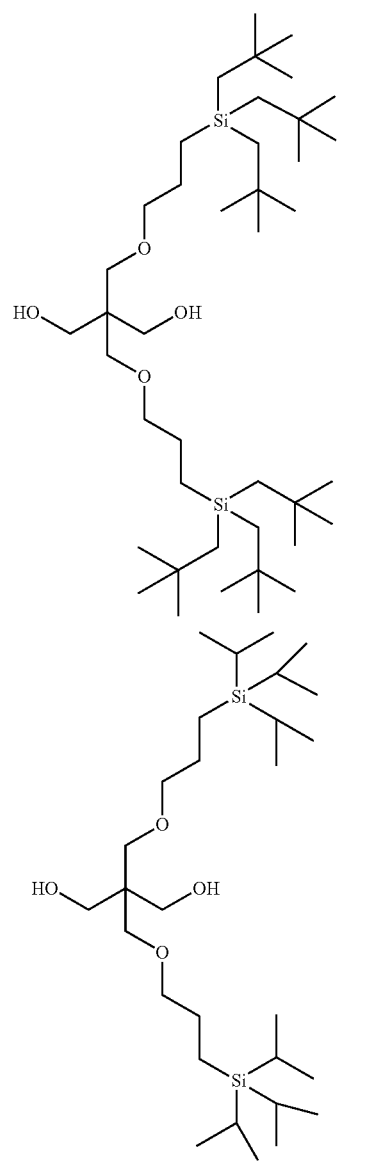
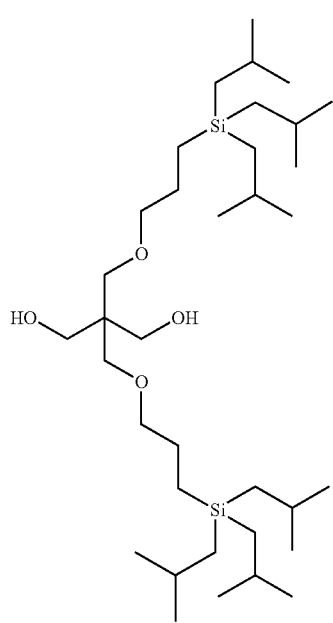
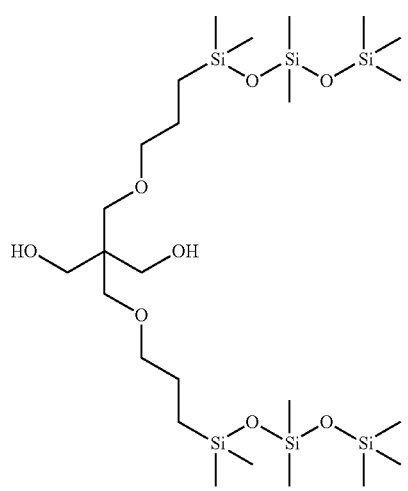

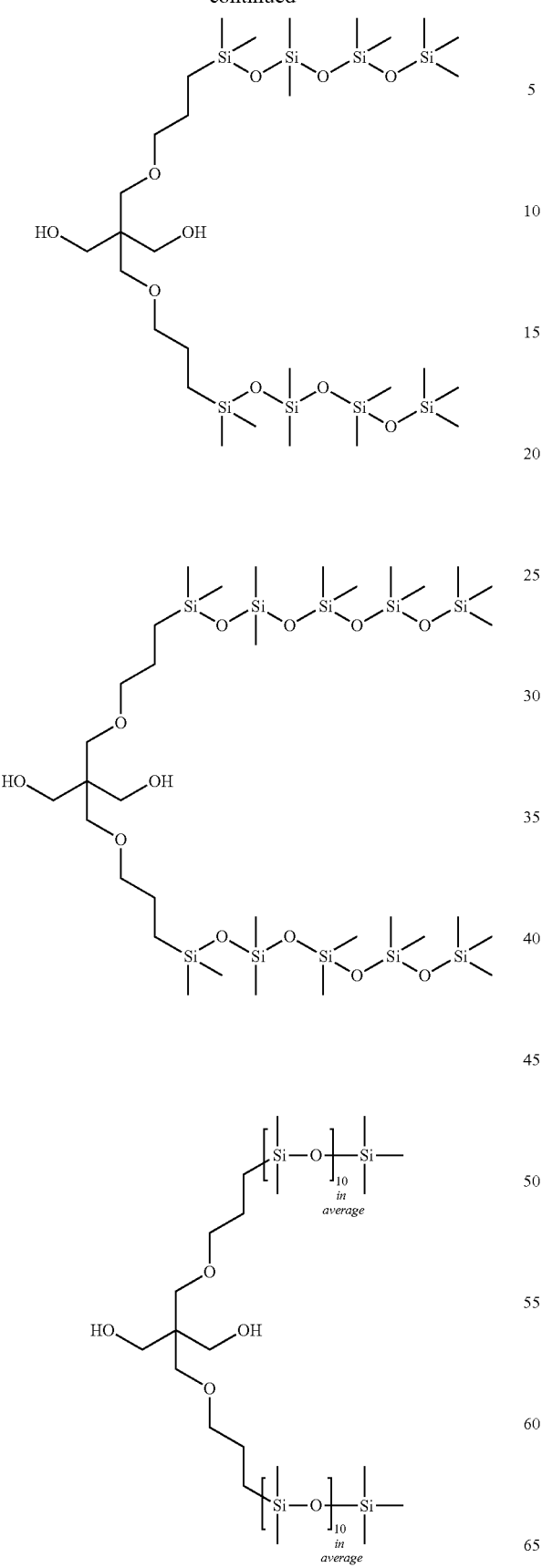

-continued
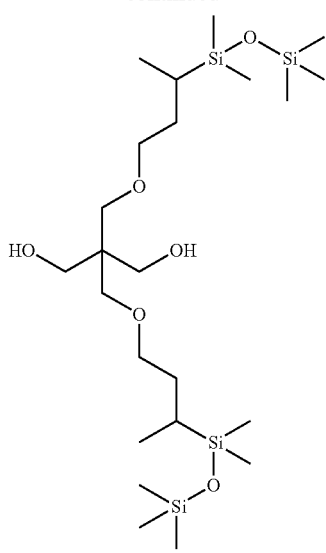
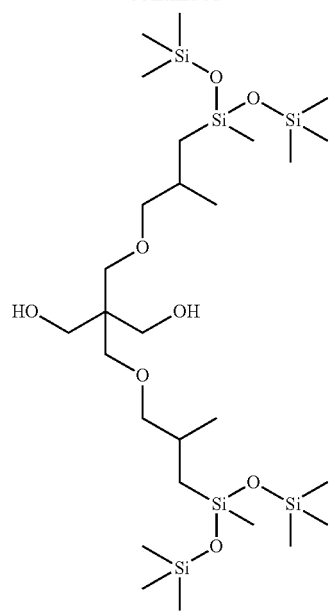
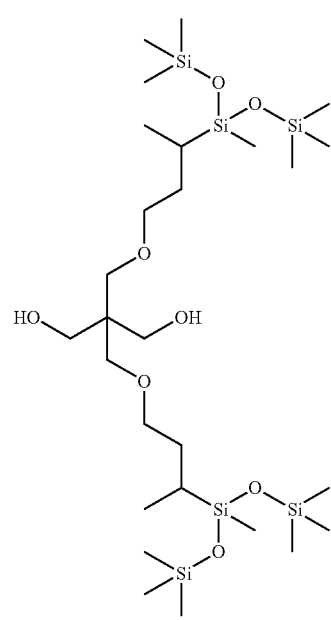
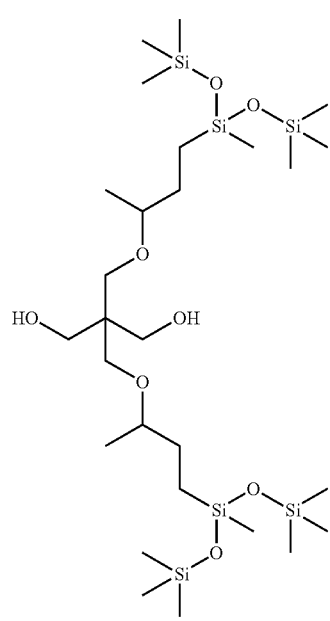

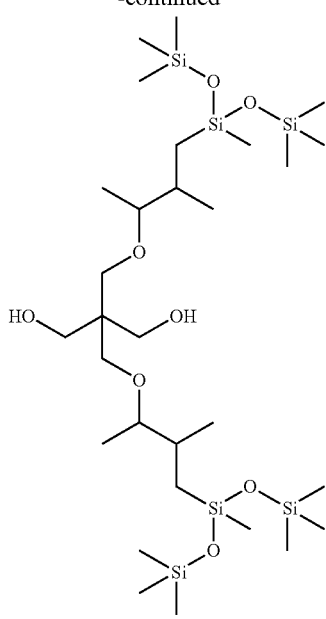

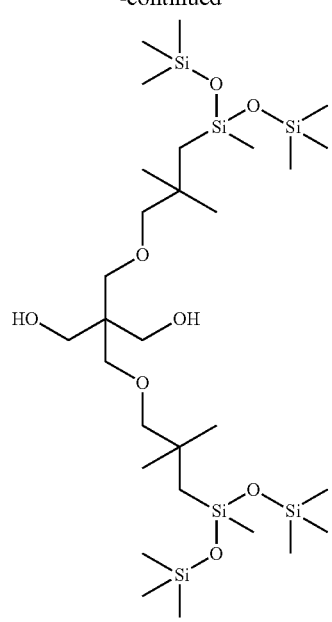

The resin having the structure shown by the general formula (1) or (2) used to form the inventive stretchable film can be formed by reaction between an isocyanate compound and a raw material of the compound shown by the general formula (1)' or the compound(s) having a silicon-containing group shown by (2)-1' and/or (2)-2'.

Specific examples of the isocyanate compound to be reacted with the compounds shown by the general formulae (1)', (2)-1', and (2)-2' include the following.

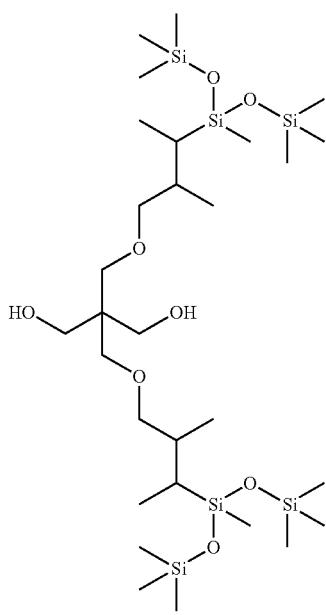

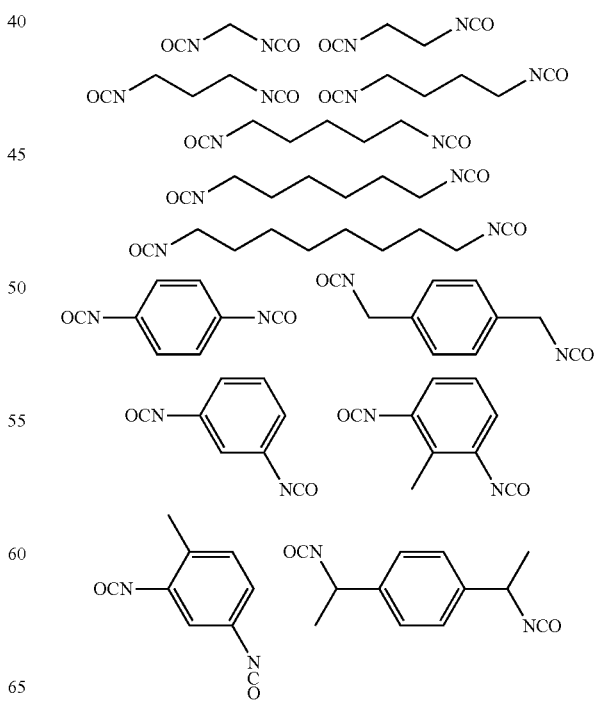

-continued
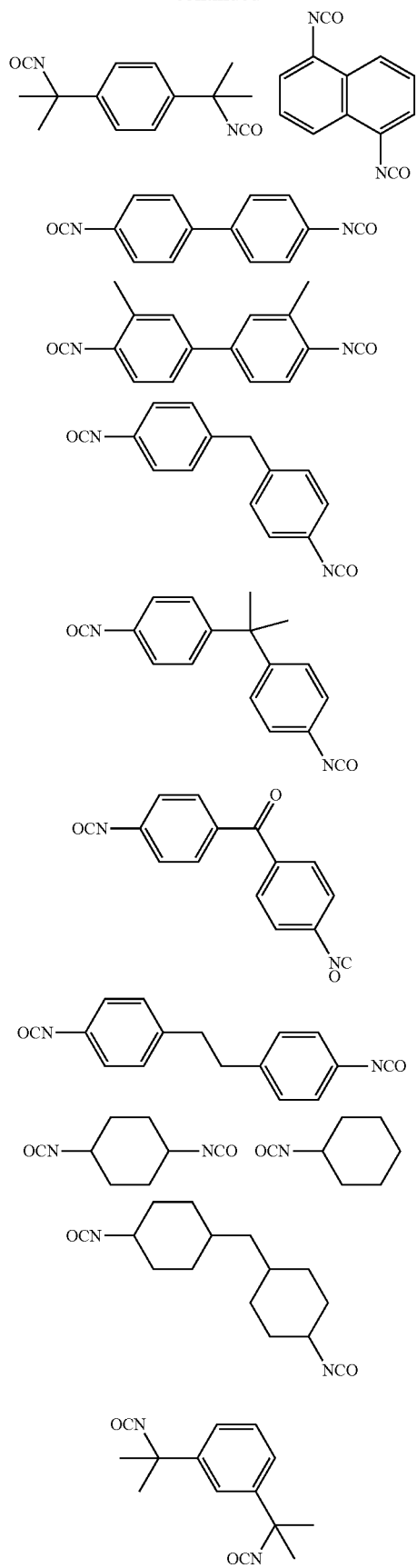
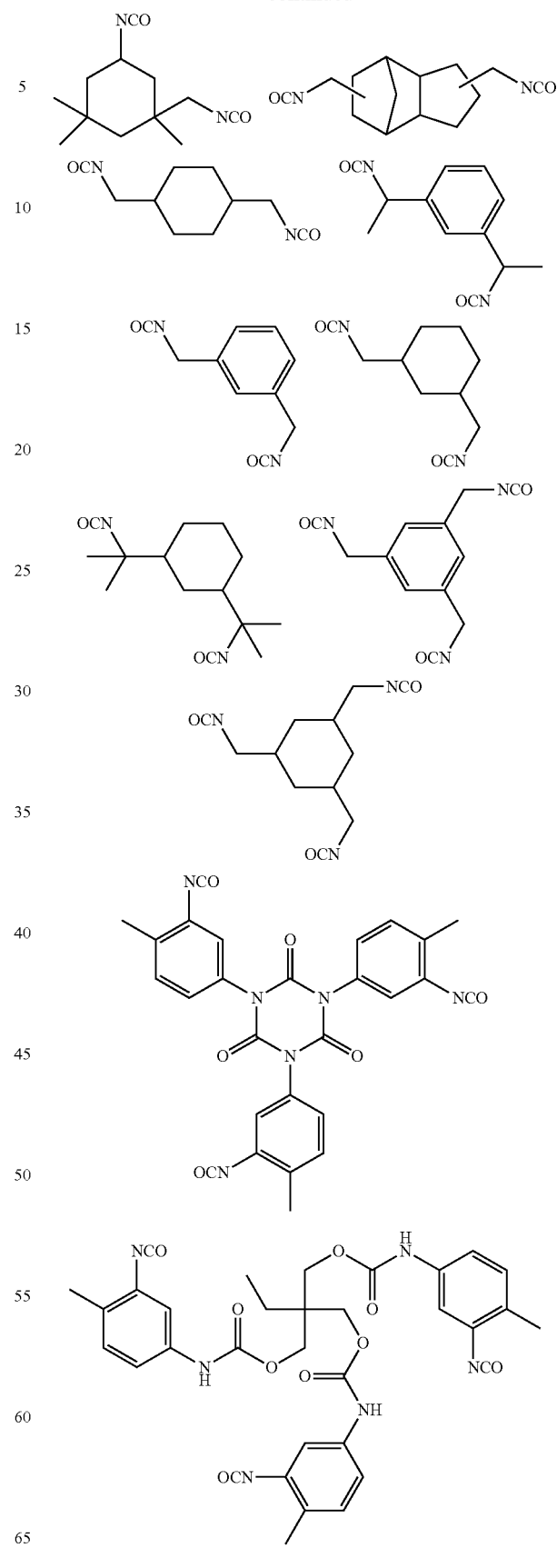

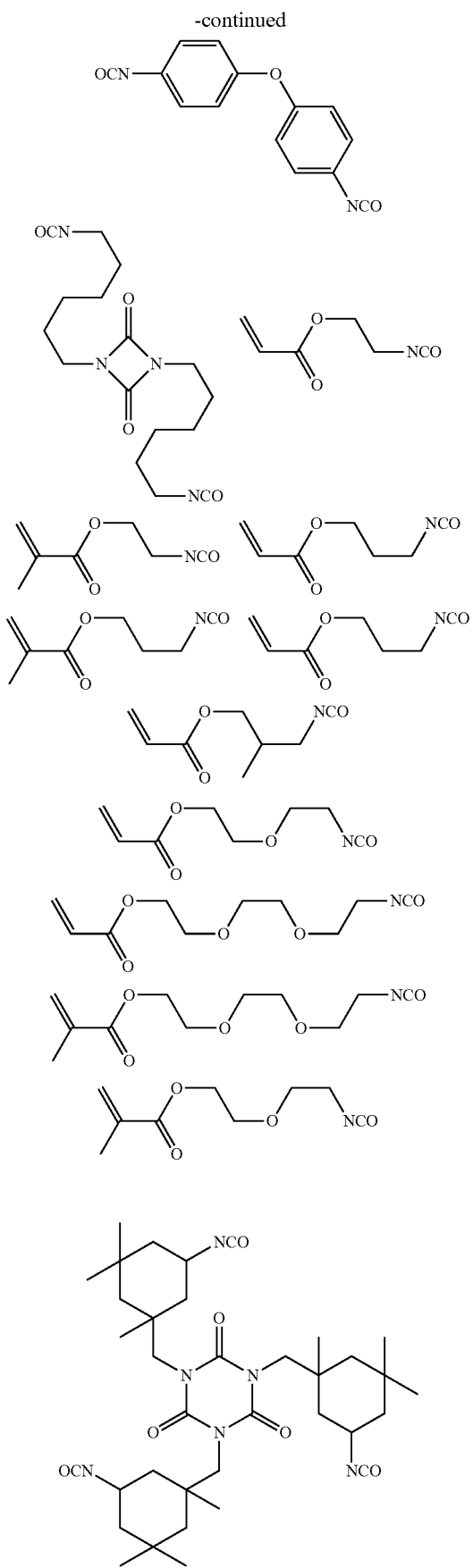
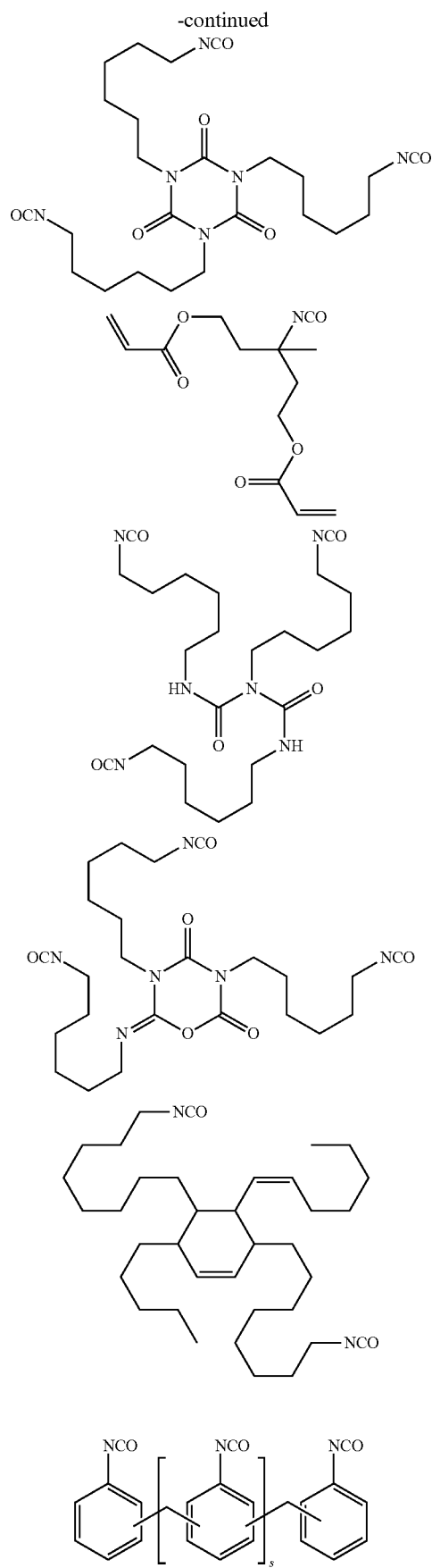

-continued

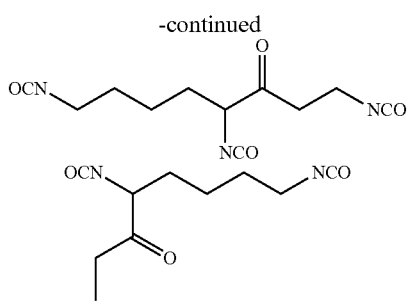

In the formulae, "s" is an integer of 1 or more.

Among the isocyanate compounds described above, particularly, an isocyanate compound having a (meth)acrylate group can give a compound having a (meth)acrylate group at the terminal shown by the general formula (3) or (4), through the reaction with the compound shown by the general formula (1)', (2)-1', or (2)-2'. Besides, the compound having a (meth)acrylate group at the terminal shown by the general formula (3) or (4) can also be obtained through a reaction of an isocyanate compound with a compound having a (meth)acrylate group with a hydroxy group.

The aforementioned isocyanate compounds have such high reactivity with the compounds shown by the general formula (1)', (2)-1', and (2)-2' that the reaction is sometimes difficult to control. Additionally, the isocyanate compounds react with moisture in the air to inactivate the isocyanate groups during the storage in some cases, and hence have to be carefully stored, for example, with sufficient moisture-proofing. Accordingly, in order to prevent these phenomena, a compound having a blocked isocyanate group may be used in which the isocyanate group is protected with a substituent.

The blocked isocyanate group is a blocked group that is deprotected by heating to be an isocyanate group. Examples thereof include isocyanate groups substituted with alcohol, phenol, thioalcohol, imine, ketimine, amine, lactam, pyrazole, oxime, β-diketone, and the like.

A catalyst may be added to decrease the temperature for deprotecting the blocked isocyanate group. Known examples of this catalyst include organic tin such as dibutyltin dilaurate, bismuth salts, and zinc carboxylate such as zinc 2-ethylhexanoate and zinc acetate.

Particularly, Japanese Patent Laid-Open Publication No. 2012-152725 shows that it is possible to decrease the temperature for deprotection reaction by including zinc carboxylate of α,β-unsaturated carboxylic acid as a blocked isocyanate dissociation catalyst.

In addition to the isocyanate compound and the compounds shown by the general formulae (1)', (2)-1', and (2)-2', a compound having a plurality of hydroxy groups may be added. The addition of such a compound having a plurality of hydroxy groups induces chain extension and intermolecular crosslinking.

The chain extension can improve the stretchability and the strength. For example, the stretchability is improved by introducing a chain extender of polyether type having hydroxy groups at both terminals. Both of the stretchability and the strength can be improved by a chain extender of polyester type having hydroxy groups at both terminals. The strength can be improved substantially by introducing a chain extender of polycarbonate type.

Specific examples of compound having a plurality of hydroxy groups include the following.

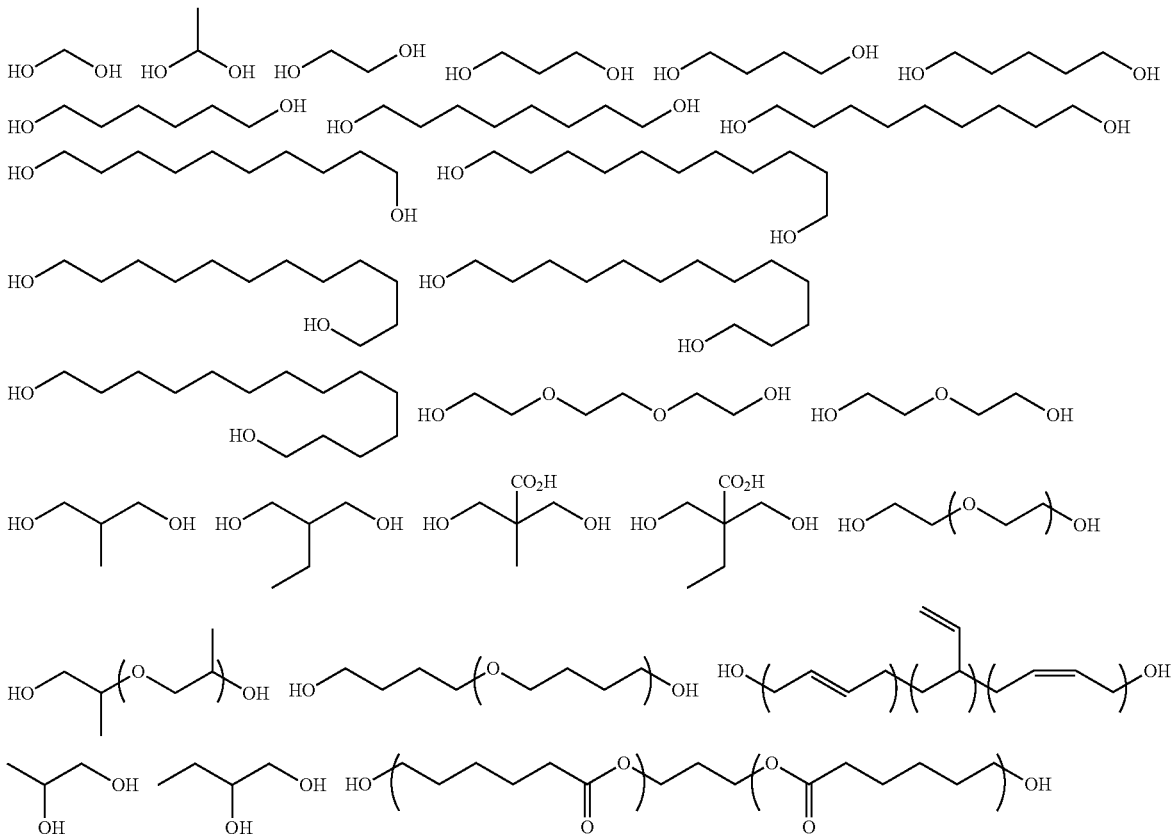

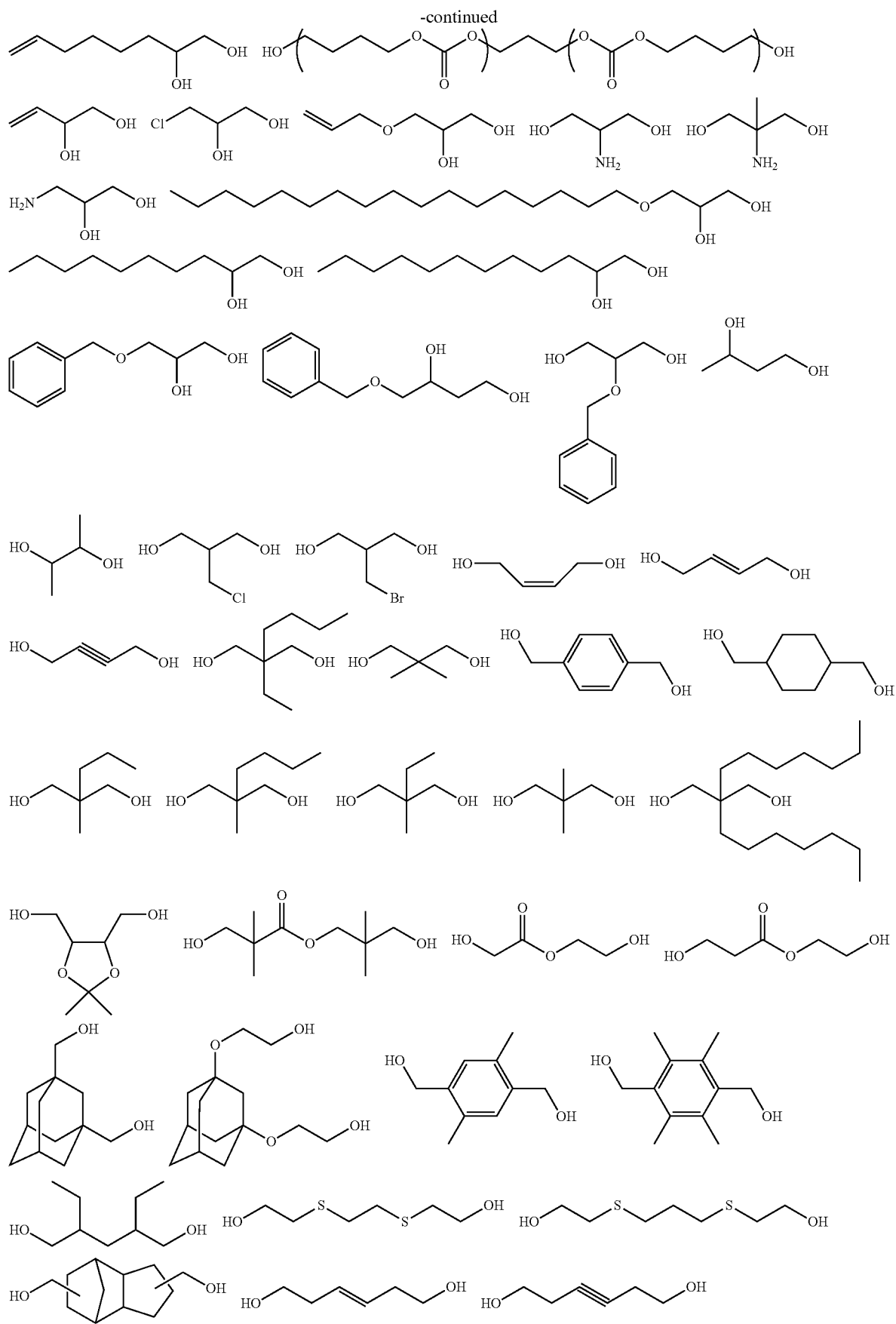

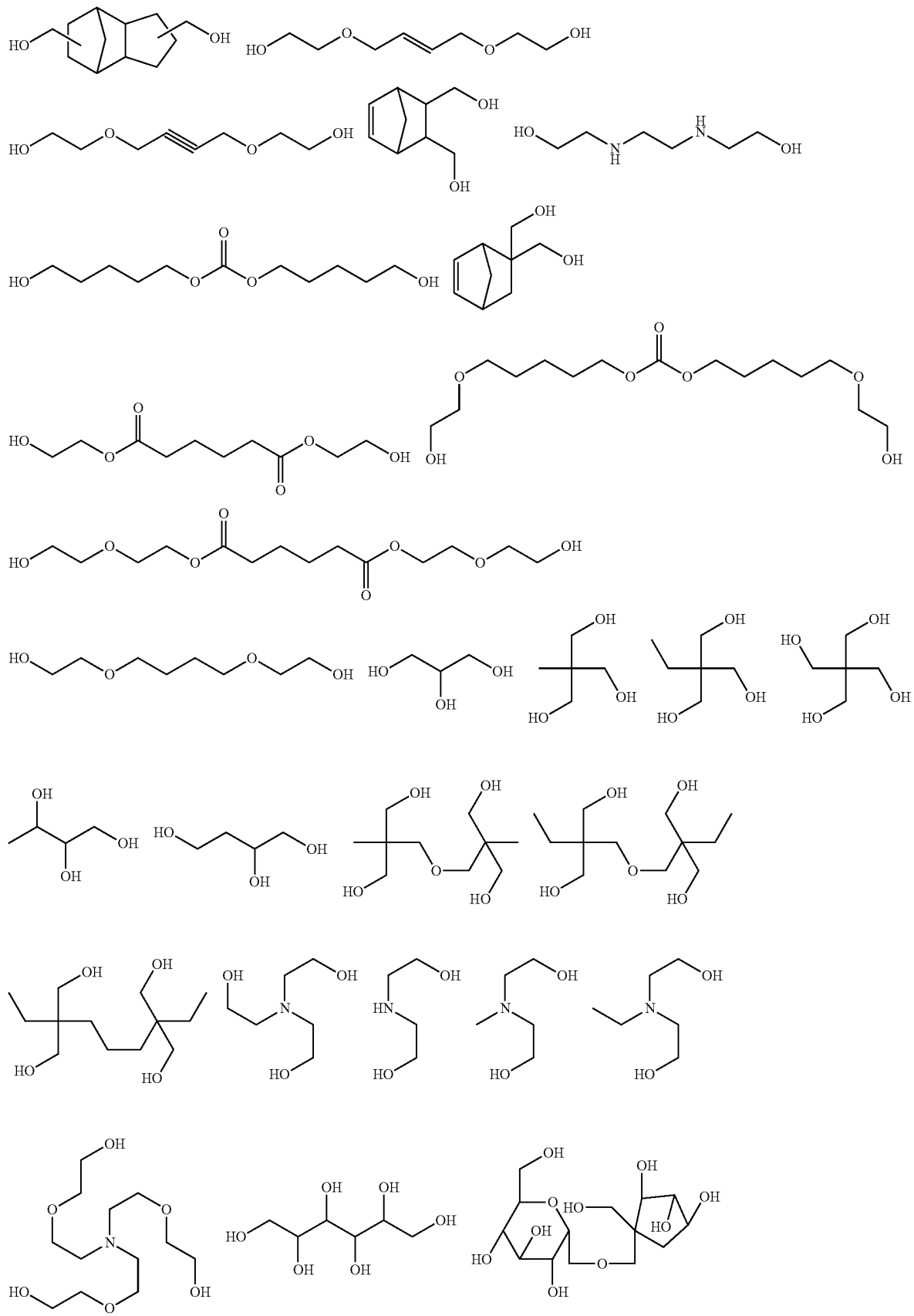

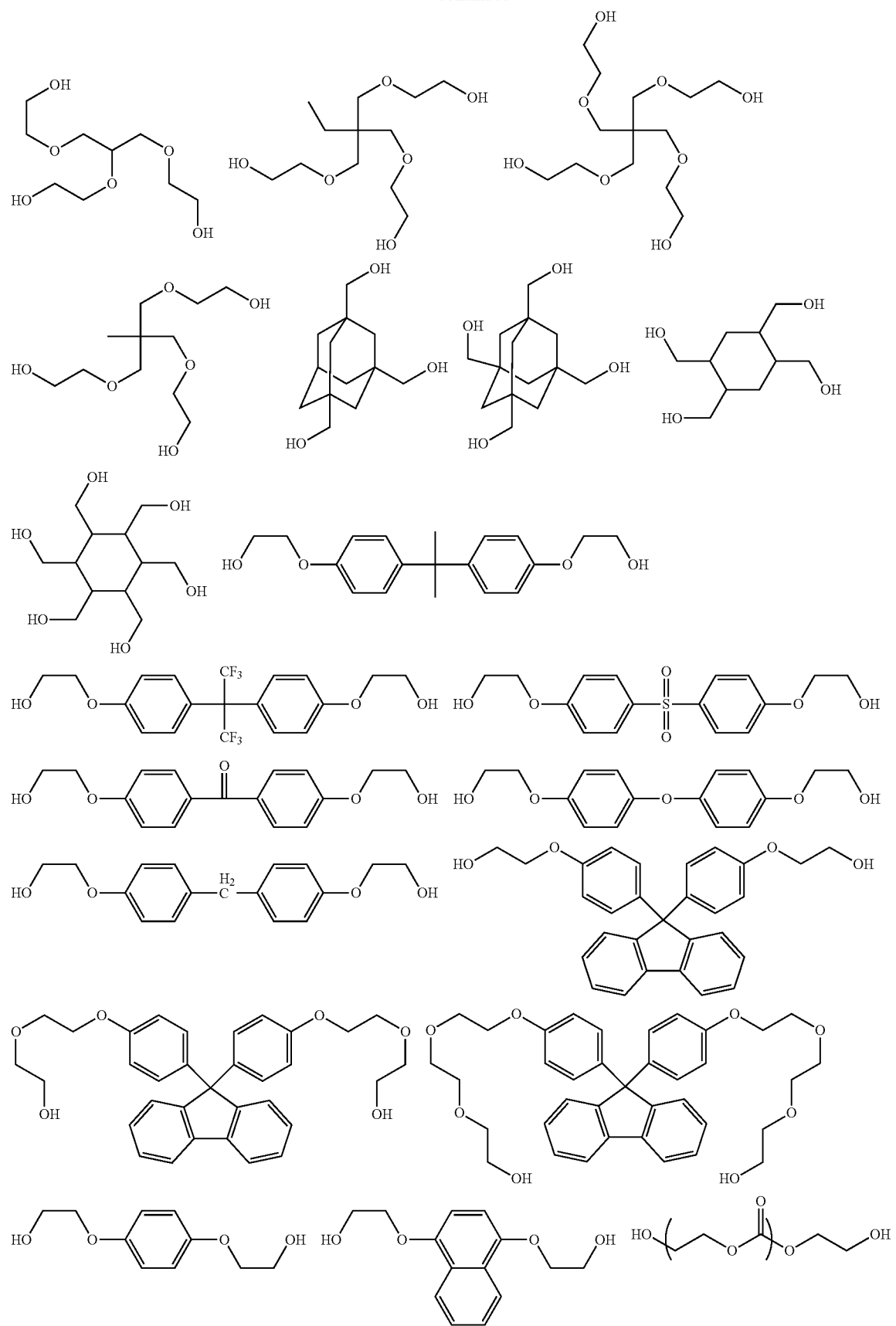

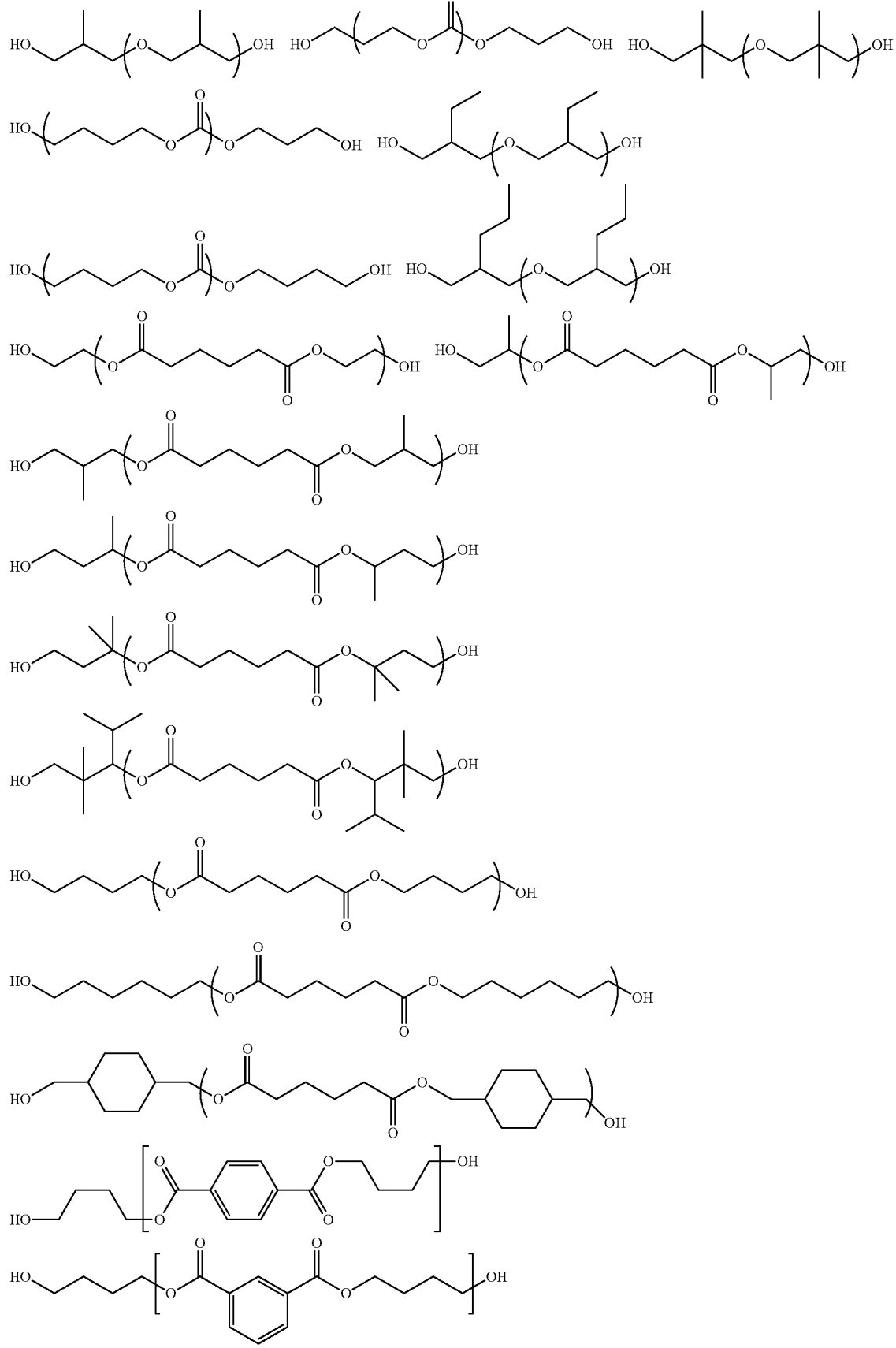

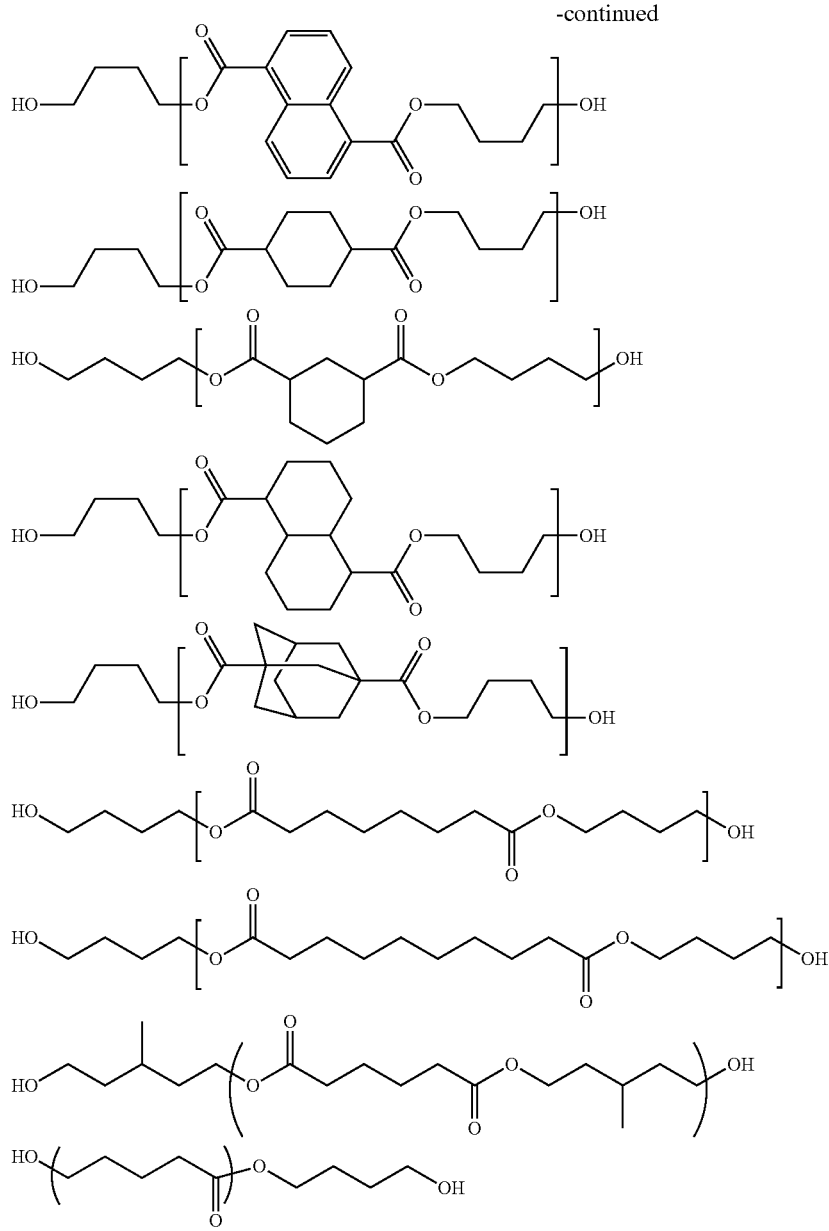

In the formulae, the numbers of the parenthesized repeating units are arbitrary numbers.

Further, a compound having an amino group can also be added. When an isocyanate group reacts with an amino group, a urea bond is formed. The moiety of a urethane bond and a urea bond is called as a hard segment, and improves the strength through their hydrogen bonds. Thus, the strength is successfully improved by the addition of urea bonds not only by urethane bonds.

The moiety formed of a diol compound that contains polyether, polyester, or polycarbonate for chain extension is called as a soft segment. Among them, polyether improves the stretchability most, followed by polyester and polycarbonate in which order the stretchability decreases. On the other hand, the order of tensile strength is in the opposite order to the order of stretchability. The strength and the stretchability can be controlled by selecting the kind of the soft segment or repeating unit.

Each of the fluorourethane resin and the silicone urethane resin used for forming the inventive stretchable film preferably has a weight average molecular weight of 500 or more. Such resins are favorably usable to form the inventive stretchable film. The upper limit value of the weight average molecular weight of the resins is preferably 500,000 or less.

Note that the inventive stretchable film preferably has a stretching property of 20 to 1000% in a tensile test stipulated according to JIS K 6251. Such a stretching property enables particularly favorable use as a coating film of a stretchable wiring.

The inventive stretchable film is preferably used as a film to be in contact with a stretchable conductive wiring. The inventive stretchable film can be particularly favorably used for such usage.

The inventive stretchable film as described above has excellent stretchability and strength that are equivalent to those of polyurethane, together with a film surface having water repellency superior to that of silicone and being free from stickiness.

<Method for Forming Stretchable Film>

The present invention also provides a method for forming the above-described stretchable film, comprising:

curing a composition containing a resin having a structure shown by the general formula (2) by heating and/or light irradiation to form a polyurethane film containing a repeating unit having a silicon atom; and curing a composition containing a resin having a structure shown by the general formula (1) by heating and/or light irradiation to stack a polyurethane film containing a repeating unit having a fluorine atom on a surface of the polyurethane film containing a repeating unit having a silicon atom.

In this event, the stretchable film is preferably formed by: synthesizing urethane polymers through reaction of isocyanate groups and hydroxy groups; forming a (meth)acrylate group(s) at the terminal(s) of each urethane polymer as shown in the general formulae (3), (4); forming films of compositions containing the respective polymers; and curing the films by heating and/or light irradiation. Specifically, the diol compounds shown by the general formulae (1)', (2)-1', and (2)-2' are mixed with protected or unprotected isocyanate compounds and a compound having a plurality of hydroxy groups for chain extension and crosslinking. After the polymerization, urethane (meth)acrylate polymers are synthesized with (meth)acrylate at the polymer terminals. Films are formed from such compositions containing the urethane (meth)acrylate polymers, and cured by heat or light irradiation to form a stretchable film. In this method, (meth)acrylate is crosslinked by reaction with radical. As a method for radical crosslinking, a radical generator is desirably added. Examples of the radical generator include a thermal-radical generator which generates a radical by thermal decomposition, and a photo-radical generator which generates a radical by light irradiation.

Examples of the heat radical generator include azo radical generators and peroxide radical generators. Examples of the azo radical generators include 2,2'-azobisisobutyronitrile (AIBN), 2,2'-azobis(2,4-dimethylvaleronitrile), dimethyl 2,2'-azobis(2-methylpropionate), 2,2'-azobis(4-methoxy-2,4-dimethylvaleronitrile), 2,2'-azobis(cyclohexane-1-carbonitrile), 4,4'-azobis(4-cyanovaleric acid), and the like. Examples of the peroxide radical generators include benzoyl peroxide, decanoyl peroxide, lauroyl peroxide, succinyl peroxide, t-butylperoxy-2-ethylhexanoate, t-butylperoxypivaloate, 1,1,3,3-tetramethylbutylperoxy-2-ethylhexanoate, and the like.

Examples of the photo radical generator include acetophenone, 4,4'-dimethoxybenzyl, benzyl, benzoin, benzophenone, 2-benzoylbenzoic acid, 4,4'-bis(dimethylamino)benzophenone, 4,4'-bis(diethylamino)benzophenone, benzoin methyl ether, benzoin ethyl ether, benzoin isopropyl ether, benzoin butyl ether, benzoin isobutyl ether, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxole-5-yl)-4,6-bis(trichloromethyl)-1,3,5-triazine, 2-benzyl-2-(dimethylamino)-4'-morpholinobutyrophenone, 4,4'-dichlorobenzophenone, 2,2-diethoxyacetophenone, 2,2-dimethoxy-2-phenylacetophenone, 2,4-diethylthioxanthen-9-one, diphenyl(2,4,6-trimethylbenzoyl)phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methylpropiophenone, 2-isonitrosopropiophenone, 2-phenyl-2-(p-toluenesulfonyloxy)acetophenone (BAPO), and camphorquinone.

Note that the loading amount of the thermal or photo-radical generator is preferably in a range of 0.1 to 50 parts by mass based on 100 parts by mass of the resin.

It is also possible to add a crosslinking agent that has a plurality of (meth)acrylate or thiol. This makes it possible to improve the efficiency of radical crosslinking.

It is also possible to add a monomer that has an alkyl group or an aryl group, or a monomer that has an alkyl group or an aryl group substituted with a silicon-containing group or fluorine. These make it possible to form a thinner stretchable film by decreasing the viscosity of the solution. When each monomer has a polymerizable double bond, the monomer can be fixed into the film in curing the film.

Examples of the monomer that has an alkyl group or an aryl group include isobornyl acrylate, lauryl acrylate, tetradecyl acrylate, stearyl acrylate, isostearyl acrylate, behenyl acrylate, adamantane acrylate, phenoxyethylene glycol acrylate, and phenoxydiethylene glycol acrylate.

When the stretchable film is formed using the compound having a (meth)acrylate group at the terminal, the curing can be performed by combining heat-curing and photo-curing. For example, it is possible to form a film, which serves as the base, by heat-curing, and then form a film thereon by photo-curing. The merits of photo-curing are that heating is not necessarily essential, and the curing can be performed in a short period. The demerit is that the area where light does not reach cannot be cured. By combining heat-curing and photo-curing, a curing method that takes advantage of each curing merit can be selected.

For example, the stretchable film can be formed by: coating a substrate with a solution (composition) in which a base polymer having a structure shown by the general formula (4) is mixed with a radical generator; curing the resultant by heat or light irradiation to form a first layer; coating the first layer with a solution (composition) in which a base polymer having a structure shown by the general formula (3) is mixed with a radical generator to stack a second layer; and curing the resultant by heat or light irradiation.

In forming the inventive stretchable film, an example of the method for forming the first layer includes a method of applying the aforementioned composition onto a planar substrate or a roll. Examples of the method for applying the composition include spin coating, bar coating, roll coating, flow coating, dip coating, spray coating, doctor coating, and the like. The coating is preferably performed so as to have a coating film thickness of 0.1 μm to 2 mm.

For encapsulating a part with unevenness, preferable are such methods as roll coating and spray coating, and a method of coating a necessary part by screen printing, stencil printing, or the like. Note that, in order to perform various coating or printing methods, the viscosity of the mixed solution has to be controlled. To decrease the viscosity, an organic solvent is mixed; to increase the viscosity, a filler such as silica is mixed.

The organic solvent is preferably an organic solvent having a boiling point in a range of 115 to 250° C. at atmospheric pressure. Specifically, it is preferable to use one or more selected from 2-octanone, 2-nonanone, 2-heptanone, 3-heptanone, 4-heptanone, 2-hexanone, 3-hexanone, diisobutyl ketone, methylcyclohexanone, acetophenone, methylacetophenone, propyl acetate, butyl acetate, isobutyl acetate, amyl acetate, butenyl acetate, isoamyl acetate, phenyl acetate, propyl formate, butyl formate, isobutyl formate, amyl formate, isoamyl formate, methyl valerate, methyl pentenoate, methyl crotonate, ethyl crotonate, propylene glycol monomethyl ether, ethylene glycol monomethyl ether, propylene glycol monoethyl ether, ethylene glycol monoethyl ether, propylene glycol dimethyl ether, diethylene glycol dimethyl ether, propylene glycol monomethyl ether acetate, propylene glycol monoethyl ether acetate, dimethyl succinate, and diethyl succinate.

When the compound having a (meth)acrylate group at the terminal is cured by heating, the heat curing can be performed with a hot plate, in an oven, or by irradiation of far infrared ray, for example. The heating conditions are preferably at 30 to 150° C. for 10 seconds to 60 minutes, more preferably at 50 to 120° C. for 30 seconds to 20 minutes. The baking environment may be performed in the atmosphere, in an inert gas, or in vacuum.

When the compound having a (meth)acrylate group at the terminal is cured by light irradiation, the curing by light irradiation is preferably performed with light having a wavelength of 200 to 500 nm. As the light source, for example, a halogen lamp, a xenon lamp, excimer laser, a metal halide lamp, LED, or the like can be used. Alternatively, electron beam irradiation may be adopted. The irradiation quantity is preferably in a range of 1 mJ/cm$^2$ to 100 J/cm$^2$.

Other than the above-described methods, the inventive stretchable film can be formed by the method including: mixing the diol compound(s) shown by the general formula (e) (2)-1' and/or (2)-2' and a compound having an isocyanate group optionally with a diol compound for chain extension, an amine compound, and a catalyst; forming a film of this mixture; curing the film by heating or light irradiation to form a first layer as a base film; and forming (or stacking), on the first film, a film of a mixture obtained by mixing the compound shown by the general formula (1)' and a compound having an isocyanate group optionally with a diol compound for chain extension, an amine compound, and a catalyst, the film being cured by heating or light irradiation to form a film as a second layer on the first layer as the base film.

An example of such a method for forming a stretchable film includes a method in which a mixture is prepared for both the first layer and the second layer, for example, by mixing the compounds shown by the general formula (2)-1', (2)-2', and (1)' with a protected or unprotected isocyanate compound and a compound having a plurality of hydroxy groups for chain extension and crosslinking and optionally with a compound having an amino group; the mixture is applied as the first layer onto the substrate, and applied as the second layer onto the first layer; and then the layers are cured by heating.

In this method, a polymer network is formed by increasing the molecular weight while urethane bonds are formed through the reaction of the isocyanate groups and the hydroxy groups. When compounds having three or more hydroxy groups or isocyanate groups are added, crosslink reaction proceeds, thereby lowering the stretchability but improving the film strength. Accordingly, it is possible to control the hardness, stretchability, and strength by controlling the loading amount of the compounds having two or three hydroxy groups or isocyanate groups. Additionally, an independent stretchable film can be obtained by peeling the films from the substrate after the curing.

Regarding the molar ratio of the hydroxy groups and the isocyanate groups in the mixture, it is preferable that the isocyanate groups and the hydroxy groups be in the same molar number, or that the molar number of the hydroxy groups be larger, that is, the value obtained by dividing the molar number of the hydroxy groups by the molar number of the isocyanate groups be 1 or more. When the molar number of the isocyanate groups is smaller, carbon dioxide cannot be formed through the reaction of excess isocyanate groups with water, thereby preventing voids due to foaming in the film. When foamed urethane is prepared, excess isocyanate groups are present therein. Since the inventive stretchable film requires the property of higher strength, the film is preferably free from void due to foaming.

When the resins in the inventive stretchable film are formed in such a state that the molar number of the hydroxy groups is larger than that of the isocyanate groups as described above, the terminal of the polymer sometimes has an urethane bond that is formed only at one side of each diol compound shown by the following general formulae (1'), (2')-1, and (2')-2.

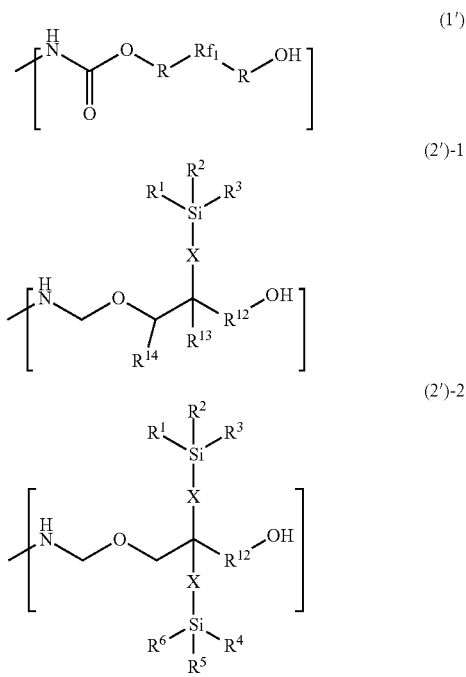

In the formulae, $Rf_1$, R, $R^1$ to $R^6$, $R^{12}$ to $R^{14}$, and X are as defined above.

Each film can also be formed by a prepolymer method in which a hydroxy group-containing compound and an isocyanate compound are mixed to form a polymer material (prepolymer); then, a hydroxy group-containing compound or an isocyanate group-containing compound is additionally mixed and cured by heating. When the prepolymer is formed, one of the hydroxy group-containing compound and the isocyanate compound is used in an excess amount to increase the molecular weight. This can decrease the amount of unreacted residual isocyanate to decrease the uncrosslinked portion to thus form a film with higher strength compared to the case of one shot method, in which the hydroxy group-containing compound and the isocyanate compound are mixed to form a film at once.

The heating temperature in curing is preferably in a range of room temperature to 200° C., more preferably in a range of 40 to 160° C. for a period of 5 seconds to 60 minutes. When the heat curing is performed, one side of a film may be covered with a peeling film, or both sides of the film may be covered therewith. It is preferable to cover one side in curing while the films are being wound on a roll, or cover both sides in sheet-type curing. However, the method is not limited thereto.

It is also possible to form the first layer by curing the applied mixture obtained by mixing the diol compound(s) shown by the general formula(e) (2)-1' and/or (2)-2' with a protected or unprotected isocyanate compound and a compound having a plurality of hydroxy groups for chain extension and crosslinking and optionally with a compound having an amino group; and to form the second layer by curing, by heat or light, the applied solution (composition) in which the base polymer shown by the general formula (3) is mixed with a radical generator. Alternatively, it is also possible to form the first layer by curing, by heat or light, the applied solution (composition) in which the base polymer shown by the general formula (4) is mixed with a radical generator; and to form the second layer by curing the applied mixture obtained by mixing the compound shown by the general formula (1)' with a protected or unprotected isocyanate compound and a compound having a plurality of hydroxy groups for chain extension and crosslinking and optionally with a compound having an amino group.

<Stretchable Film>

The inventive stretchable film is, for example, a composite stretchable film in which a polyurethane film containing a repeating unit having a fluorine atom (fluorourethane layer) is formed on a surface of a polyurethane film containing a repeating unit having a silicon atom (silicone-pendant type urethane layer). Nevertheless, the fluorourethane layer may cover one or both of the surfaces of the silicone-pendant type urethane layer. The thickness of the fluorourethane layer is not particularly limited, but is preferably smaller than the silicone-pendant type urethane layer in view of higher strength.

High water repellency can be obtained by forming the fluorourethane layer, which is a cured product of a composition containing a resin having a structure shown by the general formula (1), on a surface of a normal urethane film having no silicone pendant. Nevertheless, when the fluorourethane layer fails to cover the entire surface of a normal urethane film having no silicone pendant, the water resistance at a portion not covered with the fluorourethane layer is lowered. Since high water resistance is required regardless of whether or not the base is covered with the fluorourethane layer, it is necessary to have the silicone pendant urethane film as the base.

In order to form a thin fluorourethane layer, the composition for forming the fluorourethane layer is preferably mixed with the aforementioned organic solvent. The solution (composition) for forming the silicone-pendant type urethane layer may or may not contain an organic solvent.

Embossing the surface of the fluorourethane layer to impart fine unevenness thereto can further improve water repellency and low tackiness.

The inventive stretchable film can be used not only as a self-standing film alone, but can also be formed on fiber or a membrane film.

The inventive stretchable film is also capable of encapsulating a stretchable wiring, a device, a sensor, an antenna, and the like. After the encapsulation, it can also be attached onto fiber, a stretchable film, or skin.

Here, FIGS. 1 to 7 show examples of using the inventive stretchable film. FIG. 1 is a schematic illustration of an electrocardiograph 1 formed on a stretchable film 6 of the present invention viewed from a bio-electrode side. FIG. 2 is a cross-sectional view showing a state where the inventive stretchable film 6 is formed on a substrate 7. FIG. 3 is a cross-sectional view showing a state where the electrocardiograph 1 is further formed on the stretchable film 6. FIG. 4 is a cross-sectional view showing a state where a stretchable wiring 3 and a center device 4 of the electrocardiograph 1 in FIG. 3 are covered with a fluorourethane layer 6-2. The electrocardiograph 1 in FIG. 1 is similar to one described in Patent Document 1. As shown in FIG. 1, in the electrocardiograph 1, three bio-electrodes 2 are linked with each other by the wiring 3, which conducts electric signals, and are connected to the center device 4.

As the material of the wiring 3, electrically conductive materials are generally used, including metal such as gold, silver, platinum, titanium, and stainless steel as well as carbon. Note that, to provide stretchability, the wiring 3 can a meandering-shaped wiring as described in Patent Document 1, and can be formed by pasting a powder of the electrically conductive material or a wire of the electrically conductive material on a stretchable film, printing electrically conductive ink containing the electrically conductive material on a stretchable film, or using an electrically conductive fabric in which the electrically conductive material and fibers are combined.

Since the electrocardiograph 1 has to be attached to skin, an adhesive part 5 is disposed around each of the bio-electrodes 2 in FIGS. 1, 3, and 4 in order not to separate the bio-electrode 2 from the skin. Incidentally, when the bio-electrode 2 has adhesiveness, the surrounding adhesive part 5 is not necessarily essential.

This electrocardiograph 1 is formed on the stretchable film 6, which is inventive stretchable film, as shown in FIG. 1. Since the stretchable film 6 has little stickiness on its surface, when printing is performed thereon by screen printing and so on, the stretchable film 6 shows favorable printing plate-release. If the printing plate-release is unfavorable, the ink is released together when the printing plate is released. This is not preferable because the ink may not be transferred on the stretchable film properly.

Further, the stretchable wiring 3 can be covered with a film constituting the stretchable film 6. The film in this case is not necessarily a composite type, and may be a film that has only one layer of either the silicone-pendant type urethane layer or the fluorourethane layer. Incidentally, in FIG. 4, the stretchable wiring 3 is covered with the fluorourethane layer 6-2.

Further, it is also possible to form a stretchable film as shown in FIG. 5 by inverting the stretchable film 6 formed in FIG. 2 to form the fluorourethane layer 6-2 at the surface of a silicone-pendant type urethane layer 6-1 where the fluorourethane layer 6-2 has not been formed. Cross-sectional views of an electrocardiograph using the stretchable film in this case are shown in FIG. 6 and FIG. 7.

The inventive method for forming a stretchable film as described above makes it possible to easily form a stretchable film that has excellent stretchability and strength equivalent or superior to those of polyurethane, with the film surface having high water repellency and low tackiness.

EXAMPLE

Hereinafter, the present invention will be more specifically described with reference to Examples and Comparative Examples, but the present invention is not limited thereto. Incidentally, the weight average molecular weight (Mw) represents a weight average molecular weight in terms of polystyrene determined by gel permeation chromatography (GPC).

Fluorodiol compounds-1 to 6, Silicone pendant diol compounds-1 to 5, Isocyanate compounds-1 to 4, and Hydroxy compounds-1 to 5 which were used to synthesize polyurethanes for forming stretchable films are shown below.
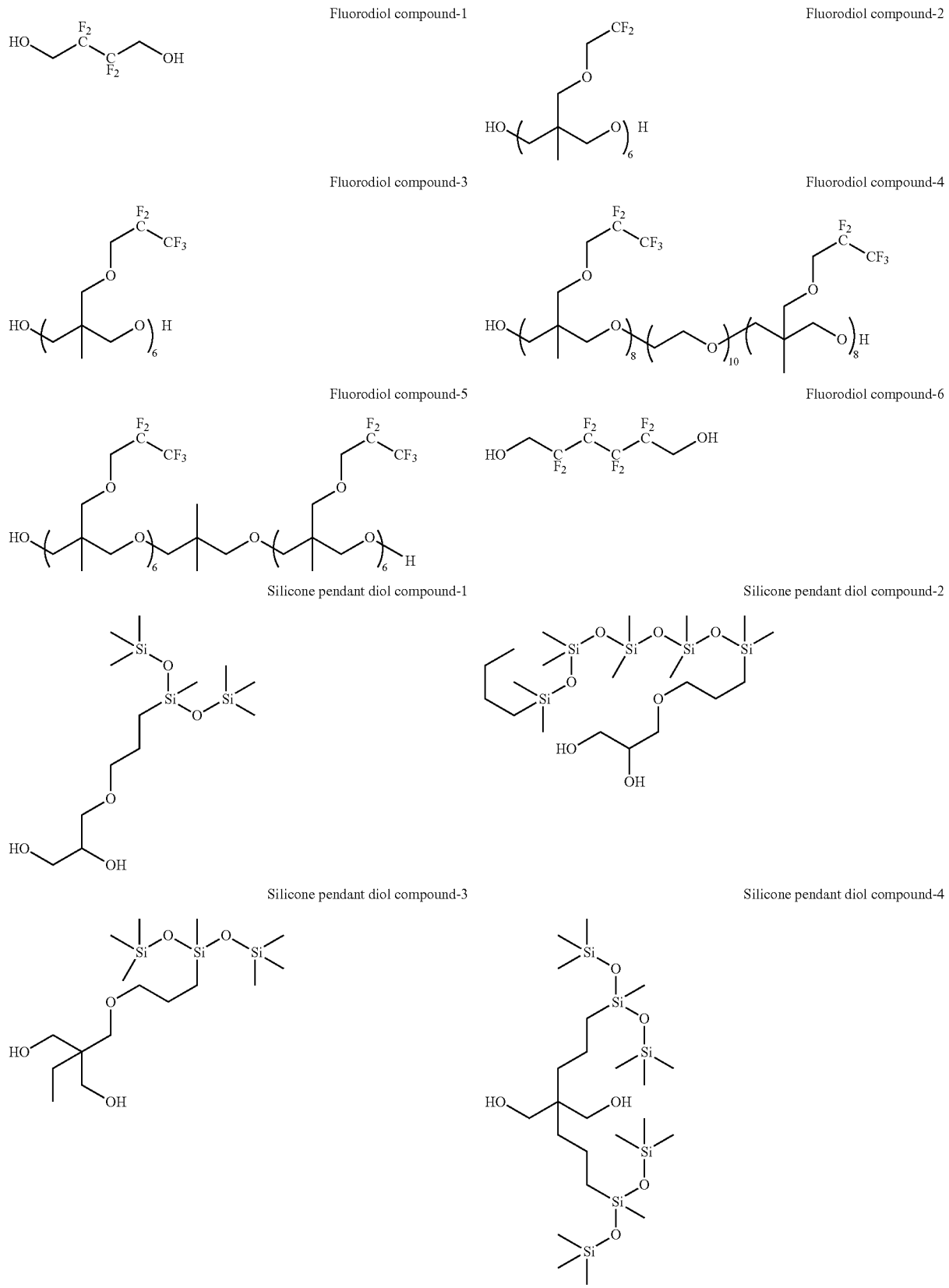

Silicone pendant diol compound-5

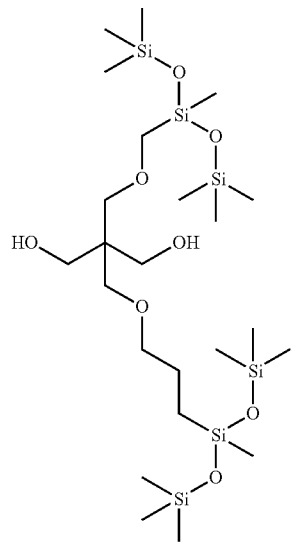

Isocyanate compound-1

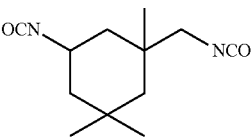

Isocyanate compound-2

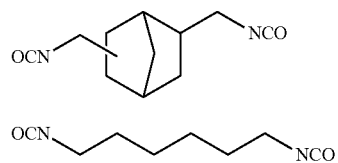

Isocyanate compound-3

Isocyanate compound-4

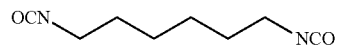

Hydroxy compound-1

Hydroxy compound-2

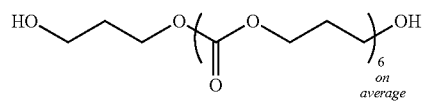

Hydroxy compound-3

Hydroxy compound-4

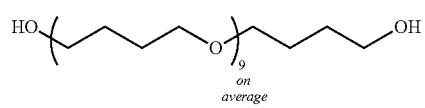

Hydroxy compound-5

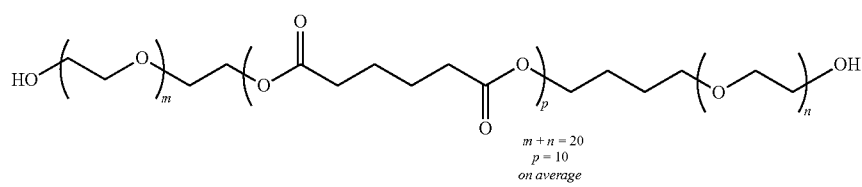

Synthesis of Fluorourethane-(meth)acrylate-1

One mole of Hydroxy compound-1, 1 mole of Hydroxy compound-2, and 1 mole of Fluorodiol-1 were mixed, heated at 60° C., and dried under reduced pressure to remove water. Then, 4 moles of Isocyanate compound-1 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Fluorourethane-(meth)acrylate-1 was obtained. The obtained polymer was analyzed by $^{13}C$, $^{1}H$-NMR, and GPC, and the result as shown later was obtained.

Synthesis of Fluorourethane-(meth)acrylate-2

One mole of Hydroxy compound-3 and 1 mole of Fluorodiol-2 were mixed, heated at 60° C., and dried under reduced pressure to remove water. Then, 3 moles of Isocyanate compound-1 and 0.01 moles of dibutyltin dilaurate were added and reacted at 60° C. for 3 hours with stirring. Further, 2 moles of hydroxybutyl acrylate was added and reacted at 60° C. for 3 hours with stirring. Thereby, Fluorourethane-(meth)acrylate-2 was obtained. The obtained polymer was analyzed by $^{13}C$, $^{1}H$-NMR, and GPC, and the result as shown later was obtained.

Synthesis of Fluorourethane-(meth)acrylate-3

One mole of Hydroxy compound-3 and 1 mole of Fluorodiol-3 were mixed, heated at 60° C., and dried under reduced pressure to remove water. Then, 3 moles of Isocyanate compound-1 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Fluorourethane-(meth)acrylate-3 was obtained. The obtained polymer was analyzed by $^{13}C$, $^1H$-NMR, and GPC, and the result as shown later was obtained.

Synthesis of Fluorourethane-(meth)acrylate-4

One mole of Fluorodiol-4 was mixed, heated at 60° C., and dried under reduced pressure to remove water. Then, 2 moles of Isocyanate compound-1 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Fluorourethane-(meth)acrylate-4 was obtained. The obtained polymer was analyzed by $^{13}C$, $^1H$-NMR, and GPC, and the result as shown later was obtained.

Synthesis of Fluorourethane-(meth)acrylate-5

One mole of Hydroxy compound-3 and 1 mole of Fluorodiol-5 were mixed, heated at 60° C., and dried under reduced pressure to remove water. Then, 3 moles of Isocyanate compound-1 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Fluorourethane-(meth)acrylate-5 was obtained. The obtained polymer was analyzed by $^{13}C$, $^1H$-NMR, and GPC, and the result as shown later was obtained.

Synthesis of Fluorourethane-(meth)acrylate-6

One mole of Hydroxy compound-3 and 1 mole of Fluorodiol-5 were mixed, heated at 60° C., and dried under reduced pressure to remove water. Then, 3 moles of Isocyanate compound-1 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Fluorourethane-(meth)acrylate-6 was obtained. The obtained polymer was analyzed by $^{13}C$, $^1H$-NMR, and GPC, and the result as shown later was obtained.

Synthesis of Fluorourethane-(meth)acrylate-7

One mole of Hydroxy compound-3, 1 mole of Hydroxy compound-2, and 1 mole of Fluorodiol-6 were mixed, heated at 60° C., and dried under reduced pressure to remove water. Then, 4 moles of Isocyanate compound-1 and 0.01 moles of dibutyltin dilaurate were added and reacted at 60° C. for 3 hours with stirring. Further, 2 moles of hydroxychloropyl acrylate was added and reacted at 60° C. for 3 hours with stirring. Thereby, Fluorourethane-(meth)acrylate-7 was obtained. The obtained polymer was analyzed by $^{13}C$, $^1H$-NMR, and GPC, and the result as shown later was obtained.

Synthesis of Silicone-pendant urethane-(meth)acrylate-1

One mole of Hydroxy compound-3 and 1 mole of Silicone pendant diol-1 were mixed, heated at 60° C., and dried under reduced pressure to remove water. Then, 3 moles of Isocyanate compound-3 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Silicone-pendant urethane-(meth)acrylate-1 was obtained. The obtained polymer was analyzed by $^{13}C$, $^1H$-NMR, and GPC, and the result as shown later was obtained.

Synthesis of Silicone-pendant urethane-(meth)acrylate-2

One mole of Hydroxy compound-3 and 1 mole of Silicone pendant diol-3 were mixed, heated at 60° C., and dried under reduced pressure to remove water. Then, 3 moles of Isocyanate compound-1 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Silicone-pendant urethane-(meth)acrylate-2 was obtained. The obtained polymer was analyzed by $^{13}C$, $^1H$-NMR, and GPC, and the result as shown later was obtained.

Synthesis of Silicone-pendant urethane-(meth)acrylate-3

One mole of Hydroxy compound-3 and 1 mole of Silicone pendant diol-2 were mixed, heated at 60° C., and dried under reduced pressure to remove water. Then, 3 moles of Isocyanate compound-1 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Silicone-pendant urethane-(meth)acrylate-3 was obtained. The obtained polymer was analyzed by $^{13}C$, $^1H$-NMR, and GPC, and the result as shown later was obtained.

Synthesis of Silicone-pendant urethane-(meth)acrylate-4

One mole of Hydroxy compound-4, 1 mole of Hydroxy compound-2, and 1 mole of Silicone pendant diol-1 were mixed, heated at 60° C., and dried under reduced pressure to remove water. Then, 4 moles of Isocyanate compound-4 and 0.01 moles of dibutyltin dilaurate were added and reacted at 60° C. for 3 hours with stirring. Further, 2 moles of hydroxybutyl acrylate was added and reacted at 60° C. for 3 hours with stirring. Thereby, Silicone-pendant urethane-(meth)acrylate-4 was obtained. The obtained polymer was analyzed by $^{13}C$, $^1H$-NMR, and GPC, and the result as shown later was obtained.

Synthesis of Silicone-pendant urethane-(meth)acrylate-5

One mole of Hydroxy compound-3, 1 mole of Hydroxy compound-5, and 1 mole of Silicone pendant diol-4 were mixed, heated at 60° C., and dried under reduced pressure to remove water. Then, 4 moles of Isocyanate compound-1 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Silicone-pendant urethane-(meth) acrylate-5 was obtained. The obtained polymer was analyzed by $^{13}C$, $^1H$-NMR, and GPC, and the result as shown later was obtained.

Synthesis of Silicone-pendant urethane-(meth)acrylate-6

Two moles of Hydroxy compound-3 and 1 mole of Silicone pendant diol-5 were mixed, heated at 60° C., and dried under reduced pressure to remove water. Then, 4 moles of Isocyanate compound-2 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Silicone-pendant urethane-(meth)acrylate-6 was obtained. The obtained polymer was analyzed by $^{13}$C, $^1$H-NMR, and GPC, and the result as shown later was obtained.

Synthesis of Comparative urethane-(meth)acrylate-1

Two moles of Hydroxy compound-3 was heated at 60° C., and dried under reduced pressure to remove water. Then, 3 moles of Isocyanate compound-2 and 0.01 moles of dibutyltin dilaurate were added and reacted at 60° C. for 3 hours with stirring. Further, 2 moles of hydroxyethyl acrylate was added and reacted at 60° C. for 3 hours with stirring. Thereby, Comparative urethane-(meth)acrylate-1 was obtained. The obtained polymer was analyzed by $^{13}$C, $^1$H-NMR, and GPC, and the result as shown later was obtained.

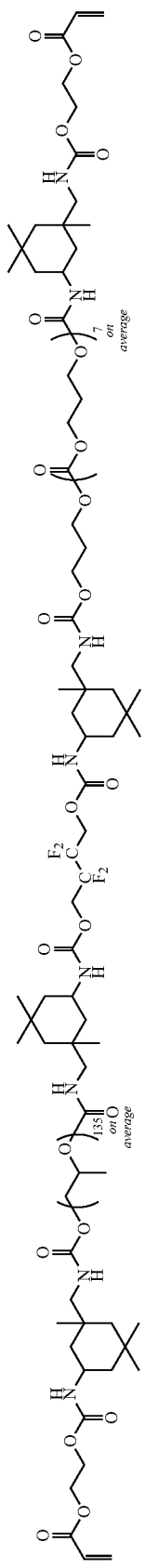
Fluorourethane-(meth)acrylate-1
Mw 16000 Mw/Mn 2.65
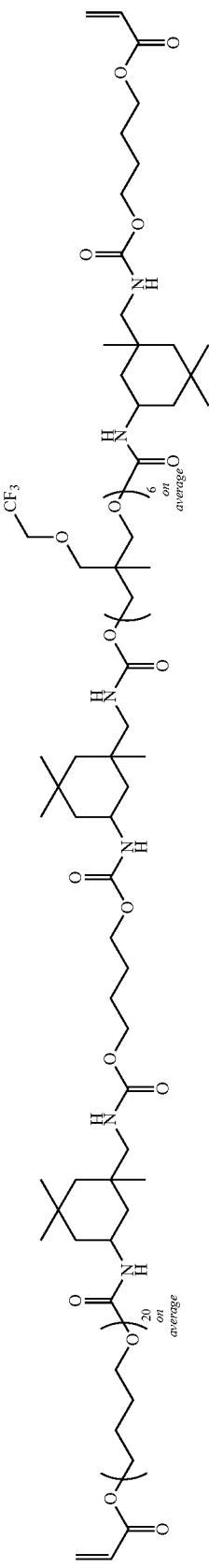
Fluorourethane-(meth)acrylate-2
Mw 7300 Mw/Mn 2.32
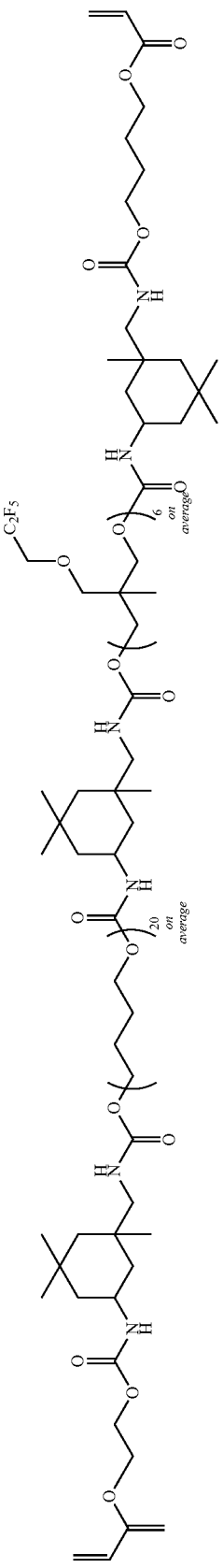
Fluorourethane-(meth)acrylate-3
Mw 7900 Mw/Mn 2.44

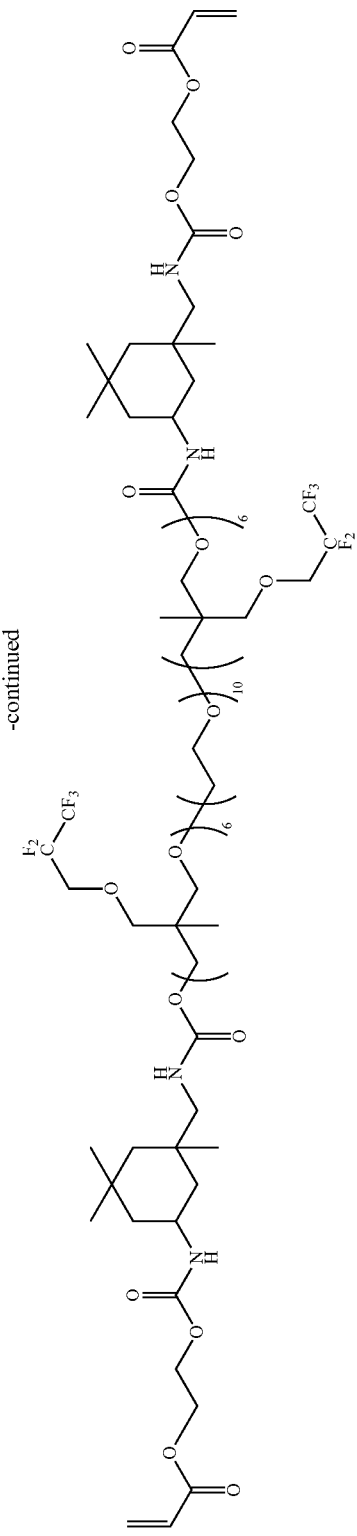
Fluorourethane-(meth)acrylate-4
Mw 4600 Mw/Mn 2.01
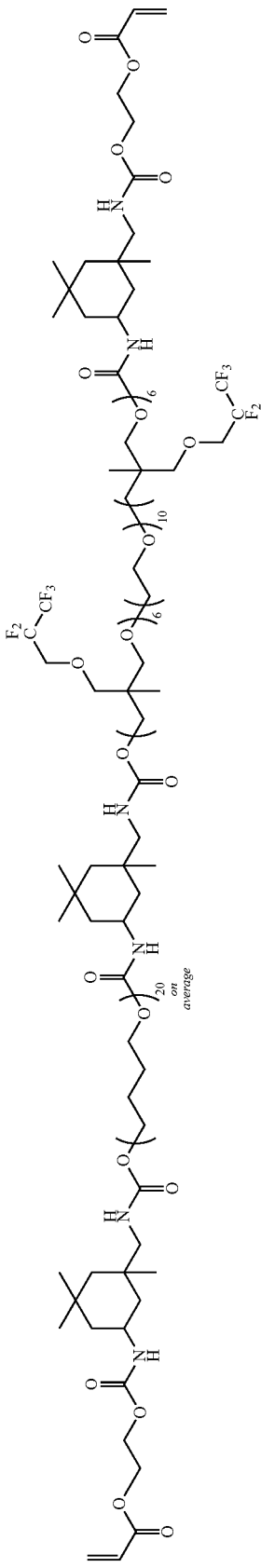
Fluorourethane-(meth)acrylate-5
Mw 9600 Mw/Mn 2.26

-continued
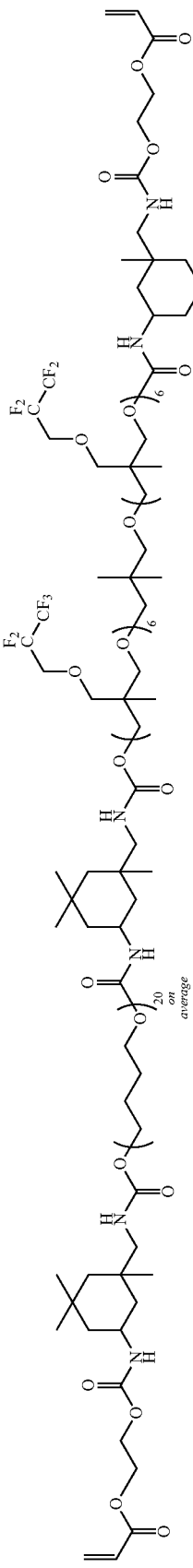
Fluorourethane-(meth)acrylate-6
Mw 8900 Mw/Mn 2.79
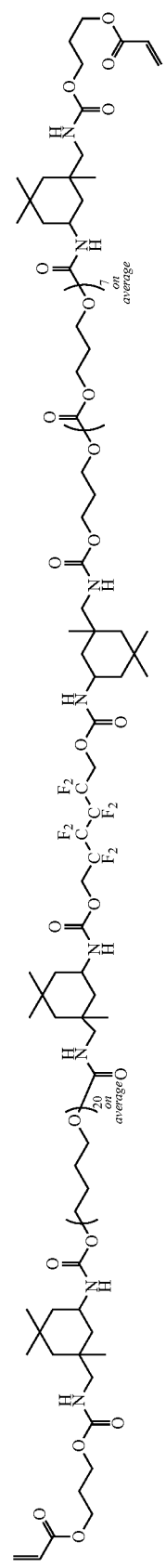
Fluorourethane-(meth)acrylate-7
Mw 15900 Mw/Mn 2.91
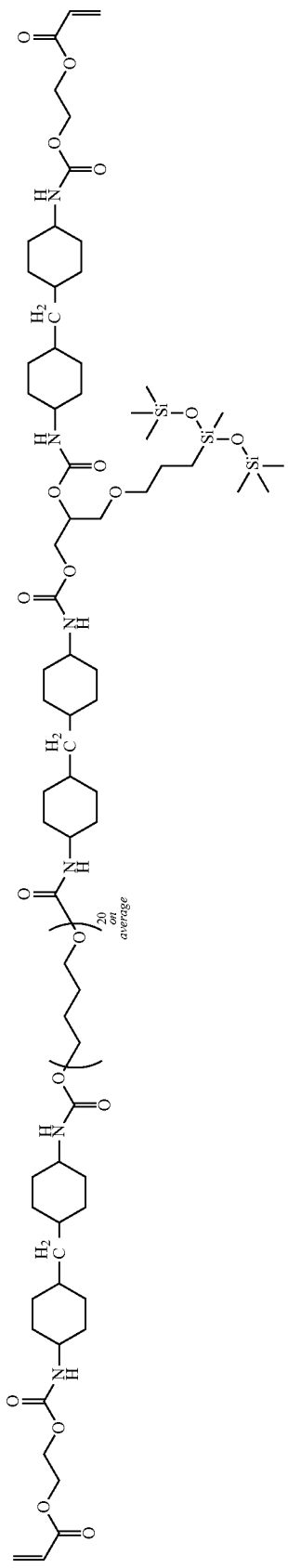
Silicone-pendant urethane-(meth)acrylate-1
Mw 7800 Mw/Mn 2.61

-continued
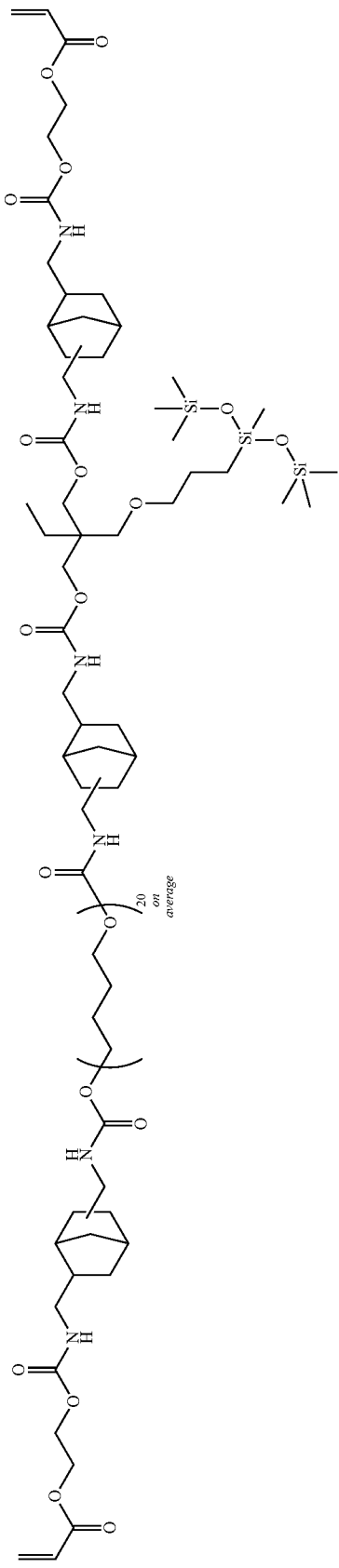
Silicone-pendant urethane-(meth)acrylate-2
Mw 8900 Mw/Mn 2.67
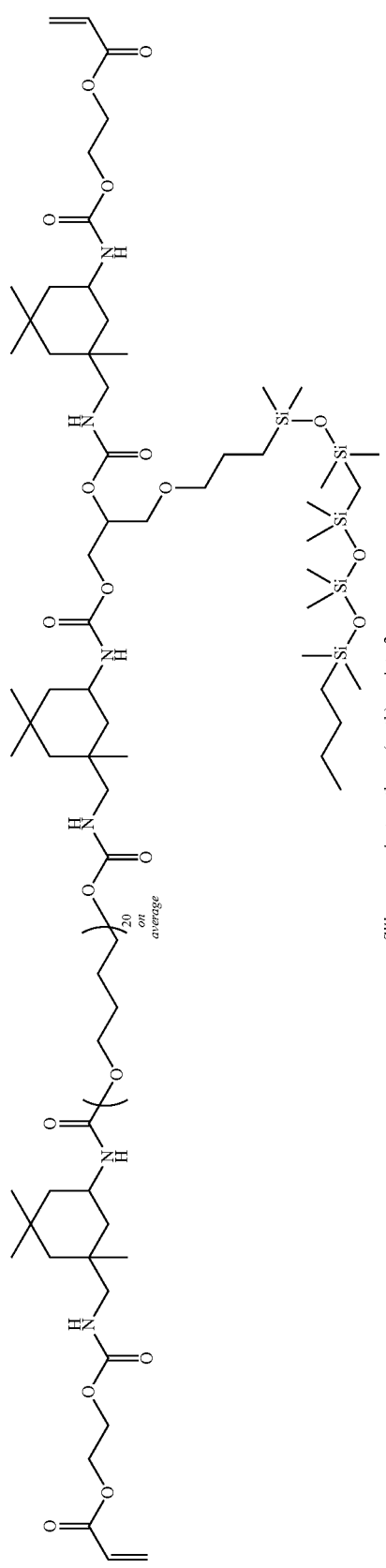
Silicone-pendant urethane-(meth)acrylate-3
Mw 8100 Mw/Mn 2.69

-continued
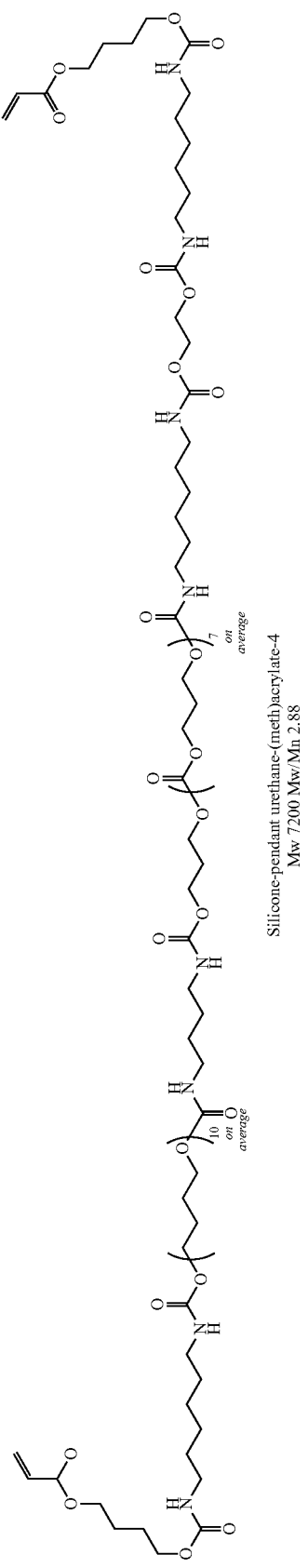
Silicone-pendant urethane-(meth)acrylate-4
Mw 7200 Mw/Mn 2.88
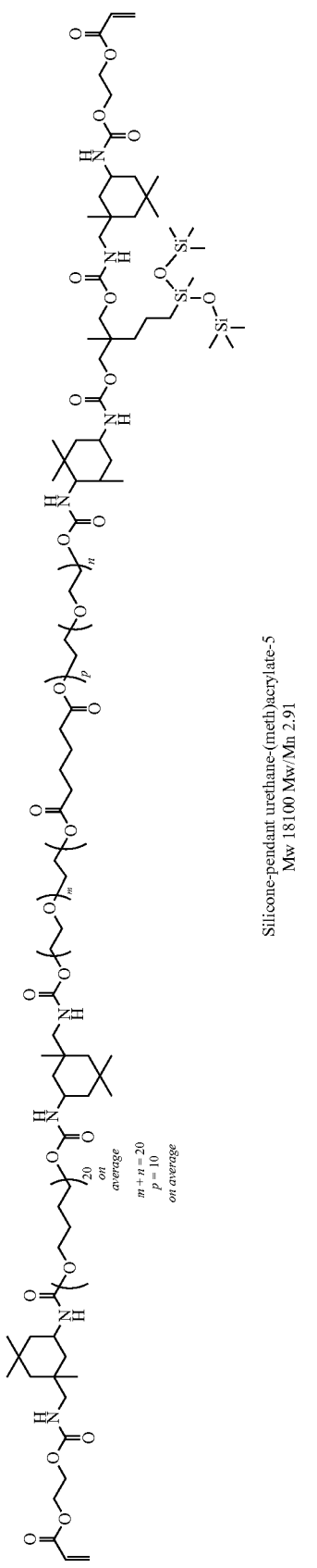
Silicone-pendant urethane-(meth)acrylate-5
Mw 18100 Mw/Mn 2.91

-continued
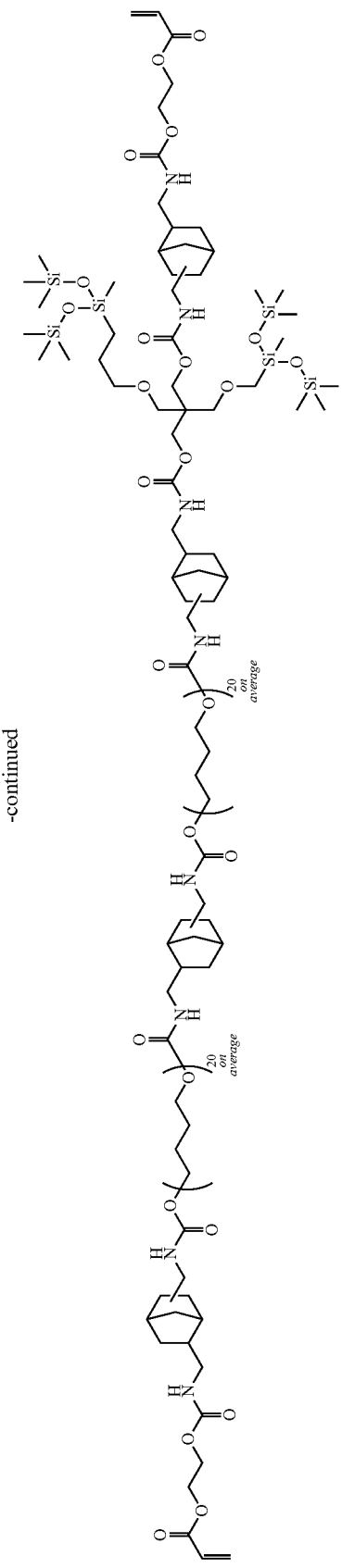
Silicone-pendant urethane-(meth)acrylate-6
Mw 14100 Mw/Mn 2.22
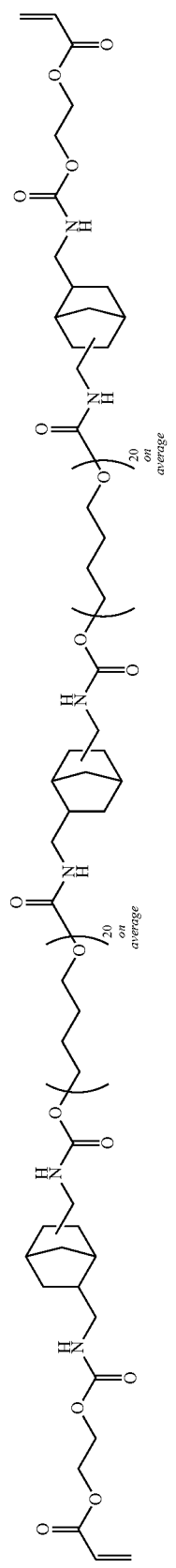
Comparative urethane-(meth)acrylate-1
Mw 12000 Mw/Mn 2.20

Photo-radical generators-1 to 3 blended as additives to compositions for forming stretchable films are shown below.

Photo-radical generator-1: diphenyl(2,4,6-trimethylbenzoyl)phosphine oxide
Photo-radical generator-2: 2,2-dimethoxy-2-phenylacetophenone
Photo-radical generator-3: (±)-camphorquinone Thermal-radical generator-1 blended as an additive to the compositions for forming stretchable films is shown below.
Thermal-radical generator-1: dimethyl 2,2'-azobis(2-methylpropionate)

Organic solvents blended to the compositions for forming stretchable films are shown below.
Organic solvents: propylene glycol monomethyl ether acetate (PGMEA), and butyl acetate A monomer having an alkyl group or an aryl group blended to the compositions for forming stretchable films is shown below.
Monomer having an alkyl group or an aryl group: isobornyl acrylate Examples 1 to 12, Comparative Examples 1 to 3

According to compositions shown in Table 1, compositions (Stretchable film material 1-1 to 1-7, Comparative stretchable film material 1-1) for forming stretchable films were prepared by mixing Silicone urethane compounds having a (meth)acrylate group at a terminal thereof, Photo-radical generators-1 to 3, and the monomer having an alkyl group or an aryl group.

TABLE 1

| Stretchable film material | Silicone-pendant urethane-acrylate (parts by mass) | Additive (parts by mass) |
| --- | --- | --- |
| Stretchable film material 1-1 | Silicone-pendant urethane-(meth)acrylate-1 (70) Isobornyl acrylate (30) | Photo-radical generator-1 (1) |
| Stretchable film material 1-2 | Silicone-pendant urethane-(meth)acrylate-2 (70) Isobornyl acrylate (30) | Photo-radical generator-2 (2) |
| Stretchable film material 1-3 | Silicone-pendant urethane-(meth)acrylate-3 (70) Isobornyl acrylate (30) | Photo-radical generator-3 (2) |
| Stretchable film material 1-4 | Silicone-pendant urethane-(meth)acrylate-4 (70) Isobornyl acrylate (30) | Photo-radical generator-1 (1) |
| Stretchable film material 1-5 | Silicone-pendant urethane-(meth)acrylate-5 (70) Isobornyl acrylate (30) | Photo-radical generator-1 (1) |
| Stretchable film material 1-6 | Silicone-pendant urethane-(meth)acrylate-6 (70) Isobornyl acrylate (30) | Photo-radical generator-1 (1) |
| Stretchable film material 1-7 | Silicone-pendant urethane-(meth)acrylate-1 (30) Silicone-pendant urethane-(meth)acrylate-4 (40) Isobornyl acrylate (30) | Photo-radical generator-1 (1) |
| Comparative stretchable film material 1-1 | Comparative urethane-(meth)acrylate-1 (70) Isobornyl acrylate (30) | Photo-radical generator-1 (1) |

According to compositions shown in Table 2, compositions (stretchable film materials 2-1 to 2-10) for forming stretchable films were prepared by mixing fluorourethane compounds having a (meth)acrylate group at a terminal thereof, Photo-radical generators-1 to 3 or Thermal-radical generator-1, the organic solvents, and the monomer having an alkyl group or an aryl group.

TABLE 2

| Stretchable film material | Fluorourethane-(meth)acrylate (parts by mass) | Additive (parts by mass) |
| --- | --- | --- |
| Stretchable film material 2-1 | Fluorourethane-(meth)acrylate-1 (70) Isobornyl acrylate (30) Butyl acetate (1000) | Photo-radical generator-1 (1) |
| Stretchable film material 2-2 | Fluorourethane-(meth)acrylate-2 (70) PGMEA (700) | Photo-radical generator-2 (2) |
| Stretchable film material 2-3 | Fluorourethane-(meth)acrylate-3 (70) PGMEA (700) | Photo-radical generator-3 (2) |
| Stretchable film material 2-4 | Fluorourethane-(meth)acrylate-4 (70) PGMEA (700) | Photo-radical generator-1 (1) |
| Stretchable film material 2-5 | Fluorourethane-(meth)acrylate-5 (70) PGMEA (700) | Photo-radical generator-1 (1) |
| Stretchable film material 2-6 | Fluorourethane-(meth)acrylate-6 (70) PGMEA (700) | Photo-radical generator-1 (1) |
| Stretchable film material 2-7 | Fluorourethane-(meth)acrylate-7 (70) PGMEA (700) | Photo-radical generator-1 (1) |
| Stretchable film material 2-8 | Fluorourethane-(meth)acrylate-1 (30) Fluorourethane-(meth)acrylate-4 (40) PGMEA (700) | Photo-radical generator-1 (1) |
| Stretchable film material 2-9 | Fluorourethane-(meth)acrylate-1 (70) PGMEA (700) | Thermal-radical generator-1 (3) |
| Stretchable film material 2-10 | Fluorourethane-(meth)acrylate-1 (70) Isobornyl acrylate (30) | Photo-radical generator-1 (1) |

(Preparation of Stretchable Films)

Stretchable film materials 1-1 to 1-7, as well as Stretchable film materials 1-1, 2-10, and Comparative stretchable film material 1-1 for use in Comparative Example were respectively applied onto polyethylene substrates by the bar coating method to form first layers of stretchable films. Then, the first layers of the stretchable films were cured by irradiation with light of 500 mJ/cm$^2$ from a 1,000 W xenon lamp in a nitrogen atmosphere.

Each of the first layers was spray-coated with one of Stretchable film materials 2-1 to 2-9. Second layers of the stretchable films were cured by irradiation with light of 500 mJ/cm$^2$ from a 1,000 W xenon lamp in a nitrogen atmosphere in Examples 1 to 11; or heat-cured in Example 12 by baking at 130° C. for 20 minutes in nitrogen. Thus, the stretchable films with configurations as shown in Table 3 were formed.

(Measurement of Film Thickness, Contact Angle, Stretching Property, and Strength)

The first layers and the second layers of the cured stretchable films (Examples 1 to 12), as well as the single-layered stretchable films of Comparative Examples (Comparative Examples 1 to 3) were measured for film thickness, contact angle with water on the surface, and tackiness by touching each layer and film with finder. Moreover, after the contact angle with water on the surface of each stretchable film was measured, the stretchable film was peeled from the substrate to measure the stretching property (elongation) and tensile strength (strength) by a method in conformity to JIS K 6251. Table 3 shows the results.

TABLE 3

| | Material of first layer | Material of second layer | First layer thickness (μm) | Second layer thickness (μm) | Contact angle (°) | Elongation (%) | Strength (MPa) | Surface tackiness |
|---|---|---|---|---|---|---|---|---|
| Example 1 | Stretchable film material 1-1 | Stretchable film material 2-1 | 310 | 20 | 118 | 410 | 13.1 | none |
| Example 2 | Stretchable film material 1-2 | Stretchable film material 2-2 | 320 | 30 | 122 | 390 | 15.1 | none |
| Example 3 | Stretchable film material 1-3 | Stretchable film material 2-3 | 360 | 22 | 125 | 320 | 11.6 | none |
| Example 4 | Stretchable film material 1-4 | Stretchable film material 2-4 | 350 | 28 | 128 | 290 | 18.0 | none |
| Example 5 | Stretchable film material 1-5 | Stretchable film material 2-1 | 360 | 30 | 124 | 310 | 16.1 | none |
| Example 6 | Stretchable film material 1-6 | Stretchable film material 2-1 | 340 | 18 | 119 | 380 | 15.3 | none |
| Example 7 | Stretchable film material 1-7 | Stretchable film material 2-1 | 330 | 16 | 118 | 410 | 13.0 | none |
| Example 8 | Stretchable film material 1-1 | Stretchable film material 2-5 | 380 | 22 | 121 | 490 | 14.4 | none |
| Example 9 | Stretchable film material 1-1 | Stretchable film material 2-6 | 370 | 23 | 122 | 380 | 13.0 | none |
| Example 10 | Stretchable film material 1-1 | Stretchable film material 2-7 | 370 | 15 | 123 | 390 | 13.8 | none |
| Example 11 | Stretchable film material 1-1 | Stretchable film material 2-8 | 230 | 18 | 124 | 390 | 14.7 | none |
| Example 12 | Stretchable film material 1-1 | Stretchable film material 2-9 | 240 | 22 | 125 | 380 | 12.1 | none |
| Comparative Example 1 | Stretchable film material 1-1 | — | 300 | — | 94 | 350 | 15.3 | exist |
| Comparative Example 2 | Stretchable film material 2-10 | — | 230 | — | 118 | 120 | 4.1 | none |
| Comparative Example 3 | Comparative stretchable film material 1-1 | — | 330 | — | 70 | 390 | 12.1 | exist |

As shown in Table 3, the inventive stretchable films showed higher water repellency, strength, and stretchability, with the surfaces being free from tackiness.

On the other hand, in the films having only one layer of Comparative Examples 1 to 3, the silicone pendant urethane film alone (Comparative Example 1) had high water repellency, strength, and stretchability but had such a property that the films of the same kind were stuck with each other due to the surface tackiness; the fluorourethane film alone (Comparative Example 2) was free from surface tackiness but had inferior strength; the urethane film alone without silicone (Comparative Example 3) had low water repellency.

The above results revealed that the inventive stretchable film has excellent stretchability and strength, together with excellent water repellency and low tackiness on the film surface, and thus has excellent properties as a film that is capable of printing stretchable wiring used for a wearable device and so on.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:
1. A stretchable film comprising, in a stacked form:
  a polyurethane film containing a repeating unit having a fluorine atom; and
  a polyurethane film containing a repeating unit having a silicon atom, wherein:
  at least one surface of the stretchable film is made of the polyurethane film containing a repeating unit having a fluorine atom,
  the polyurethane film containing a repeating unit having a fluorine atom is a cured product of a composition containing a resin having a structure shown by the following general formula (3), and
  the polyurethane film containing a repeating unit having a silicon atom is a cured product of a composition containing a resin having a structure shown by the following general formula (4):

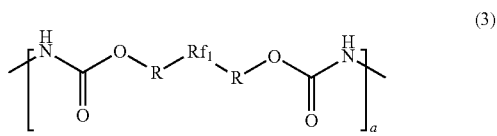

(3)

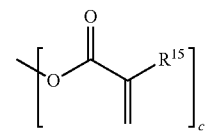

(4)

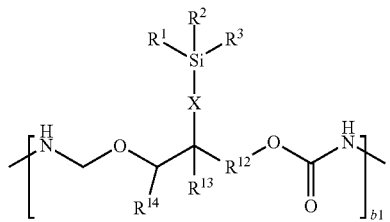

-continued

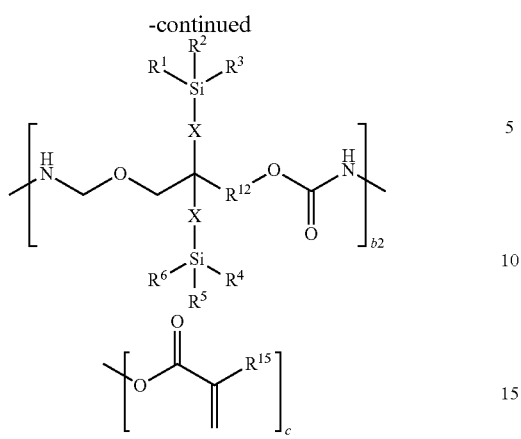

wherein $Rf_1$ represents a linear or branched alkylene group having 1 to 200 carbon atoms and at least one or more fluorine atoms, and optionally having an ether group; R's may be identical to or different from each other and each represent a single bond or a methylene group; $R^1$, $R^2$, $R^3$, $R^4$, $R^5$, and $R^6$ each represent a linear, branched, or cyclic alkyl group having 1 to 6 carbon atoms, a phenyl group, a 3,3,3-trifluoropropyl group, or a —$(OSiR^7R^8)_n$—$OSiR^9R^{10}R^{11}$ group; $R^7$, $R^8$, $R^9$, $R^{10}$, and $R^{11}$ each represent a linear, branched, or cyclic alkyl group having 1 to 6 carbon atoms, a phenyl group, or a 3,3,3-trifluoropropyl group; "n" ranges from 0 to 100; $R^{12}$ represents a single bond, a methylene group, or an ethylene group; $R^{13}$ represents a hydrogen atom or a linear alkyl group having 1 to 4 carbon atoms; $R^{14}$ represents a hydrogen atom or a methyl group; X represents a linear or branched alkylene group having 3 to 8 carbon atoms and optionally containing an ether group; "a", b1, and b2 are each the number of unit in one molecule and represent integers in ranges of $1 \le a \le 20$, $0 \le b1 \le 20$, $0 \le b2 \le 20$, and $1 \le b1+b2 \le 20$; $R^{15}$ represents a hydrogen atom or a methyl group; and "c" is the number of unit in one molecule and represents an integer in a range of $1 \le c \le 4$.

2. The stretchable film according to claim 1, wherein the repeating unit having a silicon atom has a silicon atom in a side chain.

3. The stretchable film according to claim 1, wherein the stretchable film has a stretching property in a range of 20 to 1000% in a tensile test stipulated according to JIS K 6251.

4. The stretchable film according to claim 2, wherein the stretchable film has a stretching property in a range of 20 to 1000% in a tensile test stipulated according to JIS K 6251.

5. The stretchable film according to claim 1, wherein the stretchable film is used as a film in contact with a stretchable conductive wiring.

6. The stretchable film according to claim 2, wherein the stretchable film is used as a film in contact with a stretchable conductive wiring.

7. A method for forming a stretchable film, comprising:
curing a composition containing a resin having a structure shown by the following general formula (4) by heating and/or light irradiation to form a polyurethane film containing a repeating unit having a silicon atom; and
curing a composition containing a resin having a structure shown by the following general formula (3) by heating and/or light irradiation to stack a polyurethane film containing a repeating unit having a fluorine atom on a surface of the polyurethane film containing a repeating unit having a silicon atom:

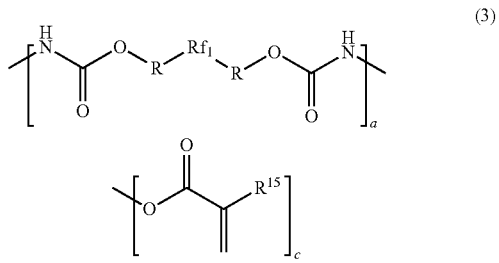

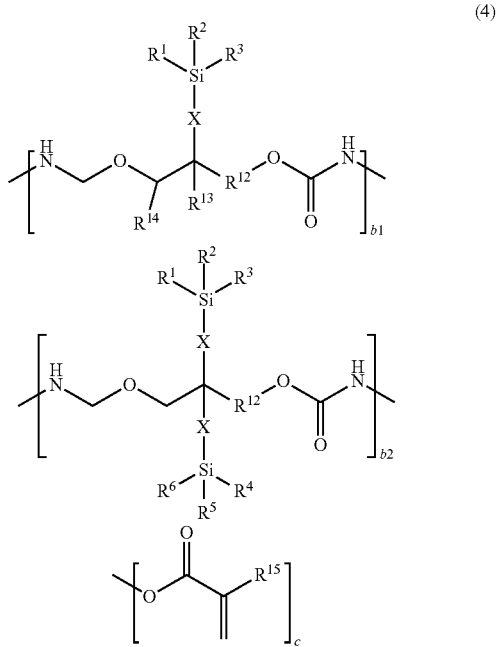

wherein $Rf_1$ represents a linear or branched alkylene group having 1 to 200 carbon atoms and at least one or more fluorine atoms, and optionally having an ether group; R's may be identical to or different from each other and each represent a single bond or a methylene group; $R^1$, $R^2$, $R^3$, $R^4$, $R^5$, and $R^6$ each represent a linear, branched, or cyclic alkyl group having 1 to 6 carbon atoms, a phenyl group, a 3,3,3-trifluoropropyl group, or a —$(OSiR^7R^8)_n$—$OSiR^9R^{10}R^{11}$ group; $R^7$, $R^8$, $R^9$, $R^{10}$, and $R^{11}$ each represent a linear, branched, or cyclic alkyl group having 1 to 6 carbon atoms, a phenyl group, or a 3,3,3-trifluoropropyl group; "n" ranges from 0 to 100; $R^{12}$ represents a single bond, a methylene group, or an ethylene group; $R^{13}$ represents a hydrogen atom or a linear alkyl group having 1 to 4 carbon atoms; $R^{14}$ represents a hydrogen atom or a methyl group; X represents a linear or branched alkylene group having 3 to 8 carbon atoms and optionally containing an ether group; "a", b1, and b2 are each the number of unit in one molecule and represent integers in ranges of $1 \le a \le 20$, $0 \le b1 \le 20$, $0 \le b2 \le 20$, and $1 \le b1+b2 \le 20$; $R^{15}$ represents a hydrogen atom or a methyl group; and "c" is the number of unit in one molecule and represents an integer in a range of $1 \le c \le 4$.

* * * * *